United States Patent
Kamatani et al.

(10) Patent No.: US 8,175,571 B2
(45) Date of Patent: May 8, 2012

(54) COMMUNICATION EQUIPMENT AND COMMUNICATION SYSTEM

(75) Inventors: Yoshiteru Kamatani, Kanagawa (JP); Masamichi Asukai, Kanagawa (JP); Taiji Ito, Kanagawa (JP); Yoichiro Sako, Tokyo (JP); Akane Sano, Tokyo (JP); Akinobu Sugino, Kanagawa (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 12/409,800

(22) Filed: Mar. 24, 2009

(65) Prior Publication Data

US 2009/0247216 A1 Oct. 1, 2009

(30) Foreign Application Priority Data

Mar. 28, 2008 (JP) ................... 2008-085240

(51) Int. Cl.
*H04M 11/04* (2006.01)
(52) U.S. Cl. ............... 455/404.1; 455/550.1; 600/301; 128/905
(58) Field of Classification Search ............... 455/550.1, 455/404, 1, 404.2; 600/300, 301; 128/900–905, 128/920–925
See application file for complete search history.

(56) References Cited

U.S. PATENT DOCUMENTS

| | | | |
|---|---|---|---|
| 6,941,239 B2 * | 9/2005 | Unuma et al. ............... 702/141 |
| 7,655,479 B2 * | 2/2010 | Zhukov et al. ............... 436/524 |
| 7,725,419 B2 * | 5/2010 | Lee et al. ............... 706/60 |
| 7,874,983 B2 * | 1/2011 | Zancho et al. ............... 600/300 |
| 7,908,144 B2 * | 3/2011 | Iwamoto ............... 704/270 |
| 2002/0143241 A1 * | 10/2002 | Thorell ............... 600/300 |
| 2004/0147814 A1 * | 7/2004 | Zancho et al. ............... 600/300 |

FOREIGN PATENT DOCUMENTS

| | | |
|---|---|---|
| JP | 2002-034936 A | 2/2002 |
| JP | 2003-110703 A | 4/2003 |
| JP | 2005-295170 A | 10/2005 |
| JP | 2006-051317 A | 2/2006 |
| JP | 2007-142578 A | 6/2007 |
| JP | 2007-287177 A | 11/2007 |

* cited by examiner

*Primary Examiner* — Don Le
(74) *Attorney, Agent, or Firm* — Wolf, Greenfield & Sacks, P.C.

(57) ABSTRACT

A communication system includes: sender-side communication equipment including a detection unit configured to detect information indicating the condition of a user, and a transmission unit configured to transmit information indicating the condition of the user detected through the detection unit to a communication partner; and receiver-side communication equipment including a reception unit configured to receive information indicating the condition of the user transmitted from the sender-side communication equipment, a notification unit configured to notify the condition corresponding to the condition of the user received through the reception unit, and a control unit configured to control the notification unit based on information indicating the condition of the user received through the reception unit.

17 Claims, 28 Drawing Sheets

FIG. 1
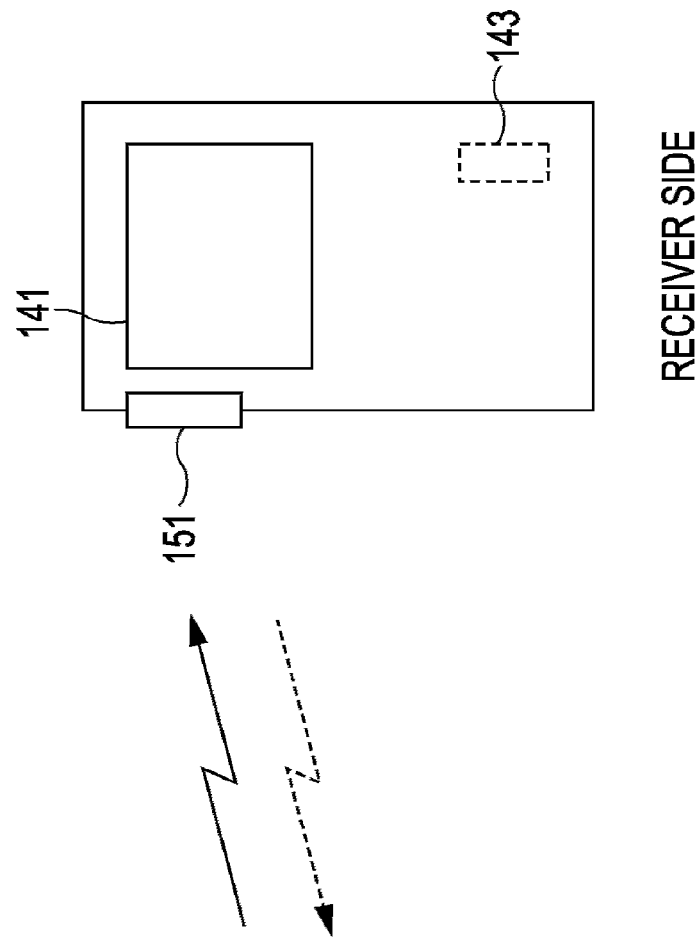
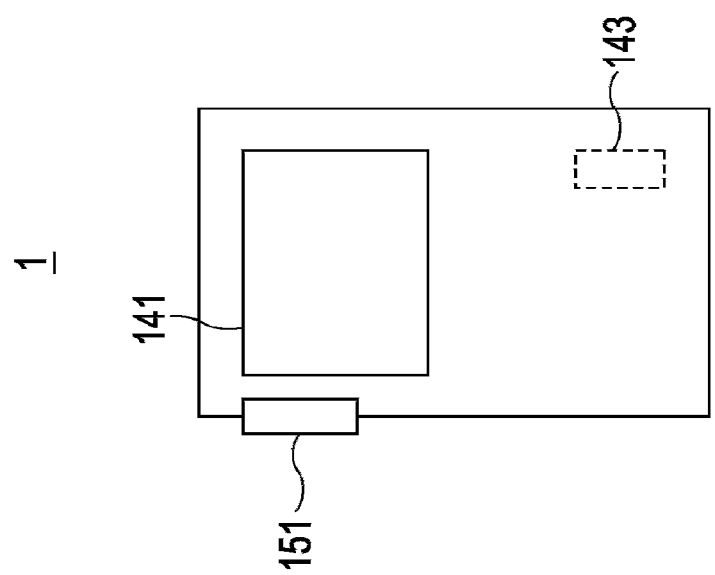

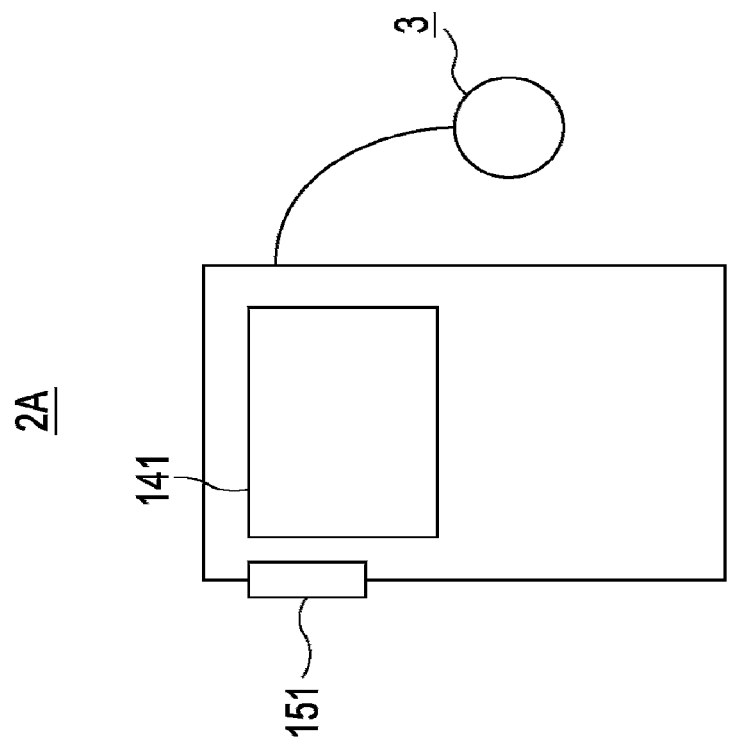
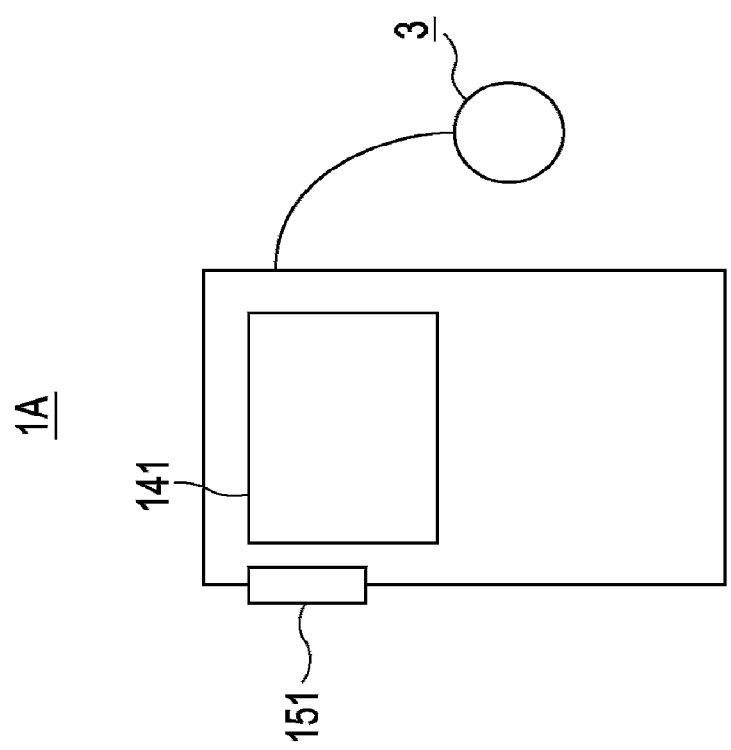

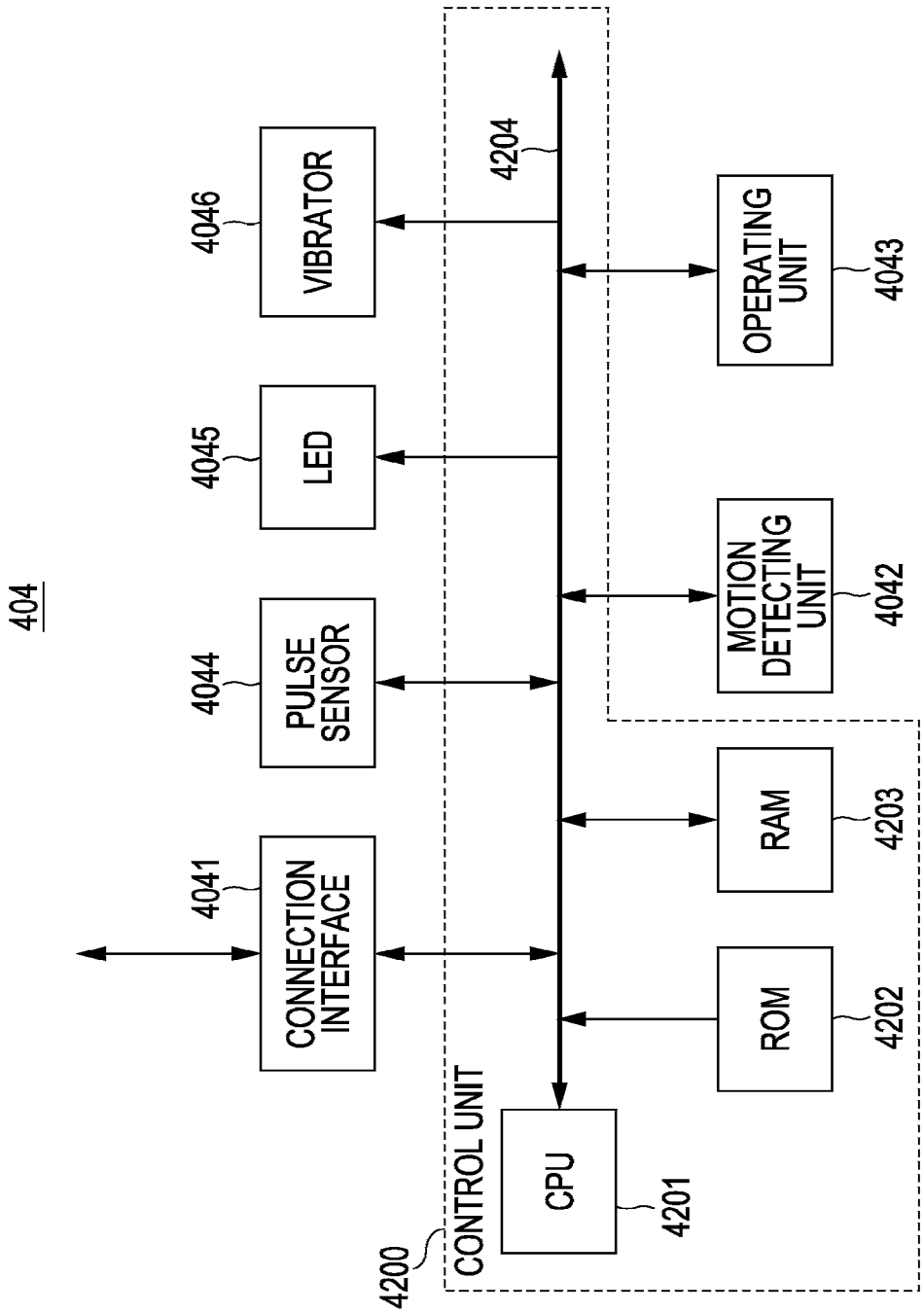

COMMUNICATION EQUIPMENT AND COMMUNICATION SYSTEM

CROSS REFERENCES TO RELATED APPLICATIONS

The present invention contains subject matter related to Japanese Patent Application JP 2008-085240 filed in the Japanese Patent Office on Mar. 28, 2008, the entire contents of which are incorporated herein by reference.

BACKGROUND OF THE INVENTION

1. Field of the Invention

The present invention relates to various types of communication equipment, for example, such as a portable communication terminal having a communication function such as a cell phone terminal or the like, a land line phone, a personal computer having a communication function, and so forth.

2. Description of the Related Art

Disclosed in Japanese Unexamined Patent Application Publication No. 2002-034936 is an invention wherein information such as audio information, image information, and biological information is communicated to allow a user to convey his/her emotions and so forth which are not readily conveyed by sound or characters by phone conversation, chat, or the like, and based on such information, the psychological condition and physiological condition of the operator is estimated, and estimated amount thereof is output.

Also, disclosed in Japanese Unexamined Patent Application Publication No. 2007-287177 is an invention wherein, in order to determine the emotions and condition of a user as well as the intensity thereof, language information relating to emotions is extracted from input linguistic information, as emotions information, and emotions feature information is generated by correlating this with body motion information and physiological information, thereby enabling the emotions of the user to be learned.

SUMMARY OF THE INVENTION

Incidentally, the case of the technology described in Japanese Unexamined Patent Application Publication No. 2002-034936 is a case of estimating the psychological condition and physiological condition of the operator, which may lack in correctness. Also, there may be cases wherein the technology described in Japanese Unexamined Patent Application Publication No. 2007-287177 is not suitable for being employed at the time of normal phone communication, or e-mail communication, since the content to be processed is complicated, and it takes time to recognize the emotion of the user.

It has been found desirable to allow a user to know the condition of a communication partner as simple and correct as possible, in a case of performing some sort of communication processing.

Communication equipment according to an embodiment of the present invention includes: a reception unit configured to receive, as information indicating the condition of a communication partner transmitted from the partner, information corresponding to the biological information of the partner, or information corresponding to variable operation input of the partner; a notification unit configured to notify the condition corresponding to information indicating the condition of the partner received through the reception unit; and a control unit configured to control the notification unit based on information indicating the condition of the partner received through the reception unit.

With the communication equipment of the above configuration, information indicating the condition of the partner transmitted from the communication partner is received by the reception unit. Based on the received information indicating the condition of the partner, the notification unit is controlled by the control unit. Subsequently, the condition of the partner is notified via the notification unit according to the received information indicating the condition of the partner.

Thus, with the communication equipment, based on only the information indicating the condition of the partner transmitted from the communication partner, the condition of the partner can be notified appropriately without performing complicated processing.

The communication equipment may further include a transmission unit configured to transmit, in a case of having notifying the condition corresponding to information indicating the condition of the partner through the notification unit, information indicating that the notification has been performed to the communication partner.

With the communication equipment according to the above configuration, in a case of performing notification through the notification unit, information indicating that the notification has been performed, i.e., that notification has been performed by employing the information indicating the condition of the communication partner, is transmitted to the communication partner through the transmission unit.

Thus, with regard to a communication partner arranged so as to transmit information indicating own condition, information indicating the condition of the partner is received, and information indicating that notification corresponding to the received information has been performed can be notified clearly. Thus, the communication partner arranged so as to transmit information indicating own condition does not have to transmit the information indicating own condition again.

Communication equipment according to an embodiment of the present invention includes: a download unit configured to access a target server device to download target information, and as information indicating the condition of a partner to be added to the target information, information corresponding to the biological information of the partner, or information corresponding to variable operation input of the partner; a notification unit configured to notify information corresponding to information indicating the condition of the partner downloaded through the download unit; and a control unit configured to control the notification unit based on information indicating the condition of the partner downloaded through the download unit.

According to the above configuration, based on target information arranged to be transmitted from the communication partner, and accumulated in a predetermined server device, and information indicating the condition of the partner are downloaded by the download unit. Based on the downloaded information indicating the condition of the partner, the notification unit is controlled by the control unit. Subsequently, the condition of the partner is notified according to the received information indicating the condition of the partner through the notification unit.

Thus, with the communication equipment, target information from a target partner, and information indicating the condition of the partner are obtained by being downloaded from the predetermined server device without performing complicated processing, and based on only the information indicating the condition of the partner, the condition of the partner can be notified appropriately.

The communication equipment may further include an upload unit configured to upload, in a case of notifying the condition corresponding to information indicating the condition of the partner through the notification unit, information indicating that the notification has been performed to a server device of the partner.

With the above configuration, in a case of performing notification through the notification unit, information indicating that the notification has been performed, i.e., information indicating that notification employing information indicating the condition of the communication partner has been performed can be uploaded to the server device of the partner through the upload unit.

Thus, with regard to a communication partner arranged so as to transmit information indicating own condition, information indicating the condition of the partner is obtained, and information indicating that notification corresponding to the obtained information has been performed can be uploaded to the server device of the partner. Thus, the communication equipment of the partner downloads the uploaded information, thereby obtaining the information indicating the condition of the partner, and enabling that the notification according to the downloaded information has been performed to be recognized clearly. Accordingly, the communication partner arranged so as to transmit information indicating own condition does not have to transmit the information indicating own condition again.

Accordingly, a user can easily and accurately know the condition of a communication partner without performing complicated processing, and transmitting great amounts of information.

BRIEF DESCRIPTION OF THE DRAWINGS

FIG. 1 is a diagram for describing a configuration example of a communication system according to a first embodiment, to which a system according to an embodiment of the present invention has been applied;

FIGS. 10A and 10B are diagrams for describing a case of employing a cell-phone strap-type vibrator including a vibrator which can be controlled based on received pulse data, and so forth;

FIG. 15 is a block diagram for describing the configuration of a pointing device according to the second modification of the first embodiment;

FIGS. 21A and 12B are diagrams for describing an overview of a cell phone terminal according to a third embodiment;

DESCRIPTION OF THE PREFERRED EMBODIMENTS

Figure 2:
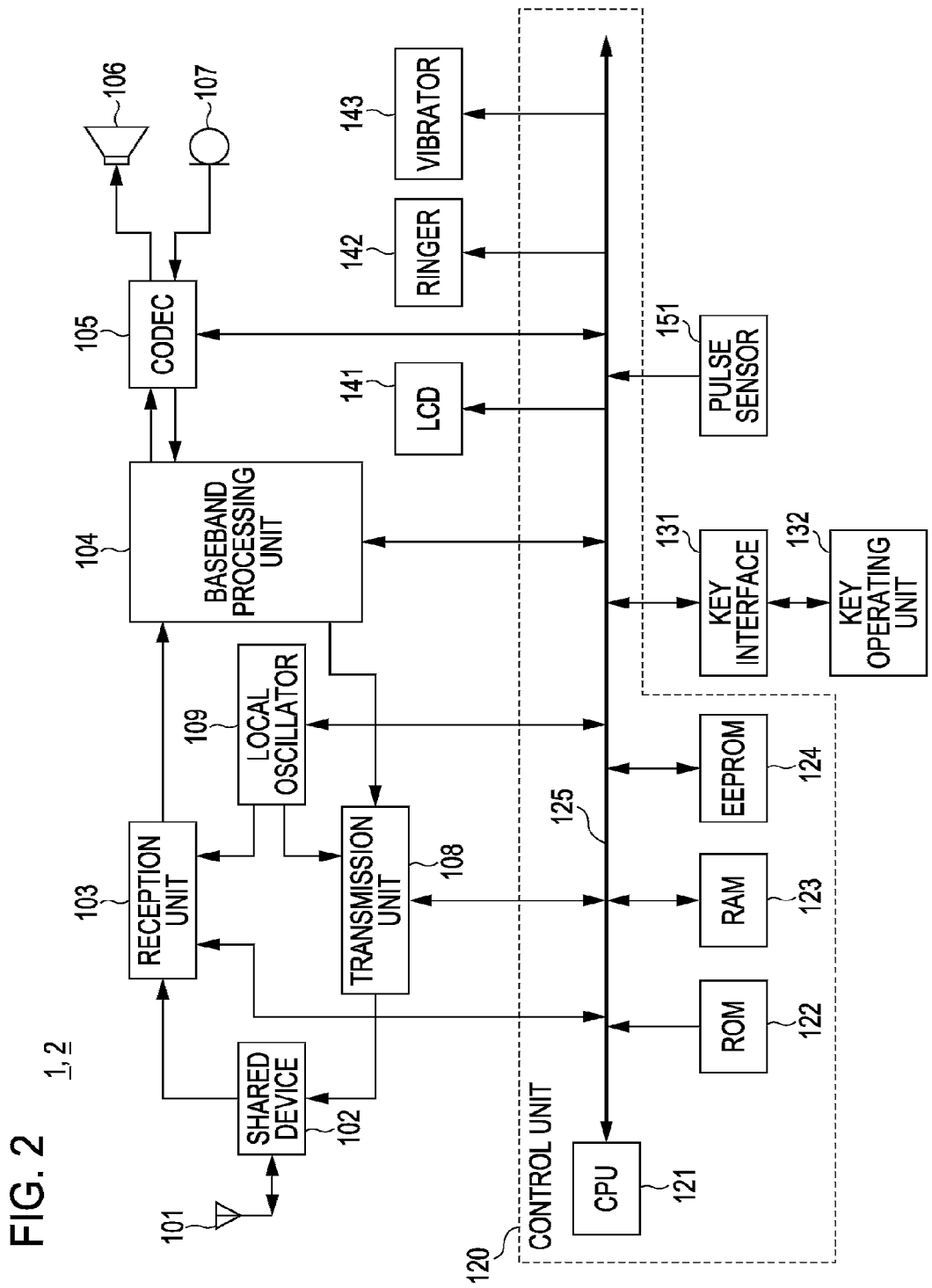
FIG. 2 is a block diagram for describing a configuration example of cell phone terminals according to the first embodiment.

Description will be made below regarding an embodiment of equipment and a system according to the present invention, with reference to the drawings.

First Embodiment

Regarding Configuration Examples of a Communication System

FIG. 1 is a diagram for describing a configuration example of a communication system according to a first embodiment to which an embodiment of a system according to the present invention has been applied. As shown in FIG. 1, the communication system according to the first embodiment is configured of a sender-side cell phone terminal 1, and a receiver-side cell phone terminal 2.

Note that with an embodiment described below, in order to simplify description, description will be made assuming that the sender-side cell phone terminal 1 is an outgoing call source (calling party), and the receiver-side cell phone terminal 2 is an incoming call destination (called party).

As shown in FIG. 1, with the cell phone terminals 1 and 2, a pulse sensor 151 is provided at a portion with which a portion of a user's body such as a finger of the user or the like comes into contact in a case of the user holding the cell phone terminal 1 or 2 to use the terminal thereof, and a vibrator is provided to notify an incoming call within a casing thereof.

With the first embodiment, when accepting operation input (input of a phone number, or input of data selection from a phonebook, and an outgoing call operation (off-hook operation)) so as to call the cell phone terminal 2, the cell phone terminal 1 generates an incoming call request, and transmits this to the cell phone terminal 2 serving as a target communication partner. The cell phone terminal 2 which has received the incoming call request drives a ringer or vibrator to inform the user that it has received an incoming call.

Subsequently, upon the user of the cell phone terminal 2 performing a response operation (off-hook operation) as to the cell phone terminal 2, the cell phone terminal 2 generates an incoming call response to transmit this to the cell phone terminal 1 serving as the outgoing call source. Thus, a phone line is connected between the cell phone terminal 1 and cell phone terminal 2, thereby enabling phone conversation to be performed.

In this case, with the cell phone terminal 1, as described above, pulse of the user is detected through the pulse sensor 151 provided in a predetermined position of the cell phone terminal 1. The detected pulse is transmitted to the cell phone terminal 2 as numeric information. Specifically, a pulse rate per unit time is detected, such as 55 times per one minute (55 bpm (beats per minute)), and this is transmitted to the cell phone terminal 2 serving as an incoming call destination through the connected phone line as pulse data (information indicating the pulse rate).

The cell phone terminal 2 receives the pulse data from the cell phone terminal 1, and drives a vibrator 143 based on the received pulse data. Specifically, the cell phone terminal 2 drives the vibrator the same number of times as the number of times indicated by the received pulse data per unit time (e.g., per one minute in the case of this example) according to the received pulse data.

The pulse rate becomes faster in a case wherein the user becomes emotional or excited, and stabilizes at a certain value, for example, such as a value of around 60 times per one minute in a case wherein the user becomes emotionally calm. Therefore, the vibrator is driven according to the pulse rate of the communication partner, whereby vibration according to the pulse of the user serving as the communication partner can be felt. Thus, the emotion and condition of the user (user of the cell phone terminal 1) of the communication partner can be imagined.

Also, the cell phone terminal 2 according to the present embodiment is arranged to vibrate the vibrator 143 to notify the state of the user of the cell phone terminal 1 serving as the communication partner, and then informs the cell phone terminal 1 that the notification has been performed.

Thus, with the following embodiment, the sender-side cell phone terminal 1 has a function for detecting the pulse of the user, and transmitting this to the partner at the time of phone conversation. On the other hand, the receiver-side cell phone terminal 2 has a function for receiving supply of the pulse data from the sender-side cell phone terminal 1, vibrating the vibrator 143 according to the received pulse data, thereby informing the user of the receiver-side cell phone terminal 2 of the condition of the user of the sender-side cell phone terminal 1.

Also, the receiver-side cell phone terminal 2 has a function for informing the sender-side cell phone terminal 1 of the pulse data in the case of employing pulse data. Also, the sender-side cell phone terminal 1 has a function for informing the user of the cell phone terminal 1 of the notification from the receiver-side cell phone terminal 2.

Configuration Examples of the Cell Phone Terminals 1 and 2

Next, description will be made regarding configuration examples of the cell phone terminals 1 and 2 of this first embodiment to which an embodiment of the communication equipment according to the present invention has been applied. FIG. 2 is a block diagram for describing a configuration example of the cell phone terminals 1 and 2 according to the first embodiment. That is to say, with the communication system according to the first embodiment, the sender-side cell phone terminal 1 and the receiver-side cell phone terminal 2 have the same configuration. However, description will be made below principally regarding the configuration of the cell phone terminal 1 to simplify description.

As shown in FIG. 2, the cell phone terminal 1 according to the first embodiment includes a transmission/reception antenna 101, antenna shared device 102, reception unit 103, baseband processing unit 104, codec 105, receiver (speaker) 106, transmitter (microphone) 107, transmission unit 108, local oscillator 109, control unit 120, key interface 131, key operating unit 132, LCD (Liquid Crystal Display) 141, ringer 142, vibrator 143, and pulse sensor 151.

First, description will be made regarding the control unit 120, and connected thereto, key interface 131, key operating unit 132, LCD (Liquid Crystal Display) 141, ringer 142, vibrator 143, and pulse sensor 151.

The control unit 120 is a unit for controlling the respective units of the cell phone terminal 1 according to the present embodiment, which is a microcomputer made up of a CPU 121, ROM 122, RAM 123, and EEPROM 124 through a CPU bus 125.

Here, the CPU 121 serves as a main component for control, executes a program stored and held in later-described ROM 122 or the like, generates a control signal to be supplied to the respective units, supplies this to the respective units, accepts a signal from the respective units, and processes this. The ROM 122 stores and holds, as described above, various types of program executed by the CPU 121, and various types of data for processing such as font data, and so forth.

The RAM 123 is employed principally as a work area such as temporarily storing intermediate results with various types of processing, or the like. The EEPROM 124 is so-called nonvolatile memory, and stores and holds information to be held even if the power of the cell phone terminal 1 were turned off, e.g., various types of setting parameters, phonebook data, e-mail data, a newly provided program, and so forth.

As shown in FIG. 1, the key operating unit 132 is connected to such a control unit 120 through the key interface 131. The key operating unit 132 is, though not shown in the drawing, a unit where multiple operating keys are provided, such as a ten key, various types of function keys, jog dial key capable of a rotating operation and pressing operation, and so forth, and accepts operation input from the user.

Subsequently, the operation input from the user accepted through the key operating unit 132 is converted into an electric signal, and is supplied to the control unit 120. Thus, the control unit 120 controls the respective units according to the instructions from the user, thereby enabling processing according to the user's instructions to be performed.

Also, the LCD 141 for displaying various types of display information, ringer 142, and vibrator 143 are connected to the control unit 120. The LCD 141 includes an LCD controller, and can display various types of display information on the display screen of the LCD 141 according to a control signal from the control unit 120.

Also, the ringer 142 includes a ringer controller, and can release warning beep or ring alert according to a control signal from the control unit 120. Also, the vibrator 143 includes a vibrator controller, and can notify an incoming call by vibration, as described above, or vibrate according to information indicating the pulse from the communication partner, in accordance with a control signal from the control unit 120, or the like.

Further, the pulse sensor 151 is connected to the control unit 120. The pulse sensor 151 detects pulse per unit time from flow of the user's blood by a portion of the user's body such as a finger or the like coming into contact therewith, and notifies this to the control unit 120. Also, the pulse sensor 151 is in a state wherein a finger or the like of the user is in contact therewith, and when detection of pulse can be performed, can perform detection of pulse continuously, and detect the latest pulse rate to inform the control unit 120 of this.

Next, description will be made regarding the reception system of the cell phone terminal 1 according to the present embodiment. A reception signal received through the transmission/reception antenna 101 is supplied to the reception unit 103 through the antenna shared device 102. The reception unit 103 performs appropriate band restriction, and AGC (Automatic Gain Control) so as to obtain a reception signal having an appropriate level, performs processing such that the frequency of a reception signal is converted into a constant frequency based on a signal from the local oscillator (frequency synthesizer) 109 to supply the signal after the processing to the baseband processing unit 104.

The baseband processing unit 104 converts a signal from the reception unit 103 into a digital signal, and performs removal of influence such as phasing or the like, determination of the type of the received signal, de-interleaving, correction of errors, and appropriate decoding processing, to separate audio data and the other communication data. Subsequently, the audio data is supplied to the codec 105 configured of a DSP (Digital Signal Processor), and the other communication data, e.g., various types of control information or character data or the like, is supplied to the control unit 120.

The codec 105 subjects the audio data from the baseband processing unit 104 to D/A conversion to generate an analog audio signal, and supplies this to the speaker 106. The speaker 106 is driven by the analog audio signal from the codec 105, and releases audio according to the reception signal.

On the other hand, in a case wherein the communication data supplied from the baseband processing unit 104 to the control unit 120 is control data for the cell phone terminal 1 according to the present embodiment, character data, or the pulse data transmitted from the communication partner (information indicating pulse), or the like, the communication data thereof is temporarily stored in the RAM 123 of the control unit 120, and is employed at the cell phone terminal 1. Also, the other communication data can also be supplied to an external electronic equipment (external device) such as a personal computer or the like connected to the cell phone terminal 1, for example, through an unshown external interface.

Next, description will be made regarding the transmission system of the cell phone terminal 1 according to the present embodiment. The microphone 107 converts collected sound into an analog audio signal, and supplies this to the codec 105. The codec 105 subjects the analog audio signal from the microphone 107 to A/D conversion to generate a digital audio signal, and supplies this to the baseband processing unit 104.

The baseband processing unit 104 encodes and compresses the digital audio signal from the codec 105 by employing a predetermined encoding method, and puts this into predetermined blocks. Also, the baseband processing unit 104 can also integrate digital data for transmission from an external device accepted through an external interface unit 150, digital data for transmission accepted through the key operating unit 132, supplied through the control unit 120, or the pulse data from the control unit 120, or the like into predetermined blocks. The baseband processing unit 104 integrates a compressed digital audio signal, and digital data for transmission from an external device or the like, and supplies these to the transmission unit 108.

The transmission unit 108 generates a modulating signal from the digital data from the baseband processing unit 104, and in order to convert this modulating signal into a predetermined transmission frequency, mixes the modulating signal, and a signal for conversion from the local oscillator 109 to generate a modulating signal for transmission. The modulating signal for transmission generated at the transmission unit 108 is transmitted from the transmission/reception antenna 101 through the antenna shared device 102.

With the cell phone terminal 1 according to the present embodiment including such a reception system and transmission system, the control unit 120 detects an incoming call for its own terminal by monitoring the reception signal from the baseband processing unit 104 at the time of reception standby (at the time of standby). Subsequently, in the case of detecting an incoming call for its own terminal, the control unit 120 controls the ringer 142 to release beep sound (ringer sound), or vibrate the vibrator 143, thereby informing the user of the cell phone terminal 1 of the incoming call for its own equipment.

Subsequently, the user of the cell phone terminal 1 performs an off-hook operation such as pressing a phone conversation start key provided on the key operating unit 132 including a ten key, various types of function keys, and so forth provided in the cell phone terminal 1 according to the present embodiment, and in the case of responding to an incoming call, the control unit 120 connects the communication line by transmitting a connection response, or the like, through the transmission system, thereby enabling phone conversation by the operations of the reception system and transmission system.

Also, in a case of placing an outgoing call (calling) from the cell phone terminal 1 according to the present embodiment, for example, a target partner is determined by inputting a phone number through the dial keys of the key operating unit 132, or selecting a partner's phone number from phonebook data registered beforehand, and an off-hook operation is performed, such as pressing of the phone conversation start key of the key operating unit 132, or the like, whereby a dial operation (calling processing) can be performed.

Thus, the control unit 120 generates a calling request, and transmits this through the transmission system, thereby connecting the communication line to the target partner's phone terminal. Subsequently, upon the incoming call from the partner being sent back, and connection of the communication line being confirmed, as described above, phone conversation can be performed by the operations of the reception system and transmission system.

Also, the cell phone terminal according to the present embodiment can be connected to the Internet, for example, a URL (Uniform Resource Locator) is input and transmitted through a provider function provided by a phone company to obtain a web page or the like, whereby this information can be displayed on the LCD 141 through the control unit 120.

Also, according to the cell phone terminal 1 according to the present embodiment, an arrangement can be made wherein information is input through the key operating unit 132 and LCD 141, e-mail data for transmission is created in the EEPROM 124, this is transmitted to a target partner's mail server through the Internet, or an e-mail addressed to this terminal is received from the mail server to store this in the EEPROM 124, and displays this on the LCD 141 to use this.

Thus, the cell phone terminal 1 according to the present embodiment can perform phone communication and data communication through a wide area network such as a cell phone network or the Internet or the like.

Also, with the communication system according to the present embodiment, at least information indicating pulse arranged to be detected can be transmitted from the sender-side (calling side) cell phone terminal 1 to the receiver-side (called side) cell phone terminal 2. Also, with the receiver-side cell phone terminal 2, the vibrator 143 is driven based on the information indicating the pulse from the cell phone terminal 1, whereby the condition of the user of the cell phone terminal 1 can be informed to the user of the cell phone terminal 2.

Further, with the communication system according to the present embodiment, in a case wherein, with the cell phone terminal 2, the vibrator 143 is driven based on the information indicating the pulse from the cell phone terminal 1, thereby notifying the condition of the user of the cell phone terminal 1, information notifying that the information indicating the pulse has been received and employed can be generated, and can be sent back to the cell phone terminal 1. Also, the cell phone terminal 2 and cell phone terminal 1 have the same configuration, and include the pulse sensor 151, and accordingly, with the receiver-side cell phone terminal 2 as well, pulse of the user can be detected to transmit this to the sender-side cell phone terminal 1.

Operation of the Communication System

Figure 3:
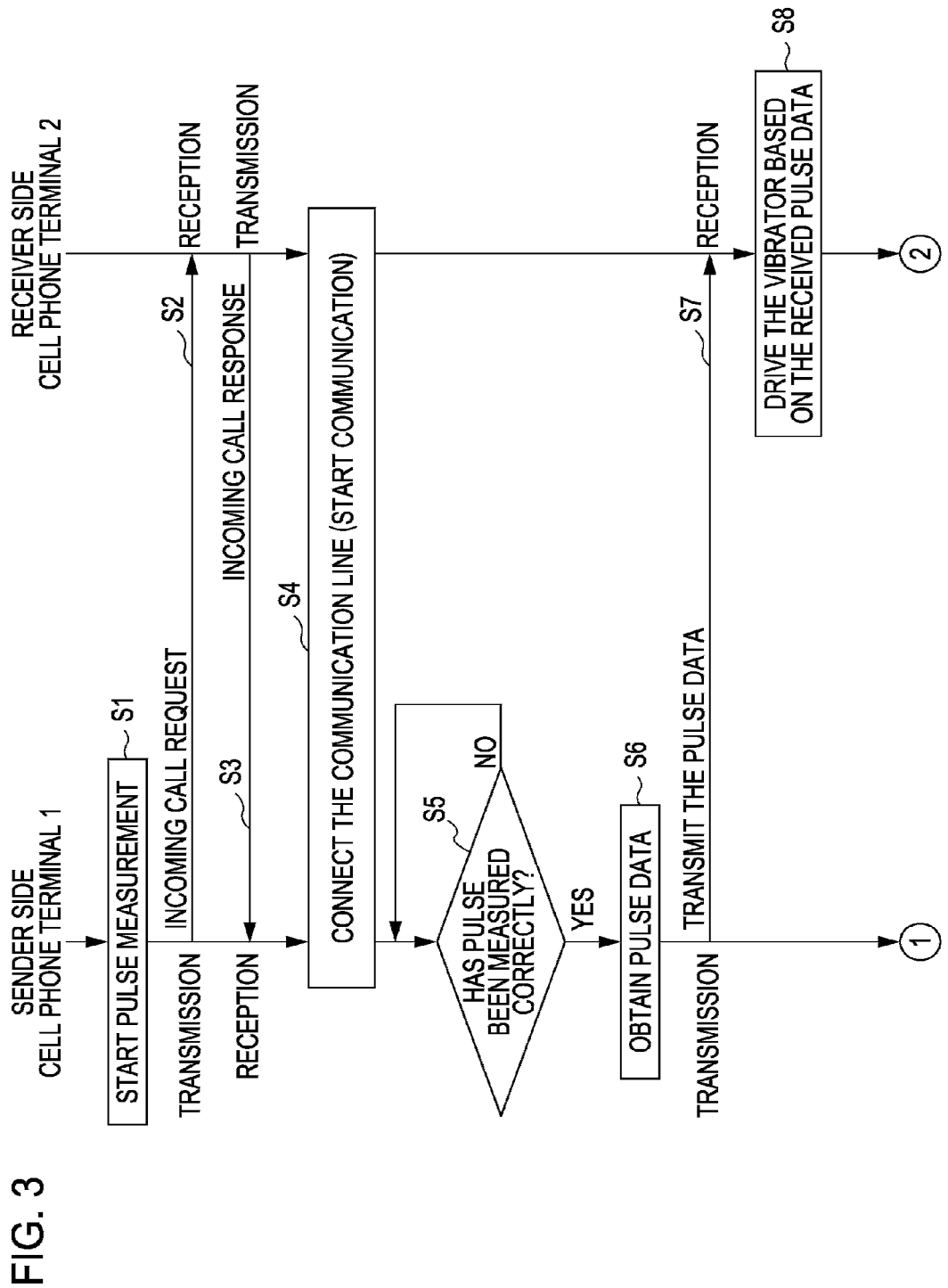
FIG. 3 is a sequence diagram for describing an overview of operation of the communication system according to the first embodiment.
Figure 4:
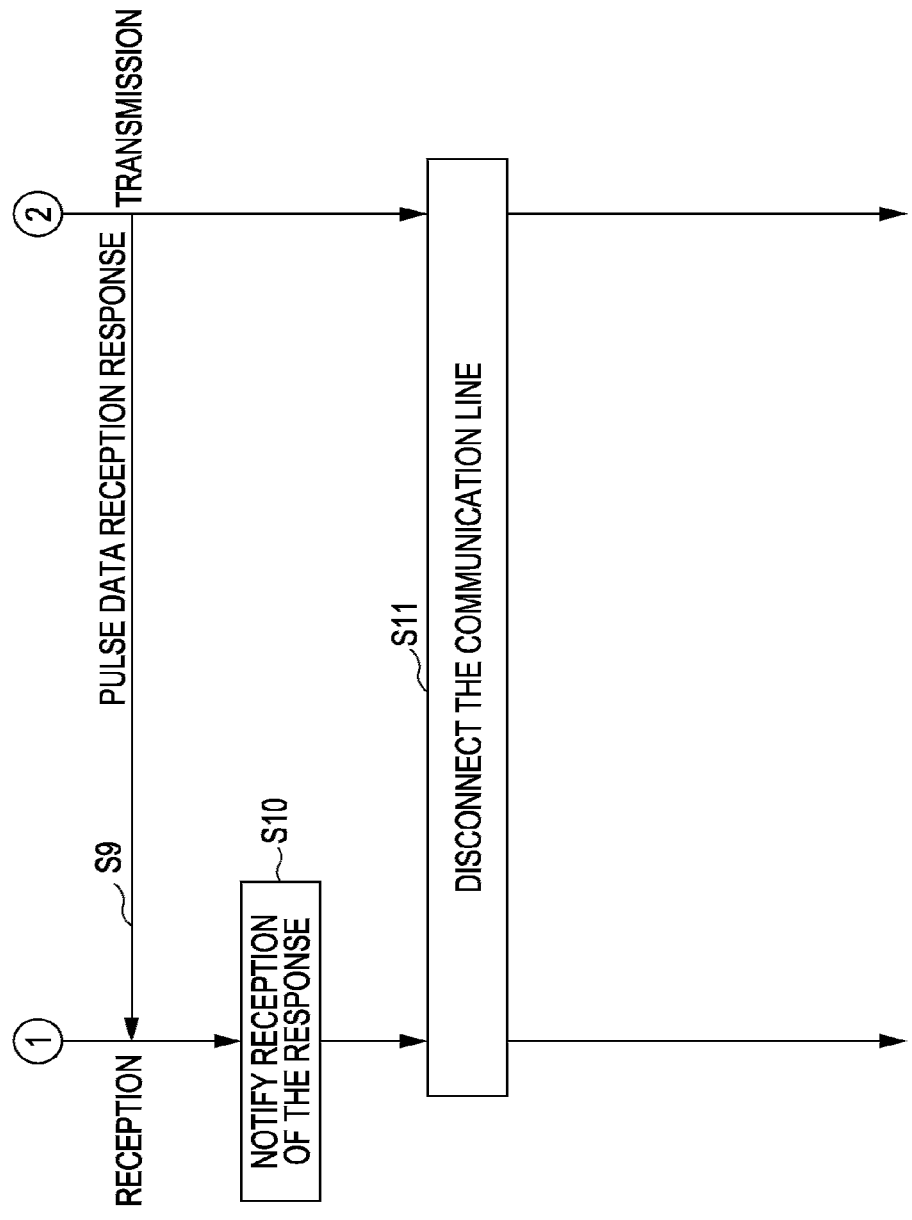
FIG. 4 is a sequence diagram following FIG. 3.
Figure 5:
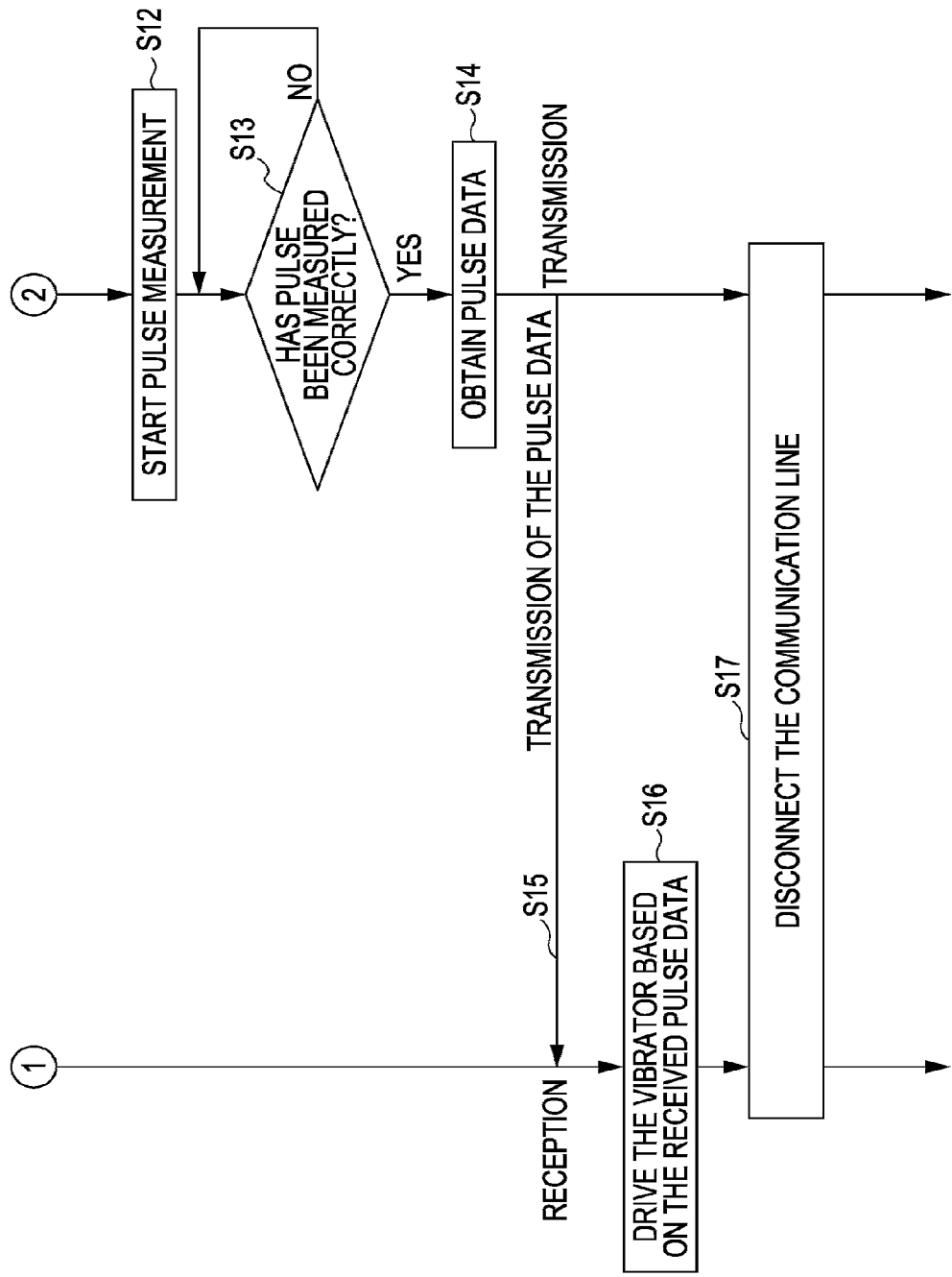
FIG. 5 is another sequence diagram following FIG. 3.

Next, description will be made regarding operation of the communication system according to the first embodiment. FIG. 3 through FIG. 5 are sequence diagrams for describing an overview of operation of the communication system according to the first embodiment. As described above, the sender-side cell phone terminal 1 is an outgoing call source, and the receiver-side cell phone terminal 2 is an incoming call destination.

Subsequently, as shown in FIG. 3, upon the user of the sender-side cell phone terminal 1 picking up the cell phone terminal 1 and coming into contact with the pulse sensor 151 by a finger or the like to ring a number, the pulse sensor 151 of the cell phone terminal 1 starts processing for measuring the pulse of the user (step S1). Subsequently, the control unit 120 of the cell phone terminal 1 accepts dial input from the user, selection input of a partner from the phonebook data, or the like through the key operating unit 132, generates an incoming call request as to a target communication partner (cell phone terminal 2 in this example), and transmits this to the cell phone terminal 2 through the baseband processing unit 104, transmission unit 108, antenna shared device 102, and transmission/reception antenna 101 (step S2).

Upon receiving the incoming call request from the cell phone terminal 1 through the transmission/reception antenna 101, antenna shared device 102, reception unit 103, and baseband processing unit 104, the control unit 120 of the receiver-side cell phone terminal 2 drives the ringer 142 or vibrator 143 thereof to inform the user of the cell phone terminal 2 that there is an incoming call by a ring tone or vibration. Subsequently, upon accepting an off-hook operation for responding to the incoming call, the control unit 120 of the cell phone terminal 2 generates an incoming call response, and transmits this to the cell phone terminal 1 serving as the outgoing call source (step S3).

Thus, the communication line is connected between the cell phone terminal 1 and cell phone terminal 2, thereby enabling phone conversation (step S4). That is to say, as described above, phone conversation can be performed between the cell phone terminal 1 and cell phone terminal 2 through the transmission/reception antenna 101, antenna shared device 102, reception unit 103, baseband processing unit 104, codec 105, receiver 106, transmitter 107, and transmission unit 108, of both of the cell phone terminals.

Thus, following phone conversation being enabled, the control unit 120 of the sender-side cell phone terminal 1 determines whether or not the pulse of the user has been measured accurately (step S5). Specifically, determination is made whether or not pulse measurement has been performed during a predetermined period wherein the pulse of the user can be measured accurately.

Subsequently, the determination processing in step S5 is repeatedly performed until the pulse of the user can be measured accurately. When determination is made in the determination processing in step S5 that the pulse of the user has been measured accurately, the control unit 120 of the cell phone terminal 1 obtains the measured pulse data (step S6). The control unit 120 generates pulse data for transmission from the pulse data obtained in step S6, and transmits this to the cell phone terminal 2 through the baseband processing unit 104, transmission unit 105, antenna shared device 102, and transmission/reception antenna 101 (step S7).

Upon receiving the pulse data from the cell phone terminal 1, the control unit 120 of the cell phone terminal 2 drives the vibrator 143 by controlling the vibrator 143 to have the same number of vibrations per unit time as the number of times indicated by the pulse data (step S8). Subsequently, the cell phone terminal 2 proceeds to the processing shown in FIG. 4, and generates a pulse data reception response indicating that the pulsed data from the cell phone terminal 1 has been received and employed, and transmits this to the cell phone terminal 1 (step S9).

In the case of receiving the pulse data reception response from the cell phone terminal 2, the cell phone terminal 1 informs the user that the response has been received (step S10). Specifically, the cell phone terminal 1 vibrates the vibrator 143, drives the ringer 142 to release predetermined ringer sound, or makes an unshown LED (Light Emitting Diode) emit light, thereby notifying that the pulse data reception response has been received.

Subsequently, in a case wherein either the cell phone terminal 1 or cell phone terminal 2 performs a line disconnection operation (on-hook operation), the communication line connected in step S4 shown in FIG. 3 is disconnected (the communication line is released), and the series of the processing is ended (step S11).

Thus, the sender-side cell phone terminal 1 and receiver-side cell phone terminal 2 can perform phone conversation by connecting the communication line. Further, the pulse data of the user of the sender-side cell phone terminal 1 is transmitted from the cell phone terminal 1 to the receiver-side cell phone terminal 2, whereby the vibrator 143 can be driven according to the pulse data at the cell phone terminal 2.

As described above, the pulse of the user of the cell phone terminal 1 is changed according to the condition such as the emotion or the like of the user, so the user of the cell phone terminal 2 can know the condition of the user of the cell phone terminal 1 according to the vibrating state of the vibrator thereof.

Note that an arrangement may be made wherein, with the operation of the communication system described with reference to FIG. 3 and FIG. 4, the processing from step S5 to step S10 is repeatedly performed at predetermined timing until the communication line is disconnected in step S11. In such a case, the change state of the pulse of the user of the cell phone terminal 1 changed during phone conversation may be informed to the user of the cell phone terminal 2.

Also, the vibrator 143 driven in step S8 may be driven until the communication line is disconnected, or may be driven until a predetermined period elapses, and stopped thereafter. Also, an arrangement may be made wherein, in a case of accepting input of stop instructions from the user of the cell phone terminal 2 through the key operating unit 132, driving of the vibrator 143 is stopped.

Also, with the operation of the communication system described with reference to FIG. 3 and FIG. 4, an arrangement has been made wherein, in step S8 the vibrator 143 is driven according to the pulse data from the cell phone terminal 1, following which a pulse data reception response is automatically generated and transmitted to the cell phone terminal 1. However, the present invention is not restricted to this. For example, an arrangement may be made wherein, following step S8, in a case of accepting operation input from the user of the cell phone terminal 1, a pulse data reception response is generated and transmitted to the cell phone terminal 1.

Note here that the pulse data reception response is data having a predetermined format indicating that pulse data has been received and employed. Alternatively, an arrangement may be made wherein text data indicating that pulse data has been received and employed is generated as a pulse data reception response, and is transmitted to the cell phone terminal 1. In this case, the cell phone terminal 1 has to receive the pulse data reception response which is the text data to display this on the LCD 141.

Also, an arrangement may be made wherein, instead of sending the pulse data reception response indicating that pulse data has been received and employed to the cell phone terminal 1 from the cell phone terminal 2, the pulse of the user of the receiver-side cell phone terminal 2 is measured, and this is transmitted to the sender-side cell phone terminal 1.

FIG. 5 is a sequence diagram for describing the operation of the communication system according to the present embodiment in a case wherein, instead of sending back the pulse data reception response, the pulse of the user of the receiver-side cell phone terminal 2 is measured, and this is transmitted to the sender-side cell phone terminal 1.

In this case as well, the processing from step S1 to step S8 shown in FIG. 3 is performed without change as described above. Subsequently, in this case, following the processing in step S8, the flow proceeds to the processing shown in FIG. 5, where the pulse sensor 151 of the cell phone terminal 2 starts processing for measuring the pulse of the user of the cell phone terminal 2 (step S12).

Subsequently, the control unit 120 of the cell phone terminal 2 determines whether or not the pulse of the user of the cell phone terminal 2 has been measured accurately (step S13). The processing in step S13 is, as with the processing in step S5 shown in FIG. 3, processing for determining whether or not pulse measurement has been performed during a predetermined period wherein the pulse of the user of the cell phone terminal 2 can be measured accurately.

Subsequently, the determination processing in step S13 is repeatedly performed until the pulse of the user can be measured accurately. When determination is made in the determination processing in step S13 that the pulse of the user of the cell phone terminal 2 has been measured accurately, the control unit 120 of the cell phone terminal 2 obtains the measured pulse data (step S14). The control unit 120 generates pulse data for transmission from the pulse data obtained in step S14, and transmits this to the cell phone terminal 1 through the baseband processing unit 104, transmission unit 105, antenna shared device 102, and transmission/reception antenna 101 (step S15).

Upon receiving the pulse data from the cell phone terminal 2, the control unit 120 of the cell phone terminal 1 drives the vibrator 143 by controlling the vibrator 143 to have the same number of vibrations per unit time as the number of times indicated by the pulse data (step S16). Subsequently, in a case wherein either the cell phone terminal 1 or cell phone terminal 2 performs a line disconnection operation (on-hook operation), the communication line connected in step S4 shown in FIG. 3 is disconnected (the communication line is released), and the series of the processing is ended (step S17).

Thus, an arrangement may also be made wherein the pulse data of the user of the cell phone terminal 2 is transmitted to the cell phone terminal 1 from the receiver-side cell phone terminal 2, whereby the user of the cell phone terminal 1 can know the condition of the user of the cell phone terminal 2.

Also, in the case of the example shown in FIG. 5 as well, with the operation of the communication system described with reference to FIG. 3 and FIG. 5, the processing in step S5 through step S8, and the processing in step S12 through step S16 may be repeatedly performed at predetermined timing until the communication line is disconnected in step S17. In such a case, the state of change in the pulse of each user of the cell phone terminal 1 and cell phone terminal 2, which has changed during phone conversation, can be notified to the communication partner.

Also, the vibrators 143 of the cell phone terminal 2 and cell phone terminal 1 arranged to be driven in step S8 and step S16 respectively may be driven until the communication line is disconnected, or may be driven until a predetermined period elapses, and then stopped thereafter. Also, an arrangement may be made wherein, in a case of accepting input of stop instructions from the user through the key operating unit 132, driving of the vibrator 143 is stopped.

Also, with the operation of the communication system described with reference to FIG. 3 and FIG. 5, an arrangement has been made wherein, in step S8 the vibrator 143 is driven according to the pulse data from the cell phone terminal 1, following which the pulse of the user of the cell phone terminal 2 is automatically measured and transmitted to the cell phone terminal 1. However, the present invention is not restricted to this. For example, an arrangement may also be made wherein, following step S8, in a case of accepting operation input from the user of the cell phone terminal 2, the pulse of the user of the cell phone terminal 2 is measured and transmitted to the cell phone terminal 1.

Individual Operation of Cell Phone Terminals 1 and 2

Next, description will be made separately regarding the operation of the sender-side cell phone terminal 1 and the operation of the receiver-side cell phone terminal 2, which make up the communication system according to the first embodiment. Hereafter, as described with reference to FIG. 3 and FIG. 5, description will be made regarding the operation in the case of exchanging pulse data mutually between the sender-side cell phone terminal 1 and receiver-side cell phone terminal 2.

Operation of the Sender-Side Cell Phone Terminal 1

Figure 6:
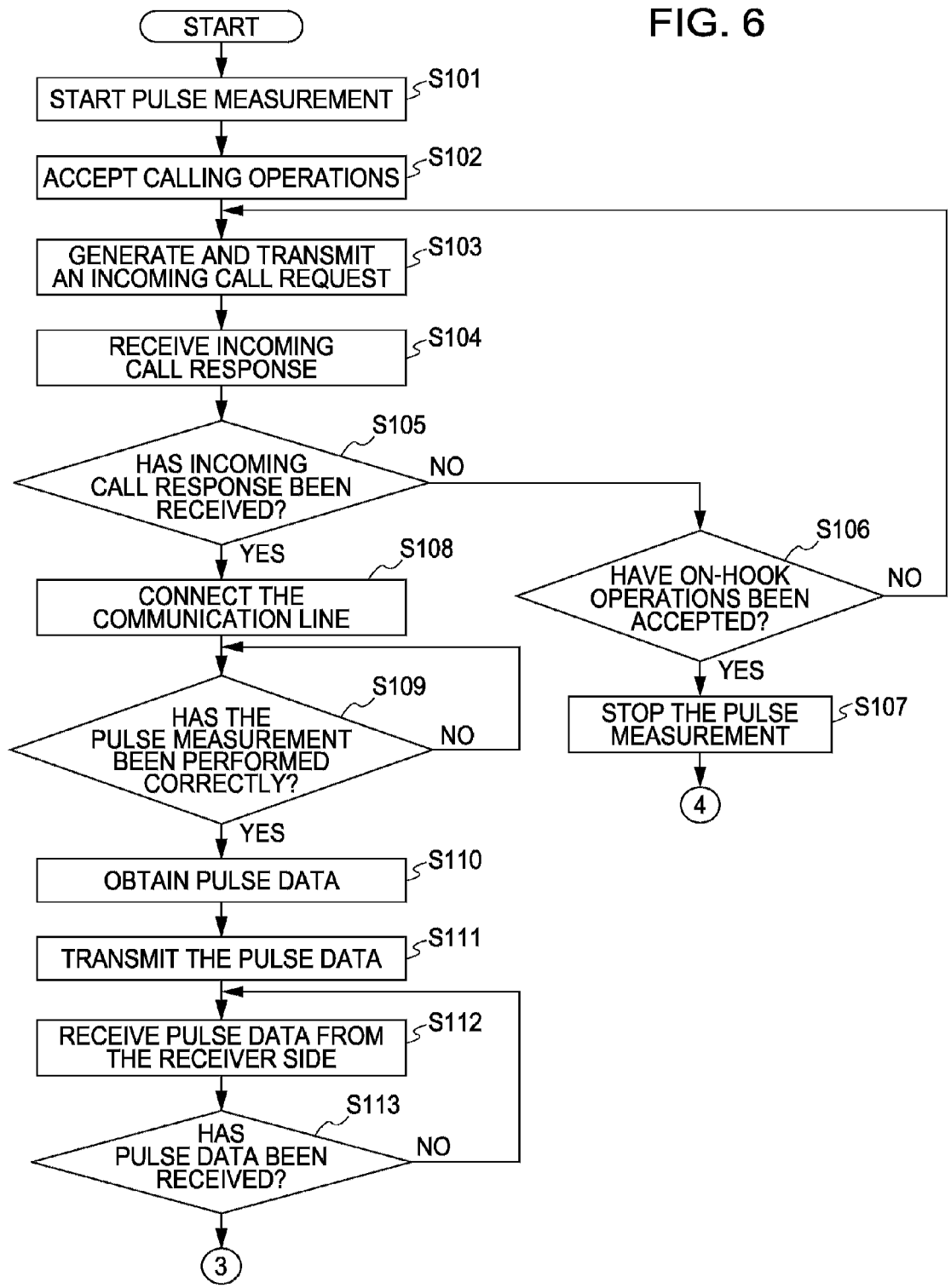
FIG. 6 is a flowchart for describing operation of a sender-side cell phone terminal 1 with the first embodiment.
Figure 7:
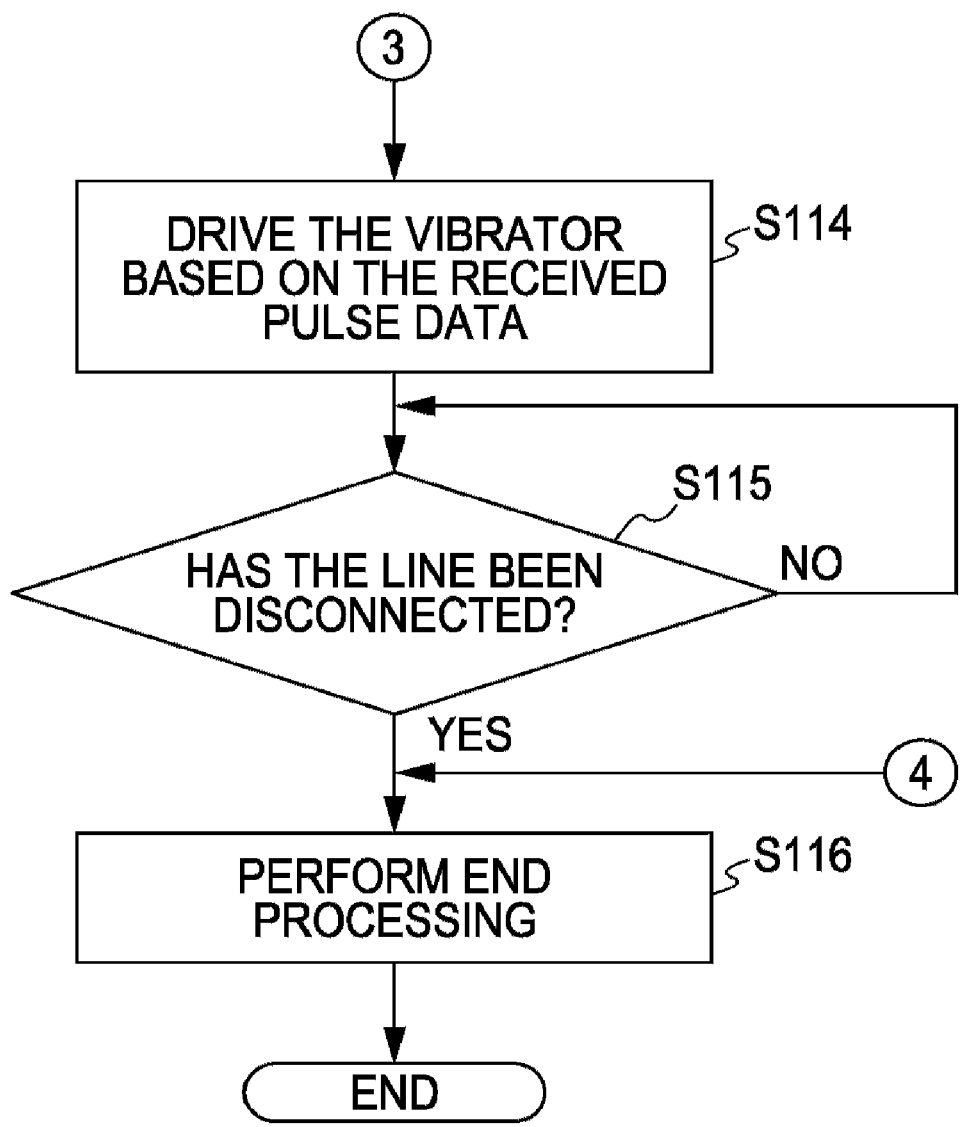
FIG. 7 is a flowchart following FIG. 6.

FIGS. 6 and 7 are flowcharts for describing the operation of the sender-side cell phone terminal 1 with the communication system according to the present embodiment. The processing in the flowcharts shown in FIG. 6 and FIG. 7 is executed principally at the control unit 120 of the cell phone terminal 1 in the case of the user picking up the sender-side cell phone terminal 1, and coming into contact with the pulse sensor 151 by a finger or the like.

Upon a finger or the like of the user coming into contact with the pulse sensor 151, the pulse sensor 151 starts measurement of the pulse of the user (step S101). Next, the control unit 120 accepts calling operations from the user through the key operating unit 132 (step S102), generates an incoming call request according to the accepted operations, and transmits this to the cell phone terminal 2 which is a target partner (step S103).

Subsequently, the control unit 120 receives an incoming call request from the cell phone terminal 2 (step S104), and determines whether or not the incoming call response has been received (step S105). When determination is made in the determination processing in step S105 that the incoming call response has not been received yet, the control unit 120 determines whether or not an operation for canceling the outgoing call (on-hook operation) has been accepted through the key operating unit 132 (step S106).

When determination is made in the determination processing in step S106 that an on-hook operation has not been accepted, the control unit 120 repeats the processing from step S103, and continues transmission of an incoming call request. Also, when determination is made in the determination processing in step S106 that an on-hook operation has been accepted, the phone conversation with the cell phone terminal 2 has been given up, so the control unit 120 controls the pulse sensor 151 to stop pulse measurement (step S107). Subsequently, the flow proceeds to the processing in step S116 in FIG. 7, where processing for generating an incoming call request and transmitting this is executed (step S116), and the processing shown in FIG. 6 and FIG. 7 is ended.

Subsequently, when determination is made in the determination processing in step S105 that the incoming call response has been received, the control unit 120 connects the communication line so as to perform phone conversation (step S108). Following connection of the communication line, the control unit 120 determines whether or not the pulse of the user of the cell phone terminal 1 has been measured accurately (step S109).

When determination is made in the determination processing in step S109 that the pulse of the user of the cell phone terminal 1 has not been able to be measured accurately, the control unit 120 repeats the processing in step S109, and goes to a standby state until the pulse can be measured accurately. Subsequently, when determination is made in the determination processing in step S109 that the pulse of the user of the cell phone terminal 1 has been measured accurately, the control unit 120 obtains the measured pulse data (step S110). The control unit 120 generates pulse data for transmission from the obtained pulse data, and transmits this to the receiver-side cell phone terminal 2 through the connected communication line (step S111).

Next, the control unit 120 receives the pulse data from the receiver-side cell phone terminal 2 (step S112), and determines whether or not the pulse data from the cell phone terminal 2 has been received (step S113). When determination is made in the determination processing in step S113 that the pulse data from the cell phone terminal 2 has not been received, the control unit 120 repeats the processing from step S112, and receives the pulse data from the cell phone terminal 2.

When determination is made in the determination processing in step S113 that the pulse data from the cell phone terminal 2 has been received, the control unit 120 drives the vibrator 143 by controlling the vibrator 143 to have the same number of vibrations per unit time as the number of times indicated by the received pulse data (step S114).

Subsequently, the control unit 120 determines whether or not the communication line has been disconnected (step S115). When determination is made in the determination processing in step S115 that the communication line has not been disconnected yet, the control unit 120 repeats the determination processing in step S115, and goes to a standby state until the communication line is disconnected.

Also, when determination is made in the determination processing in step S115 that the communication line has been disconnected, the control unit 120 executes processing for ending the series of processing such as releasing of the communication line, and so forth (step S116), and ends the processing shown in FIG. 6 and FIG. 7.

Note that, when determination is made in the determination processing in step S115 that the communication line has not been disconnected, the control unit 120 performs the processing from step S109 shown in FIG. 6, thereby continuously measuring the pulse of each user of the cell phone terminal 1 and cell phone terminal 2 during connection of the communication line, and enabling pulse data to be exchanged. In such a case, even in a case wherein the pulse is changed during phone conversation, this can be notified in real time.

Operation of the Receiver-Side Cell Phone Terminal 2

Figure 8:
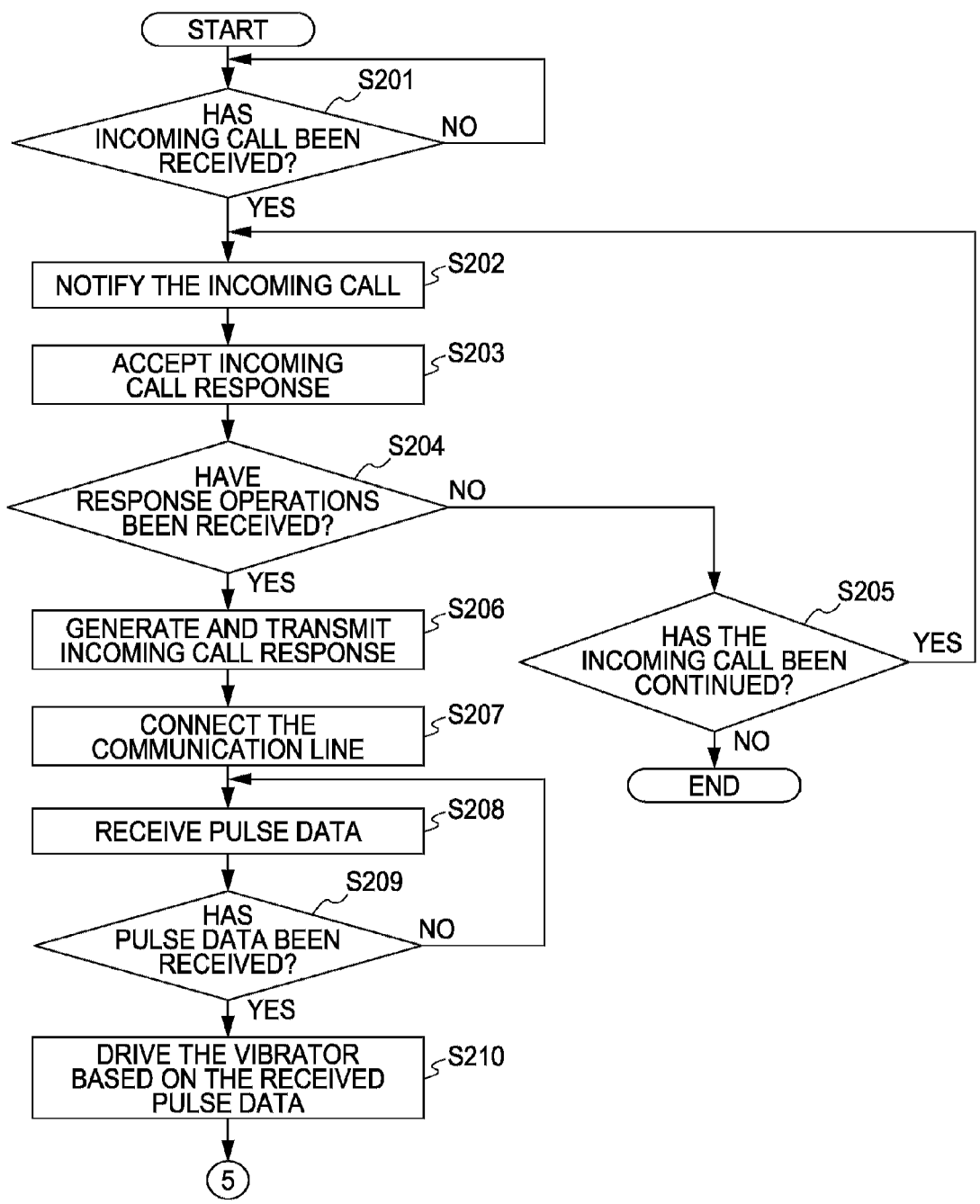
FIG. 8 is a flowchart for describing operation of a receiver-side cell phone terminal with the first embodiment.
Figure 9:
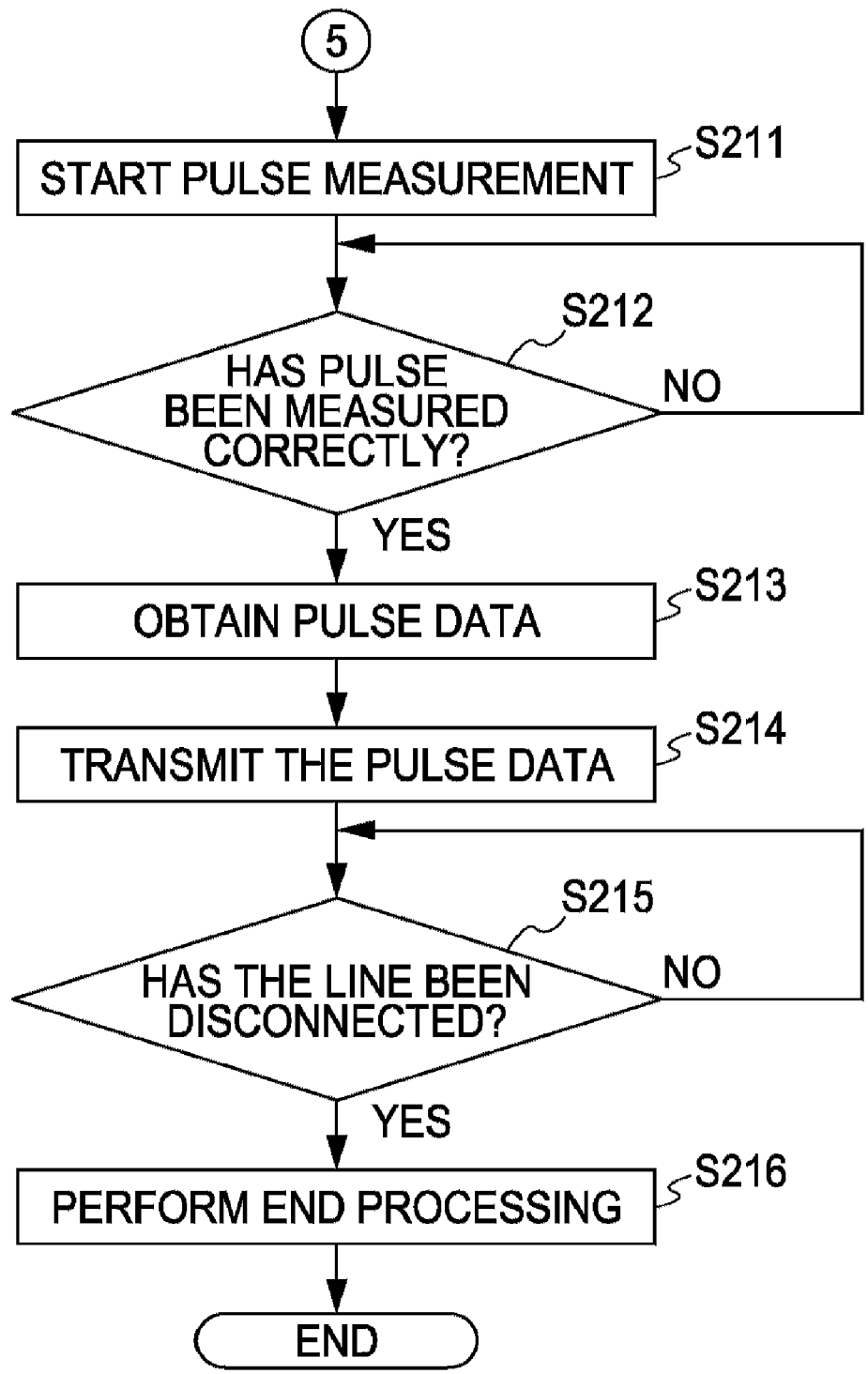
FIG. 9 is a flowchart following FIG. 8.

FIGS. 8 and 9 are flowcharts for describing the operation of the receiver-side cell phone terminal 2 with the communication system according to the present embodiment. The processing in the flowcharts shown in FIG. 8 and FIG. 9 is processing executed principally at the control unit 120 of the cell phone terminal 2 when the receiver-side cell phone terminal 2 is turned on, and is in a standby state.

The control unit 120 of the cell phone terminal 2 determines whether or not there is an incoming call for this terminal (step S201), and when determination is made that there is no incoming call, the control unit 120 repeats the processing in step S201, and goes to an incoming-call standby state for the terminal. When determination is made in the determination processing in step S201 that there is an incoming call for the terminal, the control unit 120 controls the ringer 142 or vibrator 143 to inform the user of the cell phone terminal 2 by audio or vibration that there is an incoming call for the terminal (step S202).

Subsequently, the control unit 120 accepts an operation for responding to an incoming call through the key operating unit 132 (off-hook operation) (step S203), and determines whether or not an operation for responding to the incoming call has been accepted (step S204). When determination is made in the determination processing in step S204 that an operation for responding to the incoming call has not been accepted, the control unit 120 determines whether or not the incoming call for the terminal has been continued based on the a signal to be received (step S205).

When determination is made in the determination processing in step S205 that the incoming call has been continued, the control unit 120 repeats the processing from step S202. That is to say, the control unit 120 continues notification of the incoming call, and accepts an operation for responding to the incoming call from the user. When determination is made in the determination processing in step S205 that the incoming call has not been continued, the incoming call for the terminal has been eliminated, so the processing shown in FIG. 8 and FIG. 9 is ended.

Subsequently, when determination is made in the determination processing in step S204 that an operation for responding to the incoming call has been accepted, the control unit 120 generates an incoming call response, and transmits this to the sender-side cell phone terminal 1 through the baseband processing unit 104, transmission unit 108, antenna shared device 102, and transmission/reception antenna 101 (step S206).

Subsequently, the cell phone terminal 2 connects the communication line with the cell phone terminal 1 (step S207), thereby enabling phone conversation with the cell phone terminal 1 to be performed. Subsequently, the control unit 120 receives the pulse data of the user transmitted from the sender-side cell phone terminal 1 (step S208), and determines whether or not the pulse data from the cell phone terminal 1 has been received (step S209).

When determination is made in the determination processing in step S209 that the pulse data from the cell phone terminal 1 has not been received, the control unit 120 repeats the processing from step S208, and goes to a reception standby state of the pulse data from the cell phone terminal 1. When determination is made in the determination processing in step S209 that the pulse data from the cell phone terminal 1 has been received, the control unit 120 drives the vibrator 143 by controlling the vibrator 143 to have the same number of vibrations per unit time as the number of times indicated by the received pulse data (step S210).

Subsequently, the flow proceeds to the processing shown in FIG. 9, where the control unit 120 of the cell phone terminal 2 responds to the incoming call request from the cell phone terminal 1, and starts processing for measuring the pulse of the user of the cell phone terminal 2 which is in a state wherein phone conversation is performed, through the pulse sensor 151 (step S211). Subsequently, the control unit 120 determines whether or not the pulse of the user of the cell phone terminal 2 has been measured accurately (step S212).

When determination is made in the determination processing in step S212 that the pulse of the user has not been measured accurately, the control unit 120 repeats the processing in step S212, and goes to a standby state until the pulse of the user is measured accurately. When determination is made in the determination processing in step S212 that the pulse of the user of the cell phone terminal 1 has been measured accurately, the control unit 120 obtains the latest pulse data (step S213).

Subsequently, the control unit 120 generates pulse data for transmission from the pulse data obtained in step S213, and transmits this to the sender-side cell phone terminal 1 through the connected communication line (step S214). Subsequently, the control unit 120 goes to a standby state until the communication line is disconnected (step S215), and when determination is made in the determination processing in step S215 that the communication line has been disconnected, the control unit 120 executes end processing for ending phone conversation processing (step S216), and ends the processing shown in FIG. 8 and FIG. 9.

Note that, when determination is made in the determination processing in step S215 that the communication line has not been disconnected, the control unit 120 performs the processing from step S208 shown in FIG. 8, thereby measuring the pulse of each user of the cell phone terminal 1 and cell phone terminal 2 continuously during connecting of the communication line, and enabling pulse data to be exchanged. In such a case, even in a case wherein the pulse is changed during phone conversation, this can be notified in real time.

Thus, with the communication system according to the first embodiment, the processing described with reference to FIG. 6 and FIG. 7 can be executed at the sender-side cell phone terminal 1, and the processing described with reference to FIG. 8 and FIG. 9 can be executed at the receiver-side cell phone terminal 2. Thus, pulse data indicating the condition of the user can be exchanged mutually between the sender-side cell phone terminal 1 and receiver-side cell phone terminal 2. Accordingly, the user of the cell phone terminal 2 can know the condition of the user of the cell phone terminal 1, and the user of the cell phone terminal 1 can know the condition of the user of the cell phone terminal 2.

Note that, with the flowcharts in FIG. 6 through FIG. 9, description has been made assuming that the pulse data of the user is exchanged mutually between the sender-side cell phone terminal 1 and receiver-side cell phone terminal 2, but the present invention is not restricted to this.

For example, with the processing shown in FIG. 8 and FIG. 9 executed by the receiver-side cell phone terminal 2, instead of the processing in step S211 through step S214, a pulse data reception response indicating that the pulse data from the cell phone terminal 1 has been received is generated and transmitted. On the other hand, with the processing shown in FIG. 6 and FIG. 7 executed by the sender-side cell phone terminal 1, instead of the processing in step S112 through step S114, the pulse data reception response from the receiver-side cell phone terminal 2 is received, and when receiving this, receiving this is notified through the ringer 142 or vibrator 143 or the like.

Thus, the pulse data of the user of the sender-side cell phone terminal 1 is transmitted to the receiver-side cell phone terminal 2, whereby only notification wherein the pulse data has been received and employed can be received from the receiver-side cell phone terminal 2. That is to say, the sender-side cell phone terminal 1 can be informed that the pulse data from the sender-side cell phone terminal 1 has been received and employed at the cell phone terminal 2 without transmitting the pulse data of the user of the receiver-side cell phone terminal 2 to the sender-side cell phone terminal 1.

Note here that description has been made regarding the case wherein the vibration of the vibrator is controlled based on the pulse data of the user of the communication partner's cell phone terminal, but the present invention is not restricted to this. For example, if a cell phone terminal includes an LED, according to transmitted pulse data, the on and off cycles of the LED may be controlled, or the display and hidden cycles of an image on the LCD 141 may be controlled. Also, ringer sound to be released may be changed periodically according to received pulse data by controlling the ringer 142.

First Modification of First Embodiment

With the above-described first embodiment, description has been made assuming that the vibrator 143 which is built into the cell phone terminals 1 and 2 is controlled based on the received pulse data from the partner. However, the present invention is not restricted to this. A vibrator which is controlled based on the received pulse data may be provided outside cell phone terminals.

FIGS. 10A and 10B are diagrams for describing an example in a case wherein a vibrator or the like which can be controlled based on the received pulse data is provided on a so-called cell-phone strap to be attached to a cell phone terminal.

As shown in FIGS. 10A and 10B, with cell phone terminals 1A and 2A in this example, as with the case of the cell phone terminals 1 and 2 described with reference to FIG. 1, in the case of being held by the user, the pulse sensor 151 is provided at a position with which a finger or the like of the user comes into contact. Subsequently, with the cell phone terminals 1A and 2A, a cell-phone strap-type vibrator 3 is attached by a string-like attachment medium, as with the case of a normal cell-phone strap.

Also, a vibrator and LED are built into the cell-phone strap-type vibrator 3, as described later in detail. Subsequently, the cell-phone strap-type vibrator 3 receives information from a cell phone terminal to which it is attached by short-range wireless communication, whereby driving of the vibrator and LED provided in itself can be controlled.

Therefore, as described below, the cell phone terminals 1A and 2A in this example, and the cell-phone strap-type vibrator 3 attached thereto can perform communication by short-range wireless communication.

Also, with the communication system made up of the cell phone terminals 1A and 2A in this example as well, an arrangement may be made wherein the sender-side cell phone terminal 1A measures the pulse of the user at the time of phone conversation, generates pulse data from a measured and obtained pulse value, and transmits this to the receiver-side cell phone terminal 2A.

On the other hand, an arrangement may be made wherein the receiver-side cell phone terminal 2A receives the pulse data from the cell phone terminal 1A, and according to this, wirelessly controls the cell-phone strap-type vibrator 3 attached to this terminal, and driving of the vibrator and LED of the cell-phone strap-type vibrator is controlled. Also, as with the case of the above-described cell phone terminal 2, in a case wherein the pulse data from the cell phone terminal 1A has been received and employed, the receiver-side cell phone terminal 2A can also send back a response notifying this back to the cell phone terminal 1A. Thus, the sender-side cell phone terminal 1 can recognize that the pulse data transmitted from the terminal has been properly received and used.

Configuration of Equipment Employed for First Modification of First Embodiment

Next, description will be made regarding the configurations of the cell phone terminals 1A and 2A employed for the first modification, and the configuration of the cell-phone strap-type vibrator 3.

Configurations of Cell Phone Terminals 1A and 2A

Figure 11:
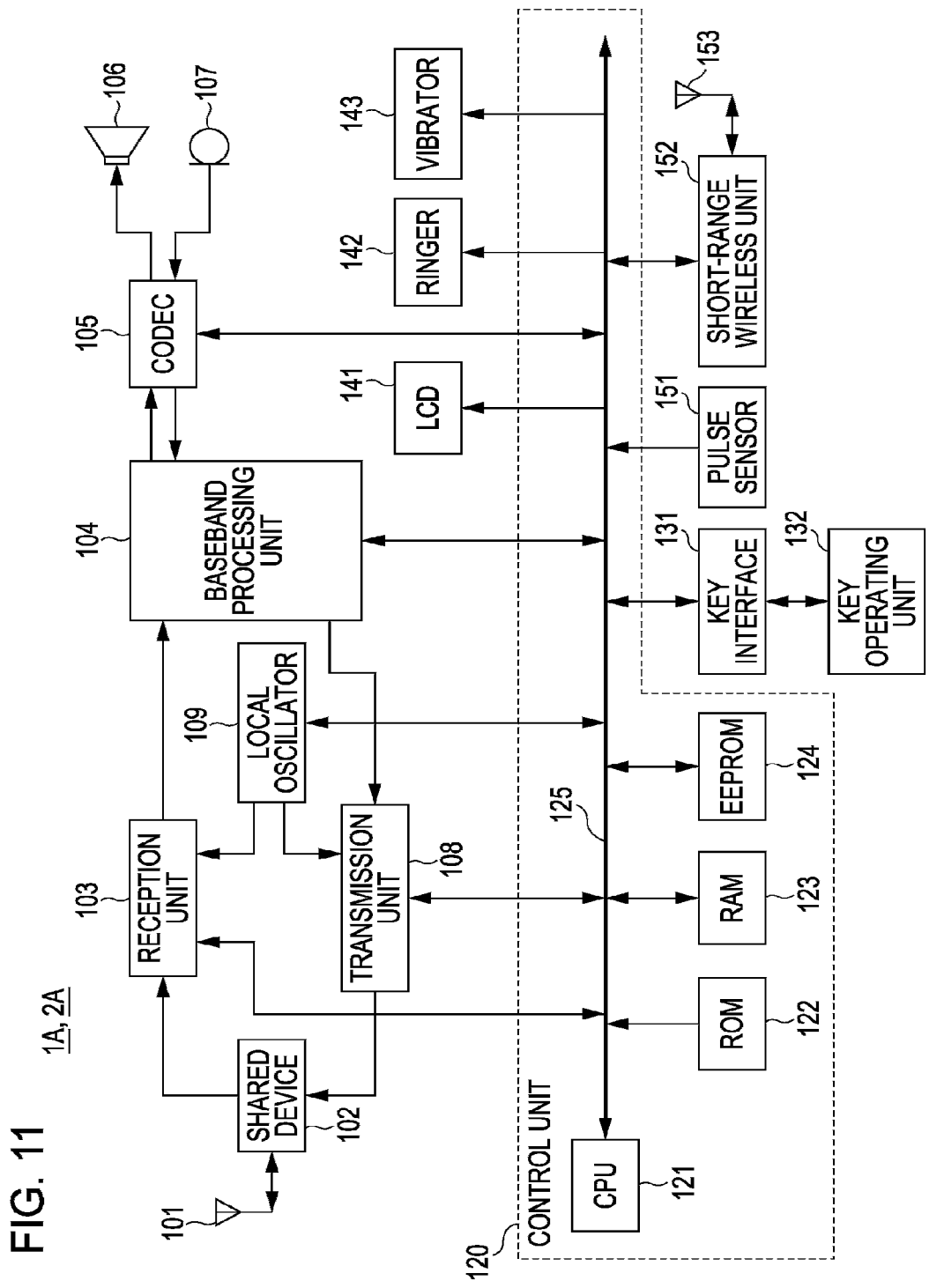
FIG. 11 is a block diagram for describing the configuration of cell phone terminals employed in a first modification.

FIG. 11 is a block diagram for describing the configurations of the cell phone terminals 1A and 2A employed for the first modification. In the case of this modification as well, the cell phone terminal 1A and cell phone terminal 2A are configured in the same way, so hereafter, description will be made as the configuration of the cell phone terminal 1A.

As shown in FIG. 11, the cell phone terminals 1A and 2A in this example are configured in the same way as the cell phone terminals 1 and 2 shown in FIG. 2 except that a short-range wireless unit 152 and short-range wireless communication antenna 153 are provided. Therefore, in order to avoid redundancy of description, with the cell phone terminals 1A and 2A according to the first modification shown in FIG. 11, the components configured in the same way as those in the cell phone terminals 1 and 2 according to the first embodiment shown in FIG. 2 are denoted with the same reference numerals, and detailed description thereof will be omitted.

With the cell phone terminal 1A according to the first modification of the first embodiment shown in FIG. 11, the short-range wireless unit 152 and short-range wireless communication antenna 153 are for performing short-range wireless communication between the cell-phone strap-type vibrator 3 attached to the terminal. With the short-range wireless unit 152 and short-range wireless communication antenna 153, various types of short-range wireless communication techniques, for example, such as Bluetooth and so forth, are employed.

In accordance with the control of the control unit 120, the short-range wireless unit 152 can generate a transmission signal to be transmitted by short-range wireless communication by performing processing such as modulating a signal including information to be transmitted from its terminal, and transmit this through the antenna 153. Also, the short-range wireless unit 152 can perform processing such as demodulating a reception signal received through the antenna 153, or the like to generate a signal having a format which can be processed by the control unit 120, and supply this to the control unit 120.

Configuration of Cell-Phone Strap-Type Vibrator 3

Figure 12:
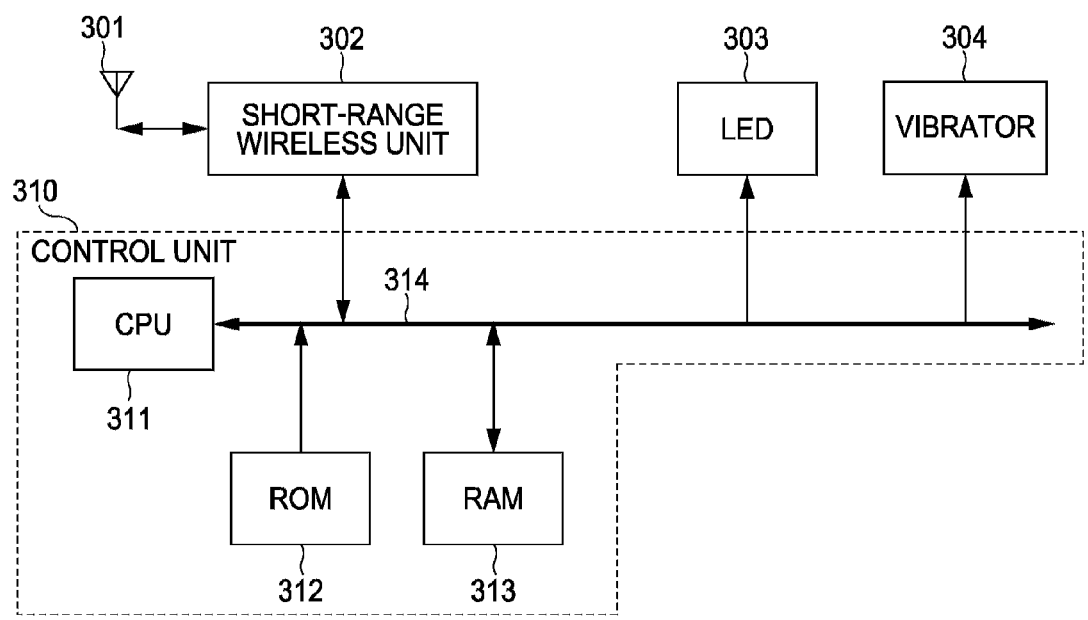
FIG. 12 is a block diagram for describing the configuration of a cell-phone strap-type vibrator according to the first modification.

FIG. 12 is a block diagram for describing the configuration of the cell-phone strap-type vibrator 3 according to the first modification. AS shown in FIG. 12, the cell-phone strap-type vibrator 3 in this example includes a short-range wireless communication antenna 301, short-range wireless unit 302, LED 303, vibrator 304, and control unit 310.

The control unit 310 is for controlling the respective units of the cell-phone strap-type vibrator 3, and is, as shown in FIG. 12, a microcomputer formed of a CPU 311, ROM 312, and RAM 313 being connected via a CPU bus 314.

Here, the CPU 311 serves as a main component for control with the cell-phone strap-type vibrator 3, such as executing a program stored and held in later-described ROM 312, generating a control signal to be supplied to the respective units, and supplying this to the respective units, receiving various types of data from the respective units, and processing this, and so forth. The ROM 312 stores and holds, as described above, a program executed by the CPU 311, and data for processing. Also, the RAM 313 is employed principally as a work area, such as temporarily storing intermediate results with various types of processing, or the like.

The antenna 301 and short-range wireless unit 302 are for performing communication between the cell phone terminal on which its own equipment is mounted, as with the antennas 153 and short-range wireless units 152 of the cell phone terminals 1A and 2A described with reference to FIG. 11.

Specifically, the short-range wireless unit 302 can perform processing, such as receiving a transmission signal addressed to the equipment through the antenna 301, and demodulating this, and so forth, to generate a signal (reception signal) which can be processed at the control unit 310, and supply this to the control unit 310. Also, in accordance with the control of the control unit 310, the short-range wireless unit 302 can generate a transmission signal to be transmitted by short-range wireless communication by performing processing, such as modulating a signal including information to be transmitted from the equipment, and transmit this through the antenna 301.

Also, the LED 303 receives supply of driving power to emit light, of which the on and off are controlled in accordance with the control of the control unit 310. Also, the vibrator 304 receives supply of driving power to generate vibration, and can change a vibration generation pattern in accordance with the control of the control unit 310. As described below, the cell-phone strap-type vibrator 3 in this example receives a control signal from the cell phone terminal on which the equipment is mounted, and according to this, driving of the LED 303 and vibrator 304 can be controlled.

Linkage Between Cell Phone Terminals 1A and 2A, and Cell-Phone Strap-Type Vibrator 3

The cell phone terminal 2A in this example also has the configuration shown in FIG. 11. Accordingly, with the cell phone terminal 2A, in a case wherein the pulse data of the user of the cell phone terminal 1A is transmitted from the cell phone terminal 1A serving as the communication partner, the control unit 120 of the cell phone terminal 2A controls the short-range wireless unit 152 to transmit the received pulse data to the cell-phone strap-type vibrator 3 mounted on the terminal.

The cell-phone strap-type vibrator 3 mounted on the cell phone terminal 2A receives the pulse data from the cell phone terminal 2A through the antenna 301 and short-range wireless unit 302, and supplies this to the control unit 120. The control unit 120 controls, based on the received pulse data, an LED drive 303B and vibrator drive 304B to drive an LED 303A and vibrator 304A, respectively. Thus, the LED 304A can be blinked at a cycle corresponding to the received pulse data, and the vibrator 304A can be vibrated at a cycle corresponding to the received pulse data.

Similarly, with the cell phone terminal 1A as well, in a case wherein the pulse data of the user of the cell phone terminal 2A is transmitted from the cell phone terminal 2A serving as the communication partner, the control unit 120 of the cell phone terminal 1A controls the short-range wireless unit 152 to transmit the pulse data to the cell-phone strap-type vibrator 3 mounted on the terminal.

The cell-phone strap-type vibrator 3 mounted on the cell phone terminal 1A receives the pulse data from the cell phone terminal 2A through the antenna 301 and short-range wireless unit 302, and supplies this to the control unit 120. The control unit 120 drives the LED 303 and vibrator 304 based on the received pulse data. Thus, the LED 304A can be blinked at a cycle corresponding to the received pulse data, and the vibrator 304A can be vibrated at a cycle corresponding to the received pulse data.

With the first modification of the first embodiment, in a case wherein the cell phone terminals 1A and 2A having the configuration shown in FIG. 11 each include the cell-phone strap-type vibrator 3 shown in FIG. 12 to make up a communication system, as for the operation of the communication system, the same processing as the processing described with reference to FIG. 3 through FIG. 5 is performed.

Specifically, with the processing in step S8 shown in FIG. 3, the cell phone terminal 2A controls the short-range wireless unit 152, as described above, thereby driving and controlling the cell-phone strap-type vibrator 3 mounted on the terminal. Also, with the processing in step S16 shown in FIG. 5, the cell phone terminal 1A controls the short-range wireless unit 152, thereby driving and controlling the cell-phone strap-type vibrator 3 mounted on the terminal.

Second Modification of First Embodiment

With the above-described first embodiment, the communication system has been configured by employing the cell phone terminals. However, the same arrangements can be realized even in the case of employing stationary-type communication equipment. This second modification of the first embodiment is a communication system configured by employing communication terminals installed in a home or the like, to which an embodiment of the present invention has been applied.

Figure 13:
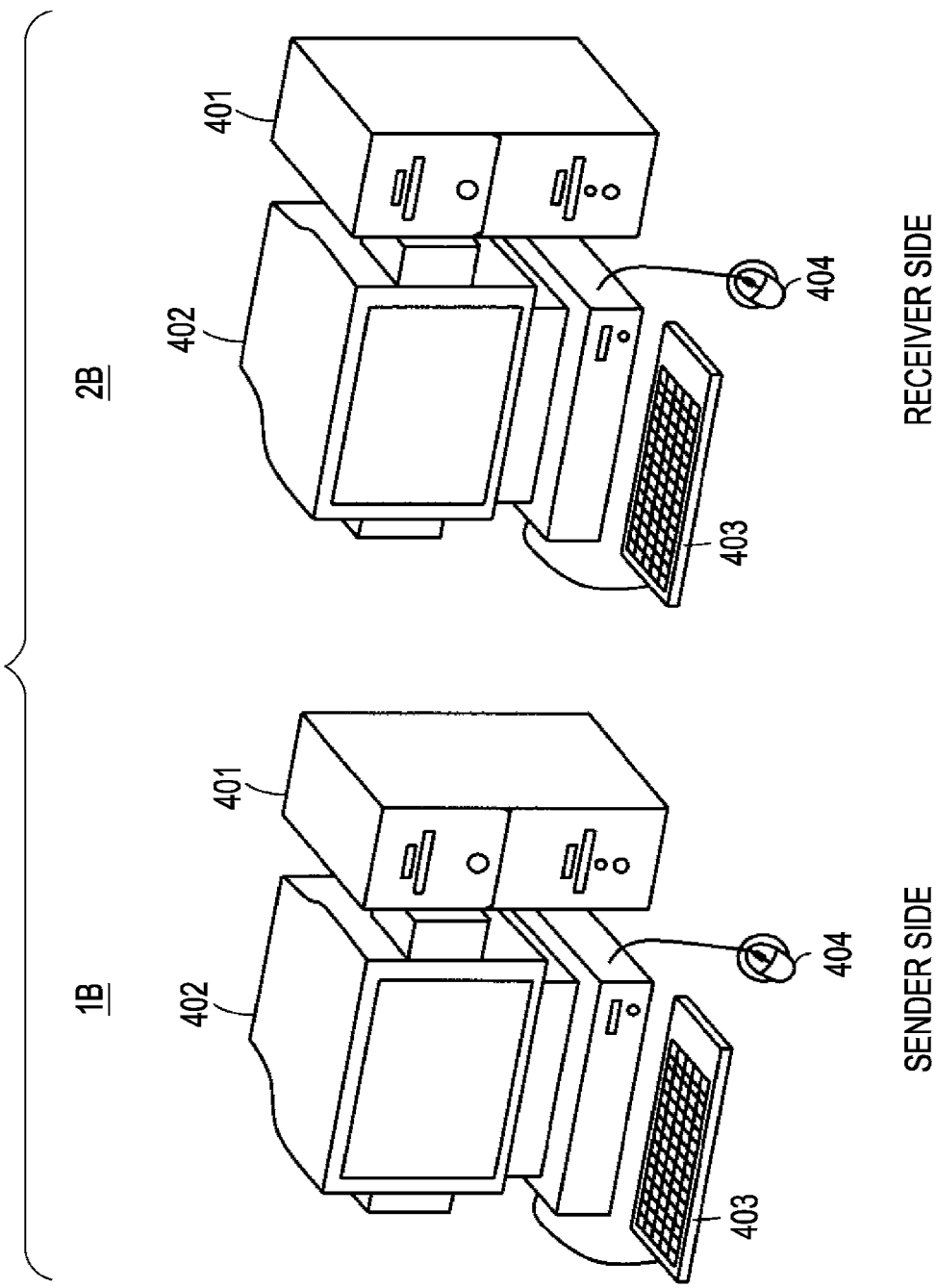
FIG. 13 is a diagram for describing a communication system according to a second modification of the first embodiment.

FIG. 13 is a diagram for describing the communication system according to the second modification of the first embodiment. As shown in FIG. 13, in the case of the second modification, the communication system is configured of communication terminals 1B and 2B. The communication terminals 1B and 2B are roughly classified into a main unit 401, display device 402, keyboard 403, and pointing device 404. Also, in FIG. 13, though not shown in the drawing, the communication terminals 1B and 2B each include a receiver and transmitter such as described later.

The communication terminals 1B and 2B can be configured in various modes, but in the case of the second example, the communication terminals 1B and 2B are realized as personal computers having a communication function. With this second example as well, description will be made assuming that the sender side is the communication terminal 1B, and the receiver side is the communication terminal 2B. The sender-side communication terminal 1B and receiver-side communication terminal 2B are connected to a wide area communication network such as a public telephone network, the Internet, or the like, by cable, and connect the communication line between a target partner's communication terminal, whereby communication such as phone conversation or the like can be performed.

In the case of the second example, a pulse sensor, LED, and vibrator are provided in the pointing device 404, thereby detecting the pulse of the user at the time of phone conversation, transmitting this to the partner as pulse data, receiving the pulse data from the partner, and driving the LED and vibrator of the pointing device 404 according to the pulse data.

Configuration of Equipment Employed for Second Modification of First Embodiment

Next, the configurations of the communication terminals 1B and 2B employed for the second modification, and the configuration of the pointing device 404 will be described.

Configuration of Communication Terminals 1B and 2B

Figure 14:
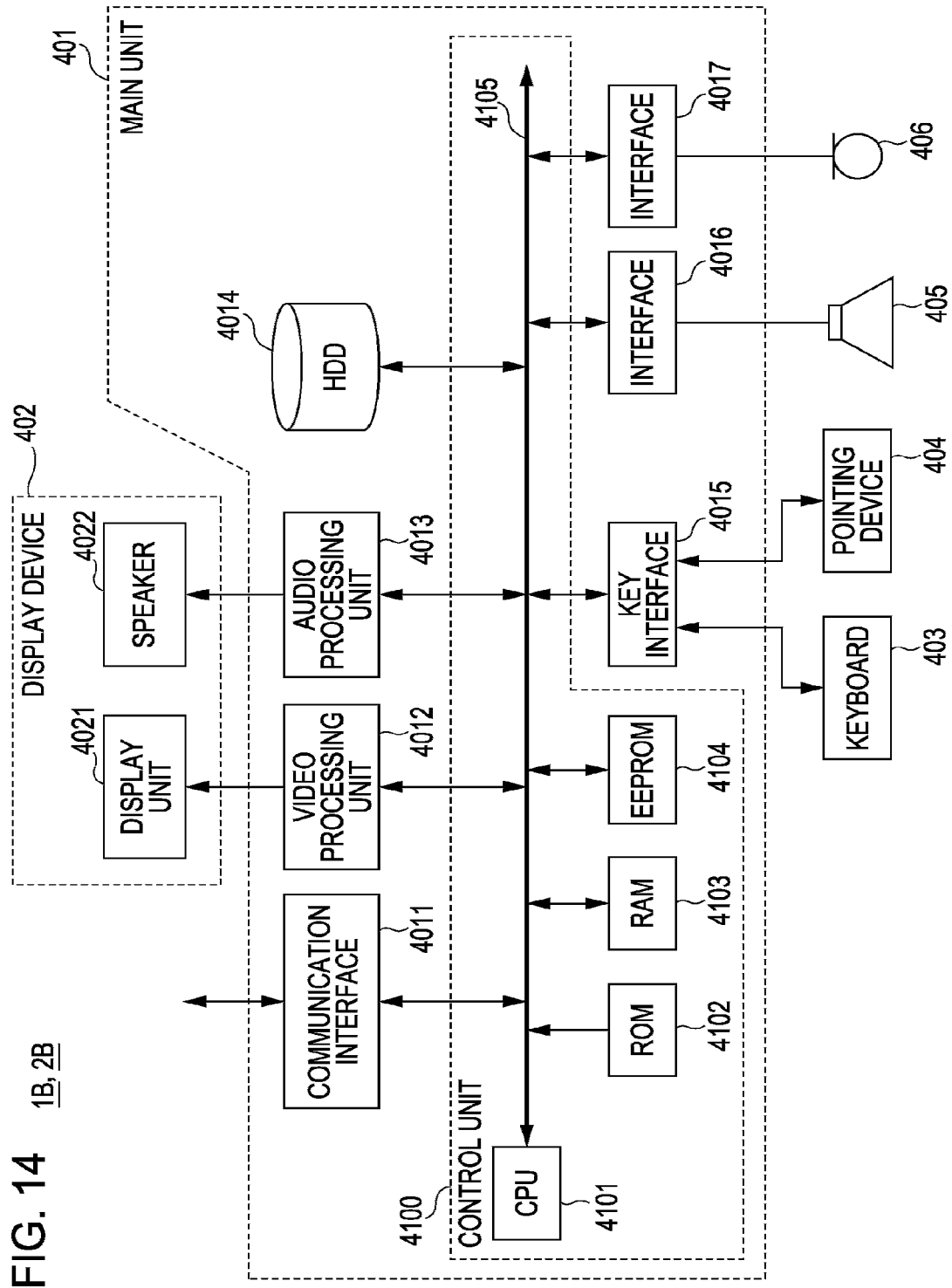
FIG. 14 is a block diagram for describing the configuration of communication terminals employed for the second modification of the first embodiment.

FIG. 14 is a block diagram for describing the configurations of the communication terminals 1B and 2B employed for the second modification of the first embodiment. Note that, with the second modification, the communication terminals 1B and 2B have the same configuration, so hereafter, description will be made below as the configuration of the communication terminal 1B. As described above, the communication terminal 1B is roughly classified into the main unit 401, display device 402, keyboard 403, pointing device 404, and also receiver 405, and transmitter 406.

Here, as shown in FIG. 14, the display device 402 includes a display unit 4021 made up of various types of display element, for example, such as LCD (Liquid Crystal Display), organic EL panel (organic electroluminescence panel), PDP (Plasma Display Panel), CRT (Cathode-Ray Tube), or the like, and a controller thereof, and a speaker 4022 made up of a speaker and amplifier.

Also, the keyboard 403 is configured of alphanumeric keys, various types of function keys, and so forth. The pointing device 404 is a so-called mouse, and the details of the configuration thereof will be described later. Also, the receiver 405 is a speaker which releases audio from the communication partner, and the transmitter 406 is a microphone which collects sound made by the user at the transmission side.

Note that the receiver 405 and transmitter 406 are, as with the case of a land-line-type phone, housed within a single casing, which makes up the configuration of a handset which is used by the user holding this, or makes up the configuration of a headset, which is configured of headphones, and microphones provided so as to be attached to the corresponding headphone, and is used by the user having this on the head, in some cases.

The main unit 401 includes, as shown in FIG. 14, a communication interface 4011, video processing unit 4012, audio processing unit 4013, hard disk drive (hereafter, abbreviated as "HDD") 4014, key interface 4015, receiver interface 4016, transmitter interface 4017, and control unit 4100.

The control unit 4100 controls the respective units of the main unit 401, and is, as shown in FIG. 14, a microcomputer formed of a CPU 4101, ROM 4102, RAM 4103, and EEPROM 4104 being connected via a CPU bus 4105. The CPU 4101 serves as a main component for control of the main unit 401, such as executing a program stored and held in later-described ROM 4102, generating a control signal to be supplied to the respective units to supply this to the respective units, accepting various types of information from the respective units to process this, and so forth.

Also, as described above, the ROM 4102 stores and holds various types of program executed by the CPU 4101, various types of data for processing, and so forth. Also, the RAM 4103 is employed principally as a work area such as temporarily storing intermediate results with various types of processing, or the like. Also, the EEPROM 4104 is so-called nonvolatile memory, and stores and holds data to be stored and held even if the power of the main unit 401 were turned off, e.g., various types of setting parameters, a new program for functional enhancement, and so forth.

The communication interface 4011 performs processing in accordance with the control of the control unit 4100, such as connecting the communication line between a target partner's communication equipment through a wide area network, generating information for transmission from information to be transmitted from the terminal, transmitting this to the communication line, receiving information addressed to its own terminal to be transmitted, converting this into a format which can be processed at the control unit 4100, supplying this to the control unit 4100, and so forth.

Also, in accordance with the control of the control unit 4100, the video processing unit 4012 generates a video signal to be supplied to the display unit 4021 of the display device 402 from video data to be supplied to the terminal, and supplies this to the display unit 4021 of the display device 402. Also, in accordance with the control of the control unit 4100, the audio processing unit 4013 generates an audio signal to be supplied to the speaker 4022 of the display device 402 from audio data to be supplied to the terminal, and supplies this to the speaker 4022 of the display device 402.

According to the functions of the video processing unit 4012 and audio processing unit 4013, an AV (Audio/Visual) content such as a movie stored in the later-described HDD 4014, or the like can be reproduced, or various types of video content or audio content to be obtained externally through the communication interface can be reproduced.

The HDD 4014 includes, for example, a hard disk with relatively large capacity of around several hundred gigabytes, wherein writing and reading of data can be performed in accordance with the control of the control unit 4100. For example, the HDD 4014 can store and hold an AV content or the like provided through an unshown external interface, and store and hold a video content, audio content, AV content, or the like downloaded through the communication interface 4011.

Also, the key interface 4015 can convert information accepted through the keyboard 403 into a format to be supplied to the control unit 4100 to supply this to the control unit 4100, or convert information accepted through the pointing device 404 into a format to be supplied to the control unit 4100 to supply this to the control unit 4100. Also, in the case of the second modification, the key interface 4015 can also supply a control signal as to the pointing device 404 from the control unit 4100 to the pointing device 404.

Also, the receiver interface 4016 converts audio data (digital signal) from the communication partner to be supplied through the control unit 4100 into an analog audio signal, and supplies this to the receiver 405. Also, the transmitter interface 4017 converts an audio signal from the user sound-collected through the transmitter 406 into a digital signal, and supplies this to the control unit 4100. Thus, according to the receiver interface 4016 and transmitter interface 4017, a function serving as codec at a phone terminal is realized.

Subsequently, the control unit 4100 realizes a function serving as a baseband processing unit at a phone, and the communication interface 4011 realizes functions serving as a reception unit and transmission unit at a phone. Thus, according to a system of the communication interface 4011, control unit 4100, interface 4016, receiver 405, interface 4017, and transmitter 406, the communication line can be connected between the communication partner to perform phone conversation between the communication partner.

Configuration of Pointing Device 404

FIG. 15 is a block diagram for describing the configuration of the pointing device 404 according to the second modification of the first embodiment. As shown in FIG. 15, the pointing device 404 in this example includes a connection interface 4041 for connecting to the main unit 401, motion detecting unit 4042, operating unit 4043, pulse sensor 4044, LED 4045, vibrator 4046, and control unit 4200.

The control unit 4200 controls the respective units of the pointing device 404, and is, as shown in FIG. 15, a microcomputer formed of a CPU 4201, ROM 4202, and RAM 4203 being connected via a CPU bus 4204. The CPU 4201 serves as a main component for control of the pointing device 404, such as executing a program stored and held in later-described ROM 4202 or the like, generating a control signal to be supplied to the respective units, and supplying this to the respective units, receiving various types of information from the respective units, and processing this, and so forth.

Also, the ROM 4202 stores and holds, as described above, various types of program executed by the CPU 4201, various types of data for processing, and so forth. Also, the RAM 4203 is employed principally as a work area, such as temporarily storing intermediate results with various types of processing, or the like.

The connection interface 4201 is for connecting to the main unit 401. The connection interface 4201 generates data to be transmitted to the main unit 401 from the data supplied from the control unit 4200, and transmits this to the main unit 401. Also, the connection interface 4201 receives the data from the main unit 401, converts this into a format which can be processed at the control unit 4200, and supplies this to the control unit 4200.

The motion detecting unit 4042 detects the motion direction and motion amount of the pointing device operated so as to be moved by the user, and supplies information indicating these to the control unit 4200. The control unit 4200 transmits the detection results from the motion detecting unit 4042 to the main unit 401 through the connection interface 4041 in real time. Thus, the control unit 4100 of the main unit 401 controls the video processing unit 4012 so as to move a cursor displayed on the display screen of the display unit 4021.

Also, the operating unit 4043 includes a pressing operating unit and rotating operating unit, accepts operation input from the user, converts this into an electric signal, and supplies this to the control unit 4200. Subsequently, the control unit 4200 transmits the operation input from the operating unit 4043 to the main unit 401 through the connection interface 4041 in real time. Thus, the control unit 4100 of the main unit 401 can control the respective units according to the operation input from the pointing device 404.

With the pointing device 404 according to the second modification, as described above, a pulse sensor 4044, LED 4045, and vibrator 4046 are provided.

The pulse sensor 4044, which is provided in a position with which a finger or the like of the user comes into contact when the pointing device 404 is in a state of being operated by the hand of the user, is for detecting the pulse of the user to inform this to the control unit 4200. Also, the LED 4045 can emit light by receiving supply of driving power, wherein on and off can be controlled in accordance with the control of the control unit 4200. Also, the vibrator 4046 can generate vibration by receiving supply of driving power, wherein a generation pattern of vibration can be changed in accordance with the control of the control unit 4200.

The pointing device 404 according to the second modification receives the control signal from the main unit 401, whereby driving of the LED 4045 and vibrator 4046 can be controlled according to the control signal.

Linkage Between Main Unit 401 and Pointing Device 404

The communication terminal 2B in this example has the configuration shown in FIG. 14. Accordingly, with the communication terminal 2B, in a case wherein the pulse data of the user of the communication terminal 1B has been transmitted from the communication terminal 1B which is the communication partner, the control unit 4100 of the main unit 401 transmits the received pulse data to the pointing device 404 mounted on its own terminal through the key interface 4015.

The pointing device 404 mounted on the main unit 401 of the communication terminal 2B receives the pulse data from the main unit 401 to supply this to the control unit 4200 through the connection interface 4041. The control unit 4200 controls an LED drive 4045B and vibrator drive 4046B based on the received pulse data to drive an LED 4045A and vibrator 4046A. Thus, the LED 4045A can be blinked at a cycle corresponding to the received pulse data, and the vibrator 4046A can be vibrated at a cycle corresponding to the received pulse data.

Similarly, with the communication terminal 1B as well, in a case wherein the pulse data of the user of the communication terminal 2B is transmitted from the communication terminal 2B serving as the communication partner, the control unit 4100 of the communication terminal 1B transmits the pulse data to the pointing device 404 mounted on its own terminal through the key interface.

The pointing device 404 mounted on the main unit 401 of the communication terminal 1B receives the pulse data from the communication terminal 2B through the connection interface 4041, and supplies this to the control unit 4200. The control unit 4200 controls the LED drive 4045B and vibrator drive 4046B to drive the LED 4045A and vibrator 4046A based on the received pulse data. Thus, the LED 4045A can be blinked at a cycle corresponding to the received pulse data, and the vibrator 4046A can be vibrated at a cycle corresponding to the received pulse data.

With the second modification of the first embodiment, in a case wherein the cell phone terminals 1A and 2A having the configuration shown in FIG. 14 each include the pointing device 404 shown in FIG. 15 to make up a communication system, as for the operation of the communication system, the same processing as the processing described with reference to FIG. 3 through FIG. 5 is performed.

Specifically, with the processing in step S8 shown in FIG. 3, the communication terminal 2B drives and controls the LED 4045A and vibrator 4046A of the pointing device 404 connected to the main unit 401 of the terminal. Also, with the processing in step S16 shown in FIG. 5, the communication terminal 1B drives and controls the LED 4045A and vibrator 4046A of the pointing device 404 connected to the main unit 401 of the terminal. Thus, the present invention can also be applied to a case of employing a stationary-type communication terminal.

Second Embodiment

Configuration Examples of Communication System

The above-described first embodiment allows a user of a cell phone terminal or stationary-type communication terminal to measure the pulse of the user, transmit this to a communication partner, and reproduce this. The second embodiment described below allows a user of a communication terminal to transmit information indicating the strength of an operation to be performed as to an operating unit of the communication terminal to a communication partner, and allows the partner to reproduce this. Description will be made below regarding a case of realizing the second embodiment by employing a cell phone terminal as an example, but the second embodiment may also be realized by employing a stationary-type communication terminal.

Figure 16A:
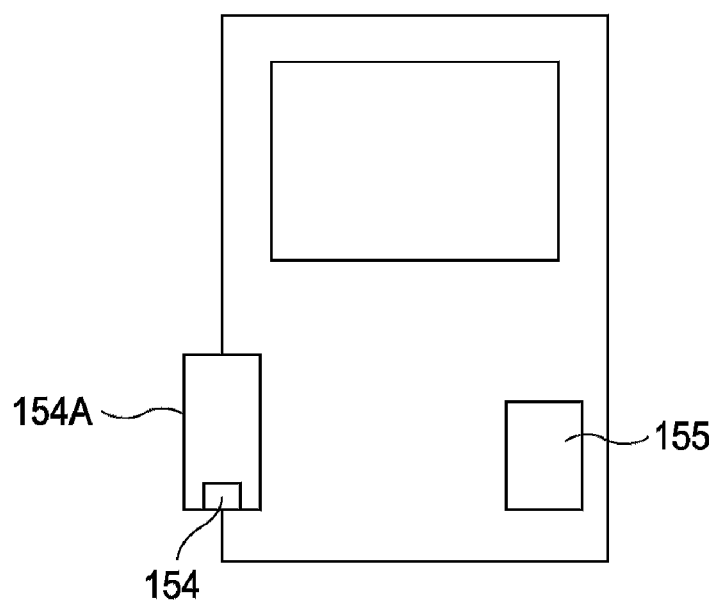
FIGS. 16A and 16B are diagrams for describing an overview of a cell phone terminal according to a second embodiment.
Figure 16B:
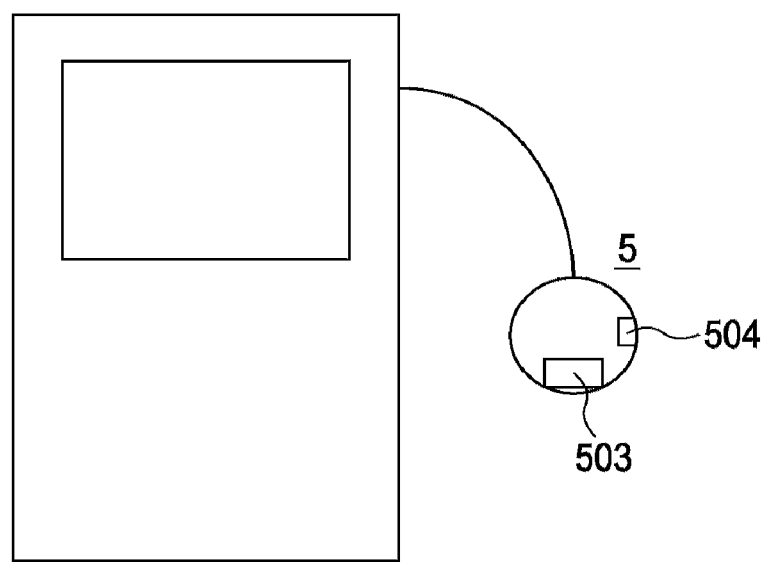

FIGS. 16A and 16B are diagrams for describing an overview of a cell phone terminal according to the second embodiment. FIG. 16A is a diagram for describing a case wherein an actuator of which the shape is changed based on information indicating the strength of an operation from an operating unit for accepting operation input including strength from the user, or a communication partner, is provided in a cell phone terminal.

Also, FIG. 16B is a diagram for describing a case wherein an actuator of which the shape is changed based on information indicating the strength of an operation from an operating unit for accepting operation input including strength from the user, or a communication partner, is provided in an external cell-phone strap-type operating unit 5 of a cell phone terminal.

With a cell phone terminal 1C which is an example shown in FIG. 16A, a sack-shaped operating unit 154A in which a pneumatic sensor 154 is provided, and a shape actuator 155 configured so as to change its own shape by voltage control, are provided within a casing of the cell phone terminal 1C.

The sack-shaped operating unit 154A is provided with the pneumatic sensor 154 internally, and is filled with the air. The sack-shaped operating unit 154A itself is configured of a material having some amount of elastic force, and is configured so as not to leak the inner air outside. As the material of the sack-shaped operating unit 154A, various types of material may be employed, for example, such as chemical fiber, rubber, reinforced vinyl, or the like, which has some amount of elastic force without leaking the inner air, and has strength wherein the material is not readily torn even in a case of applying certain amount of strong force to the material.

With the sack-shaped operating unit 154A, the internal capacity thereof is reduced by a pressing operation of the user. As described above, the air within the sack-shaped operating unit 154A is arranged so as not to leak outside. Therefore, air pressure is changed, and temperature is changed, within the sack-shaped operating unit 154A. The pneumatic sensor 154 detects such change, and notifies this to the control unit of the cell phone terminal 1C.

Note that the pneumatic sensor 154 can continuously detect operation input of the user which is continuously performed. That is to say, even in a case wherein force applied to the sack-shaped operating unit 154A gradually increases or decreases, the pneumatic sensor 154 can measure change in air pressure and temperature with a predetermined interval continuously to output the results thereof. That is to say, the sack-shaped operating unit 154A and pneumatic sensor 154 can detect information corresponding to operation input changed by the user.

Also, the shape actuator 155 is, for example, a polymer actuator, shape-memory-alloy actuator, or the like. The shape actuator 155 changes the shape thereof by being expanded or compressed, for example, by driving voltage being controlled based on the detection output corresponding to operation input to the sack-shaped operating unit 154A from the communication partner.

Thus, the pneumatic sensor 154 detects information corresponding to operation input from the user applied to the sack-shaped operating unit 154A (operation strength data), thereby enabling this to be transmitted to the communication partner. Also, information corresponding to operation input from the communication partner (operation strength data) is received, and according to this, the shape actuator 155 is controlled, thereby enabling the shape thereof to be changed.

Also, a cell phone terminal 1D shown in FIG. 16B is attached with a cell-phone strap-type operating unit 5 formed in a sack-shaped manner. A later-described pneumatic sensor 504 is provided within the cell-phone strap-type operating unit 5 formed in a sack-shaped manner, and a shape actuator 503 is provided in a position where the user can monitor.

That is to say, the cell-phone strap-type operating unit 5 formed in a sack-shaped manner is provided with the pneumatic sensor 504 therein, as with the case of the sack-shaped operating unit 154A of the cell phone terminal 1C shown in FIG. 16A. Also, the cell-phone strap-type operating unit 5 is provided with the same shape actuator 503 as the shape actuator 155 of the cell phone terminal 1C shown in FIG. 16A.

The cell phone terminal 1D and cell-phone strap-type operating unit 5 shown in FIG. 16B can perform exchange of information mutually by short-range wireless communication, as with the case described with reference to FIG. 11 and FIG. 12.

Thus, the cell phone terminal 1D and cell-phone strap-type operating unit 5 collaborate, thereby allowing the pneumatic sensor 504 to detect information corresponding to operation input from the user applied to the sack-shaped operating unit 154A (operation strength data), and transmit this to the communication partner. Also, information corresponding to operation input from the communication partner (operation strength data) is received, and according to this, the shape actuator 503 of the cell-phone strap-type operating unit 5 is controlled, thereby enabling the shape thereof to be changed.

Configuration of Equipment Employed for Second Embodiment

Figure 17:
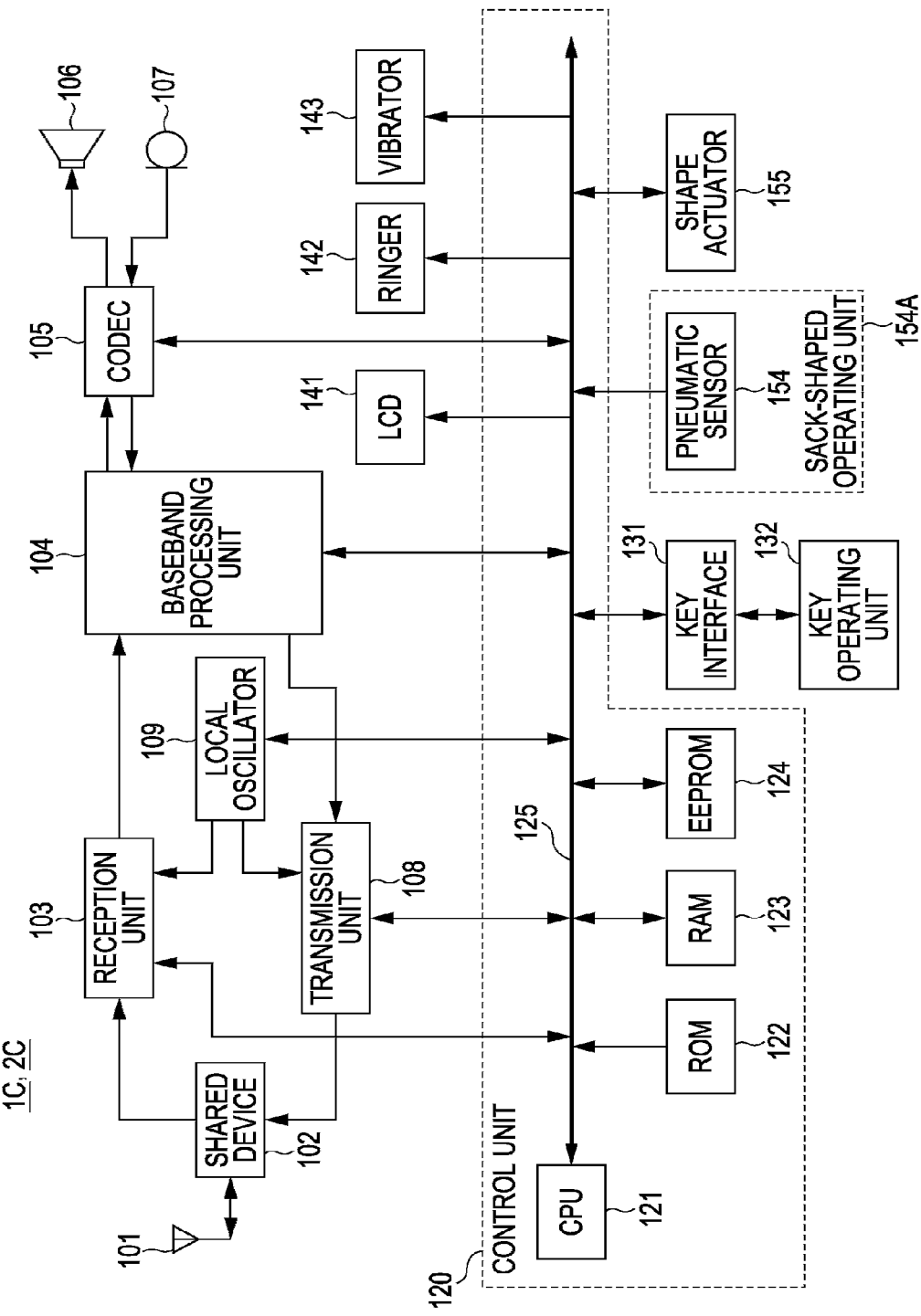
FIG. 17 is a block diagram for describing the configuration of a cell phone terminal according to the second embodiment.

Next, description will be made regarding the configurations of the cell phone terminals 1C and 1D, and the configuration of the cell-phone strap-type operating unit 5, employed for the second embodiment.
Configuration of Cell Phone Terminal 1C FIG. 17 is a block diagram for describing the configuration of the cell phone terminal 1C according to the second embodiment. As shown in FIG. 17, the cell phone terminal 1C according to the second embodiment is configured in the same way as the cell phone terminals 1 and 2 shown in FIG. 2 except that the sack-shaped operating unit 154A including the pneumatic sensor 154, and shape actuator 155 are provided instead of the pulse sensor 151.

Therefore, in order to avoid redundancy of description, with the cell phone terminal 1C according to the second embodiment shown in FIG. 17, the components configured in the same way as those in the cell phone terminals 1 and 2 according to the first embodiment shown in FIG. 2 are denoted with the same reference numerals, and detailed description thereof will be omitted.

With the cell phone terminal 1C shown in FIG. 17, the sack-shaped operating unit 154A including the pneumatic sensor 154 and the air accepts, as described above, operation input (pressing operation input) of the user. Subsequently, the sack-shaped operating unit 154A is pressed, the pneumatic sensor 154 detects change in changing air pressure or change in changing temperature within the sack-shaped operating unit 154A, and notifies this to the control unit 120. Note that after detecting change in air pressure or change in temperature, the pneumatic sensor 154 in this example detects such a change continuously until such a change converges at or below a predetermined value, thereby enabling a value corresponding to such a change (operation strength data) to be informed to the control unit.

Also, as described above, the shape actuator 155 is configured of a polymer actuator, shape-memory-alloy actuator, or the like, and in accordance with the control of the control unit 120, the shape thereof can be changed. Also, in the case of the second embodiment, the control unit 120 controls driving voltage to be supplied to the shape actuator 155 based on the operation strength data transmitted from the communication partner, whereby the shape thereof can be changed.

Figure 18:
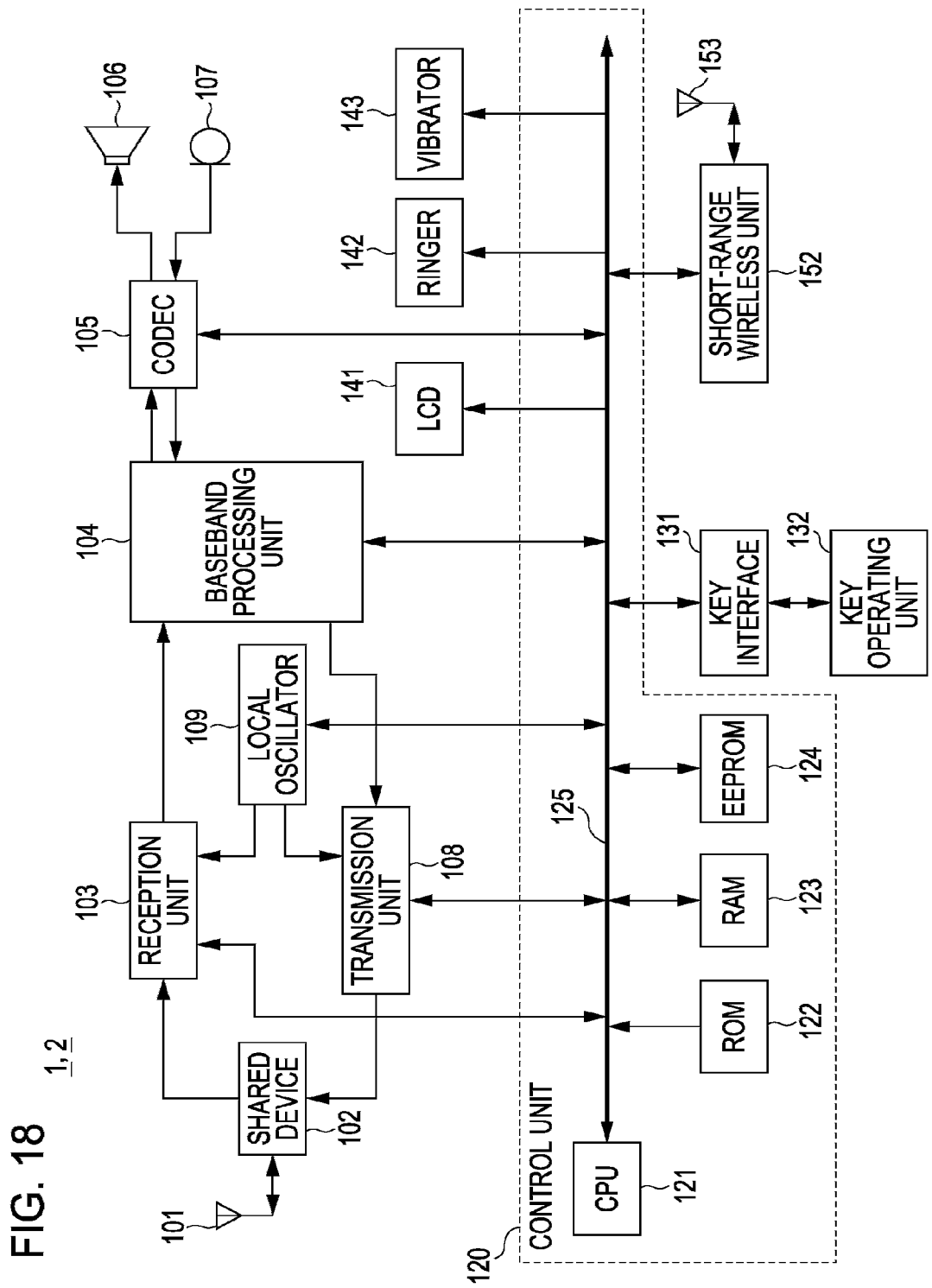
FIG. 18 is a block diagram for describing the configuration of a cell phone terminal 1D according to the second embodiment.

Subsequently, the communication line is connected between the cell phone terminals 1C and 2C having the configuration shown in FIG. 17, operation strength data corresponding to the pressing operation of the user upon the sack-shaped operating unit 154A is exchanged through the communication line, and according to this, the mutual shape actuators 155 are controlled, whereby the operation strength data can be reproduced by change in the shape of the shape actuator 155.
Configuration of Cell Phone Terminal 1D FIG. 18 is a block diagram for describing the configuration of the cell phone terminal 1D according to the second embodiment. As shown in FIG. 18, the cell phone terminal 1D according to the second embodiment is configured in the same way as the cell phone terminals 1 and 2 shown in FIG. 2 except that the short-range wireless unit 152, and short-range wireless communication antenna 153 are provided instead of the pulse sensor 151.

Therefore, in order to avoid redundancy of description, with the cell phone terminal 1D according to the second embodiment shown in FIG. 18, the components configured in the same way as those in the cell phone terminals 1 and 2 according to the first embodiment shown in FIG. 2 are denoted with the same reference numerals, and detailed description thereof will be omitted.

With the cell phone terminal 1D according to the second embodiment shown in FIG. 18, the short-range wireless unit 152 and short-range wireless communication antenna 153 are for performing short-range wireless communication between the cell-phone strap-type operating unit 5 attached to the terminal. With the short-range wireless unit 152 and short-range wireless communication antenna 153, various types of short-range wireless communication techniques, for example, such as Bluetooth and so forth are employed.

In accordance with the control of the control unit 120, the short-range wireless unit 152 can generate a transmission signal to be transmitted by short-range wireless communication by performing processing such as modulating a signal including information to be transmitted from the terminal, and transmit this through the antenna 153. Also, the short-range wireless unit 152 can perform processing such as demodulating a reception signal received through the antenna 153, or the like to generate a signal having a format which can be processed by the control unit 120, and supply this to the control unit 120.

Configuration of Cell-Phone Strap-Type Operating Unit 5

Figure 19:
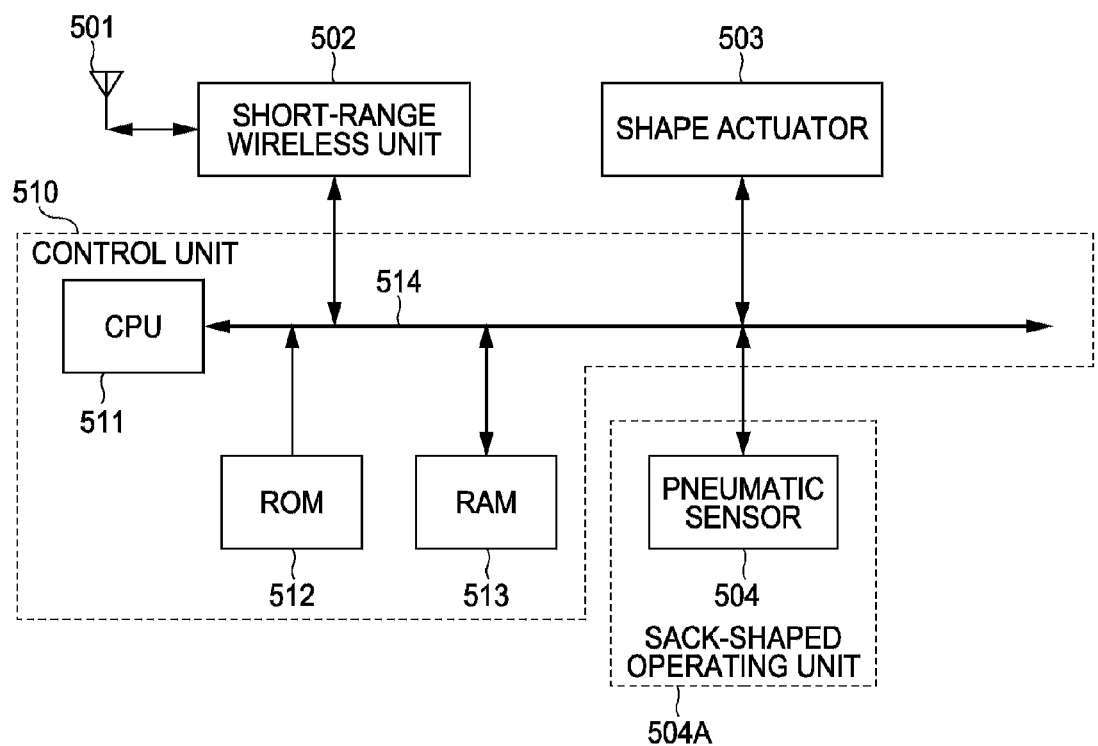
FIG. 19 is a block diagram for describing the configuration of a cell-phone strap-type operating unit 5 according to the second embodiment.

FIG. 19 is a block diagram for describing the configuration of the cell-phone strap-type operating unit 5 according to the second embodiment. As shown in FIG. 19, the cell-phone strap-type operating unit 5 in this example includes a short-range wireless communication antenna 501, short-range wireless unit 502, shape actuator 503, sack-shaped operating unit 504A including a pneumatic sensor 504, and control unit 510.

The control unit 510 is for controlling the respective units of the cell-phone strap-type operating unit 5, and is, as shown in FIG. 19, a microcomputer formed of a CPU 511, ROM 512, and RAM 513 being connected via a CPU bus 514.

Here, the CPU 511 serves as a main component for control with the cell-phone strap-type operating unit 5, such as executing a program stored and held in later-described ROM 512, generating a control signal to be supplied to the respective units, and supplying this to the respective units, receiving various types of data from the respective units, and processing this, and so forth. Also, the ROM 512 stores and holds, as described above, a program executed by the CPU 511, and data for processing. Also, the RAM 513 is employed principally as a work area, such as temporarily storing intermediate results with various types of processing, or the like.

The antenna 501 and short-range wireless unit 502 are for performing communication between the cell phone terminal on which its own equipment is mounted, as with the antennas 153 and short-range wireless units 152 of the cell phone terminal 1D described with reference to FIG. 18.

Specifically, the short-range wireless unit 502 can perform processing, such as receiving a transmission signal addressed to the equipment through the antenna 501, and demodulating this, and so forth, to generate a signal (reception signal) which can be processed at the control unit 510, and supply this to the control unit 510. Also, in accordance with the control of the control unit 510, the short-range wireless unit 502 can generate a transmission signal to be transmitted by short-range wireless communication by performing processing, such as modulating a signal including information to be transmitted from the equipment, and transmit this through the antenna 501.

Also, the shape actuator 503 is, as with the shape actuator 155 of the cell phone terminal 1C described with reference to FIG. 17, configured of a polymer actuator, shape-memory-alloy actuator, or the like, and in accordance with the control of the control unit 510, the shape thereof can be changed.

Also, the pneumatic sensor 504 is, as with the pneumatic sensor 514 of the cell phone terminal 1C described with reference to FIG. 17, formed in a sack-shaped manner, and is provided within the cell-phone strap-type operating unit 5 including the air. The pneumatic sensor 504 can detect change in air pressure or change in temperature within the sack-shaped cell-phone strap-type operating unit 5, changed by the sack-shaped cell-phone strap-type operating unit 5 being pressed, and inform this to the control unit 510. Note that after detecting change in air pressure or change in temperature, the pneumatic sensor 504 in this example detects such a change continuously until such a change converges at or below a predetermined value, thereby enabling a value corresponding to such a change (operation strength data) to be informed to the control unit.

Subsequently, the communication line is connected between the communication terminal configured of the cell phone terminal 1D having the configuration shown in FIG. 18, and the cell-phone strap-type operating unit 5 attached thereto, operation strength data corresponding to the pressing operation of the user upon the cell-phone strap-type operating unit 5 is exchanged through the communication line, and according to this, the mutual shape actuators 503 of the cell-phone strap-type operating units 5 are controlled, whereby the operation strength data can be reproduced by change in the shape of the shape actuator 504.

Linkage Between Cell Phone Terminals 1C and 2C

Figure 20:
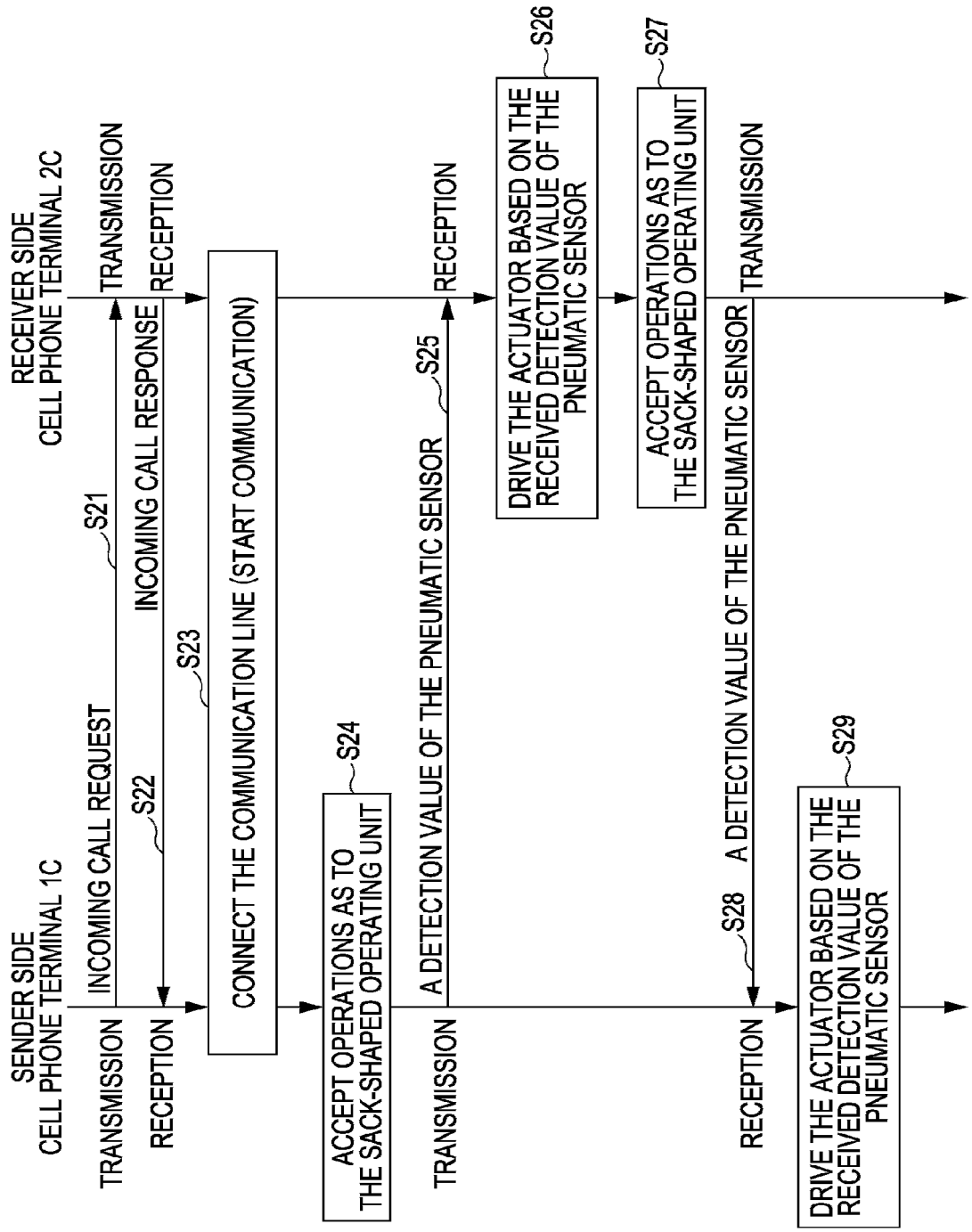
FIG. 20 is a sequence diagram for describing communication processing between the cell phone terminals according to the second embodiment.

Next, description will be made regarding communication processing between the cell phone terminals 1C and 2C having the configuration shown in FIG. 17. FIG. 20 is a sequence diagram for describing an overview of the communication processing between the cell phone terminals 1C and 2C. With this second embodiment as well, description will be made regarding a case wherein the cell phone terminal 1C is the sender side, and the cell phone terminal 2C is the receiver side, as an example.

Upon accepting dial input from the user or partner selection input from the phonebook data through the key operating unit 132, the control unit 120 of the cell phone terminal 1C generates an incoming call request as to a target communication partner (cell phone terminal 2C in this example), and transmits this to the cell phone terminal 2C through the baseband processing unit 104, transmission unit 108, antenna shared device 102, and transmission/reception antenna 101 (step S21).

Upon receiving the incoming call request from the cell phone terminal 1C through the transmission/reception antenna 101, antenna shared device 102, reception unit 103, and baseband processing unit 104, the control unit 120 of the receiver-side cell phone terminal 2C drives the ringer 142 or vibrator 143 of the terminal to inform the user of the cell phone terminal 2C that there is an incoming call by the ring tone or vibration. Subsequently, upon accepting an off-hook operation for responding to the incoming call, the control unit 120 of the cell phone terminal 2C generates an incoming call response, and transmits this to the cell phone terminal 1C serving as the outgoing call source (step S22).

Thus, the communication line is connected between the cell phone terminal 1C and cell phone terminal 2C, thereby enabling phone conversation (step S23). That is to say, as described above, phone conversation can be performed between the cell phone terminal 1C and cell phone terminal 2C through the transmission/reception antenna 101, antenna shared device 102, reception unit 103, baseband processing unit 104, codec 105, receiver 106, transmitter 107, and transmission unit 108, of both of the cell phone terminals.

Thus, following phone conversation being enabled, the control unit 120 of the cell phone terminal 1C accepts operation input by the user through the sack-shaped operating unit 154A, and attempts to obtain the detection output (operation strength data) from the pneumatic sensor 154 within the sack-shaped operating unit 154A (step S24). Subsequently, in a case wherein the detection output from the pneumatic sensor 154 has been obtained, the control unit 120 of the cell phone terminal 1C transmits the detection output thereof to receiver-side cell phone terminal 2C (step S25). With the present second embodiment, information from the start of change in air pressure to convergence is arranged to be transmitted according to passage of time.

With the receiver-side cell phone terminal 2C, the control unit 120 receives the detection value of the pneumatic sensor 154 from the cell phone terminal 1C transmitted through the connected communication line, and drives the shape actuator 155 based on the received detection value of the pneumatic sensor 154 (step S26).

Subsequently, with the cell phone terminal 2C as well, the control unit 120 of the cell phone terminal 2C accepts operation input by the user through the sack-shaped operating unit 154A, and attempts to obtain the detection output (operation strength data) from the pneumatic sensor 154 within the sack-shaped operating unit 154A (step S27). Subsequently, in a case wherein the detection output from the pneumatic sensor 154 has been obtained, the control unit 120 of the cell phone terminal 2C transmits the detection output thereof to the sender-side cell phone terminal 1C (step S28). In this case also, information from the start of change in air pressure to convergence is arranged to be transmitted according to passage of time.

With the sender-side cell phone terminal 1C, the control unit 120 receives the detection value of the pneumatic sensor 154 from the cell phone terminal 2C transmitted through the connected communication line, and drives the shape actuator 155 based on the received detection value of the pneumatic sensor 154 (step S29).

Thus, the state corresponding to the operation of the user of the sender-side cell phone terminal 1C is transmitted to the receiver-side cell phone terminal 2C, thereby enabling this to be reproduced by change in the shape of the shape actuator 155 of the cell phone terminal 2C. Also, the state corresponding to the operation of the user of the receiver-side cell phone terminal 2C is transmitted to the sender-side cell phone terminal 1C, thereby enabling this to be reproduced by change in the shape of the shape actuator 155 of the cell phone terminal 1C.

Also, after the processing in step S29 shown in FIG. 20, information indicating the states corresponding to the operations of the users of the cell phone terminals 1C and 2C is transmitted/received by repeating the processing from step S24 again, whereby information indicating the state corresponding to the operation of the received user can be reproduced by change in the shape of the shape actuator.

Note that description has been made here regarding the case wherein the communication line is connected between the cell phone terminals 1C and 2C having the configuration described with reference to FIG. 17 as an example. However, the present invention is not restricted to this. The processing described with reference to FIG. 20 may be performed even between the cell phone terminals 1D and 2D having the configuration shown in FIG. 18 to which the cell-phone strap-type operating unit 5 described with reference to FIG. 19 is attached.

However, in this case, the pneumatic sensor 504 and shape actuator 503 are provided in the cell-phone strap-type operating unit 5. Therefore, with regard to the detection output from the pneumatic sensor 504 from the cell-phone strap-type operating unit 5 attached to the terminal, the detection output transmitted from the cell-phone strap-type operating unit 5 by short-range wireless communication is received at the cell phone terminal, and transmits this to the communication partner.

Also, the detection output of the pneumatic sensor from the received communication partner is transmitted from the cell phone terminal to the cell-phone strap-type operating unit 5 connected thereto by short-range wireless communication, and is employed for the control of the shape actuator.

Thus, with the present second embodiment, information indicating the state corresponding to the operation of the user (detection output of the pneumatic sensor) is transmitted/received, thereby reproducing the information indicating the state as change in the shape of the shape actuator, and enabling this to be provided to the user.

Third Embodiment

Configuration Examples of Communication System

A communication system according to the present third embodiment is capable of transmitting/receiving information indicating the condition of the user, as with the cases of the above-described first and second communication systems. However, with the communication system according to the present third embodiment, between the sender-side communication terminal and receiver-side communication terminal different information is transmitted/received as information indicating the condition of each user.

In the case of the present third embodiment as well, description will be made regarding a case wherein the third embodiment is realized by employing cell phone terminals as an example, but the third embodiment may also be realized by employing stationary-type communication terminals. Also, the components configured in the same way as those in the cell phone terminals according to the above-described first and second embodiments are denoted with the same reference numerals, and detailed description thereof will be omitted.

Figure 21A:
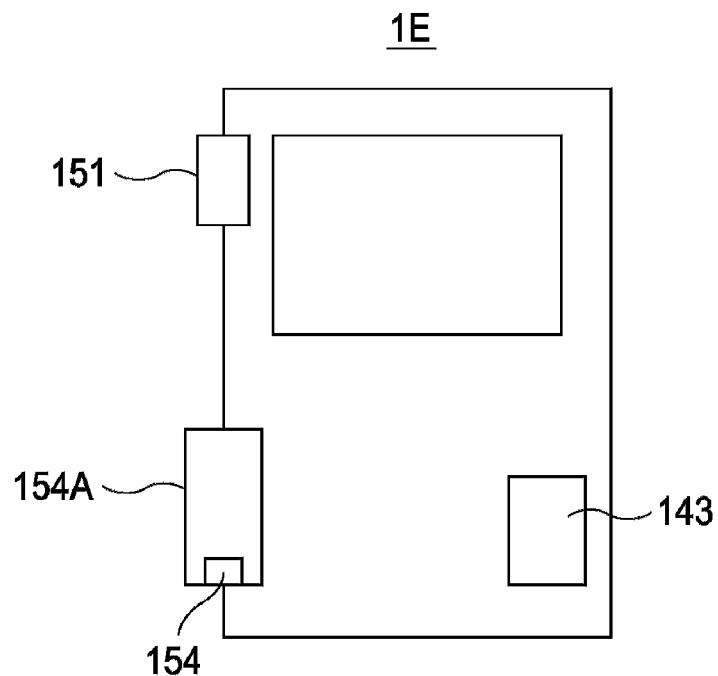
Figure 21B:
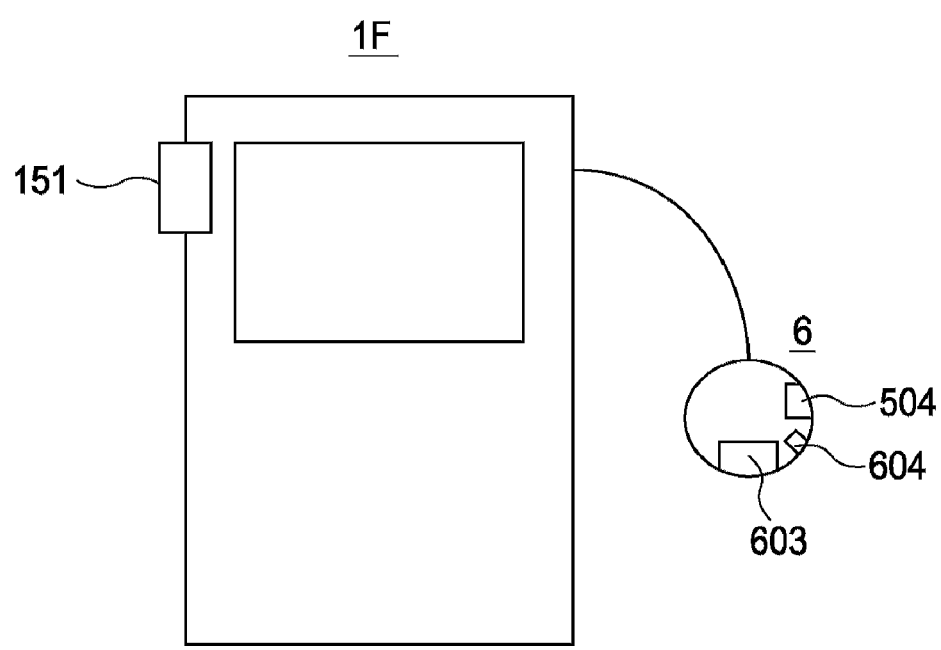

FIGS. 21A and 21B are diagrams for describing an overview of a cell phone terminal according to the third embodiment. FIG. 21A is a diagram for describing a case wherein a pulse sensor 151 for detecting the pulse of the user, sack-shaped operating unit 154A including a pneumatic sensor for accepting operation input having strength from the user, and vibrator serving as a built-in vibrator are provided in a cell phone terminal.

Also, FIG. 21B is a diagram for describing a case wherein the pulse sensor 151 for detecting the pulse of the user is provided in a cell phone terminal, but a sack-shaped operating unit including a pneumatic sensor for accepting operation input having strength from the user, and a vibrator are provided in a cell-phone strap-type operating unit 6.

With a cell phone terminal 1E which is an example shown in FIG. 21A, in the same way as the case of the cell phone terminal 1 shown in FIG. 1, the pulse sensor 151 for detecting the pulse of the user is provided, and in the same way as the case of the cell phone terminal 1C shown in FIG. 16A, the sack-shaped operating unit 154A in which the pneumatic sensor 154 is provided in the casing of the cell phone terminal 1E. Also, in the same way as the cell phone terminals according to the above-described first and second embodiments, a vibrator 141 is provided within the cell phone terminal 1E.

Subsequently, in a case wherein the communication line is connected between the sender-side cell phone terminal 1E having the configuration shown in FIG. 21A, and a receiver-side cell phone terminal 2E having the configuration shown in FIG. 21A, thereby performing phone conversation, the sender-side cell phone terminal 1E detects the pulse of the user, and transmits pulse data indicating this pulse to the cell phone terminal 2E.

The receiver-side cell phone terminal 2E receives the pulse data from the sender-side cell phone terminal 1E, and according to this, vibrates the built-in vibrator 143, and reproduces the pulse data as the vibration of the vibrator. Further, with the receiver-side cell phone terminal 2E, a pressing operation from the user is accepted through the sack-shaped operating unit 154A, the pneumatic sensor 154 detects change in air pressure or temperature within the sack-shaped operating unit 154A which is changed according to this operation, and transmits this detection output to the sender-side cell phone terminal 1E as operation strength data.

The sender-side cell phone terminal 1E controls and vibrates the vibrator 143 according to the operation strength data from the receiver-side cell phone terminal 2E. Thus, with the cell phone terminal 1E, according to the vibration of the vibrator 143, the operation strength data from the cell phone terminal 2E can be reproduced.

Thus, the pulse data of the user is transmitted from the sender-side cell phone terminal 1E to the receiver-side cell phone terminal 2E, which can be reproduced at the cell phone terminal 2E. Also, the operation strength data corresponding to operation input of the user is transmitted from the receiver-side cell phone terminal 2E to the cell phone terminal 1E, which can be reproduced at the cell phone terminal 1E. That is to say, different information such as the pulse data and operation strength data is transmitted/received between the sender-side cell phone terminal 1E, and receiver-side cell phone terminal 2E as information indicating the condition of each user, whereby the conditions of the mutual users can be notified.

Also, with a cell phone terminal 1F shown in FIG. 21B, a pulse sensor 151 is provided to the terminal, and a cell-phone strap-type operating unit 6 formed in a sack-shaped manner is attached. A vibrator 603 and pneumatic sensor 504 are provided within the cell-phone strap-type operating unit 6 formed in a sack-shaped manner, and an LED 605 is provided in a position where the user of the cell-phone strap-type operating unit 6 can monitor.

Also, the cell phone terminal 1F and cell-phone strap-type operating unit 6 shown in FIG. 21B are, as with the case described with reference to FIG. 11 and FIG. 12, configured so as to transmit/receive information mutually by short-range wireless communication.

In a case wherein the communication line is connected between the sender-side cell phone terminal 1F to which the cell-phone strap-type operating unit 6 is attached as shown in FIG. 21B, and the receiver-side cell phone terminal 1F to which the cell-phone strap-type operating unit 6 is attached as shown in FIG. 21B, thereby performing phone conversation, the sender-side cell phone terminal 1F detects the pulse of the user, and transmits pulse data indicating this pulse to a cell phone terminal 2F.

The receiver-side cell phone terminal 2F receives the pulse data from the sender-side cell phone terminal 1F, and in response to this, transmits the pulse data to the cell-phone strap-type operating unit 6 attached to the terminal, vibrates the vibrator 603 within the cell-phone strap-type operating unit 6 according to the pulse data, and reproduces the pulse data as the vibration of the vibrator 603. Further, with the receiver-side cell phone terminal 2F side, a pressing operation from the user is accepted through the cell-phone strap-type operating unit 6 formed in a sack-shaped manner, the pneumatic sensor 504 detects change in air pressure or temperature within the cell-phone strap-type operating unit, which is changed according to this operation, and transmits this detection output to the cell phone terminal 2F as operation strength data. The cell phone terminal 2F receives the operation strength data from the cell-phone strap-type operating unit 6, and transmits this to the sender-side cell phone terminal 1F.

The sender-side cell phone terminal 1F transmits the operation strength data from the receiver-side cell phone terminal 2F to the cell-phone strap-type operating unit 6 attached to the terminal, vibrates the vibrator 603 within the cell-phone strap-type operating unit 6 according to the operation strength data, and reproduces the operation strength data as the vibration of the vibrator 603.

Thus, in the same way as the cases employing the cell phone terminals 1E and 2E shown in FIG. 21A, the pulse data of the user is transmitted from the sender-side cell phone terminal 1F to the receiver-side cell phone terminal 2F, which can be reproduced at the cell phone terminal 2F. Also, the operation strength data corresponding to operation input of the user is transmitted from the receiver-side cell phone terminal 2F to the cell phone terminal 1F, which can be reproduced at the cell phone terminal 1F. That is to say, different information such as the pulse data and operation strength data is transmitted/received between the sender-side cell phone terminal 1F, and receiver-side cell phone terminal 2F as information indicating the condition of each user, whereby the conditions of the mutual users can be notified.

Note that, with the present third embodiment, the cell-phone strap-type operating unit 6 also includes an LED 605, and on and off of the LED can also be controlled according to the pulse data or operation strength data from the cell phone terminal.

Configuration of Equipment Employed for Third Embodiment

Next, description will be made regarding the configurations of the cell phone terminals 1E and 1F, and the configuration of the cell-phone strap-type operating unit 6, employed for the present third embodiment.

Configuration of Cell Phone Terminal 1E

Figure 22:
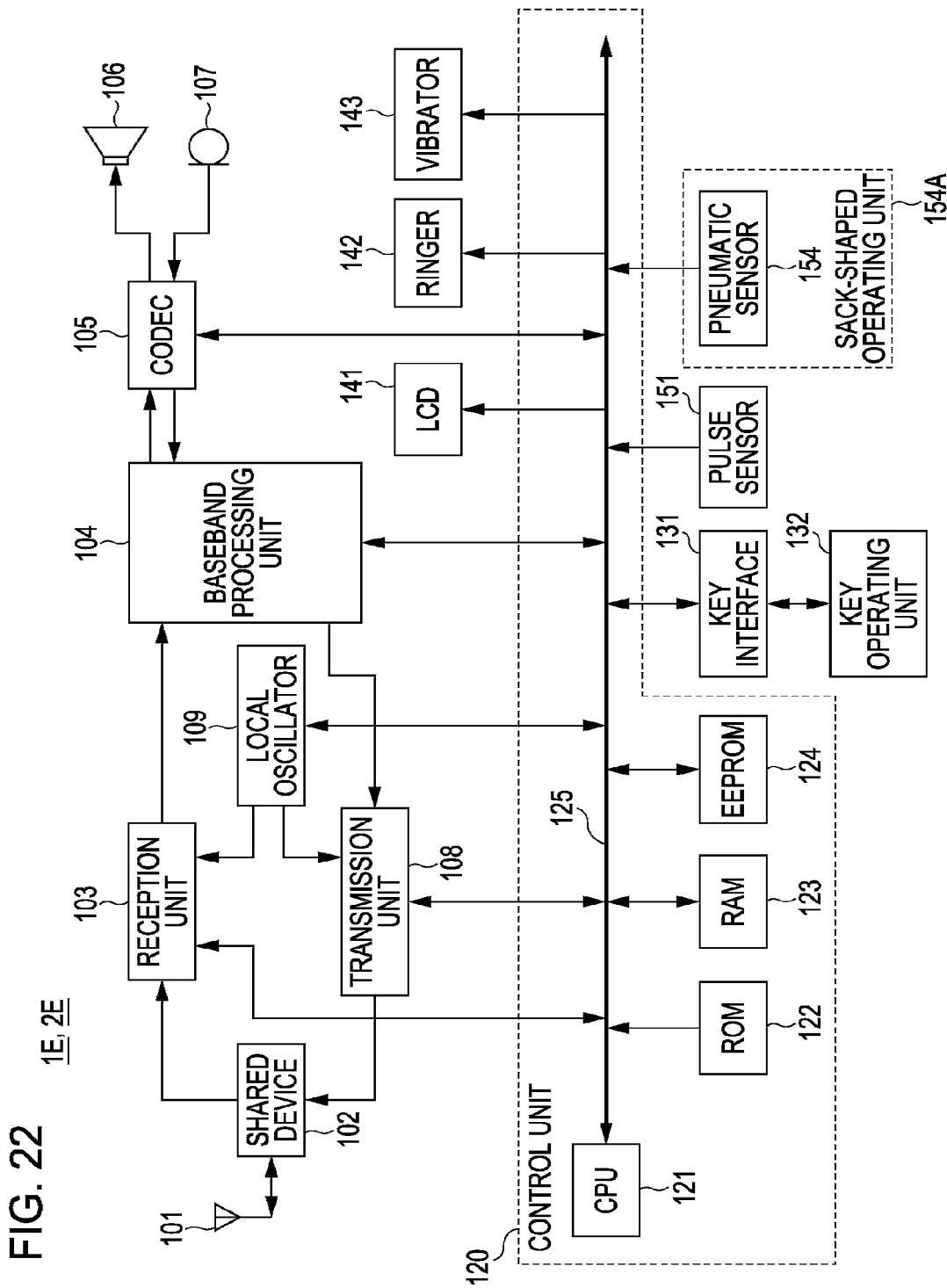
FIG. 22 is a block diagram for describing the configuration of a cell phone terminal according to the third embodiment.

FIG. 22 is a block diagram for describing the configuration of the cell phone terminal 1E according to the present third embodiment. As shown in FIG. 22, the cell phone terminal 1E according to the third embodiment is configured in the same way as the cell phone terminals 1 and 2 shown in FIG. 2 except that the sack-shaped operating unit 154A including the pneumatic sensor 154 is provided.

Therefore, in order to avoid redundancy of description, with the cell phone terminal 1E according to the third embodiment shown in FIG. 22, the components configured in the same way as those in the cell phone terminals 1 and 2 according to the first embodiment shown in FIG. 2 are denoted with the same reference numerals, and detailed description thereof will be omitted.

Also, with the cell phone terminal 1E shown in FIG. 22, the sack-shaped operating unit 154A including the pneumatic sensor 154 and containing air is configured in the same way as the sack-shaped operating unit 154A of the cell phone terminal 1C shown in FIG. 17 of the above-described second embodiment.

That is to say, the sack-shaped operating unit 154A accepts operation input (pressing operation input) of the user. Subsequently, the pneumatic sensor 154 detects change in air pressure or change in temperature within the sack-shaped operating unit 154A, which is changed by the sack-shaped operating unit 154A being pressed, and informs this to the control unit 120. Note that after detecting change in air pressure or change in temperature, the pneumatic sensor 154 in this example detects such a change continuously until such a change converges at or below a predetermined value, thereby enabling a value corresponding to such a change (operation strength data) to be informed to the control unit.

Subsequently, the communication line is connected between the cell phone terminals 1E and 2E having the configuration shown in FIG. 22, operation strength data corresponding to a pressing operation of the user upon the sack-shaped operating unit 154A through the communication line, and according to this, the mutual shape actuators 155 are controlled, whereby the operation strength data can be reproduced by change in the shape of the shape actuator 155.

Configuration of Cell Phone Terminal 1F

Figure 23:
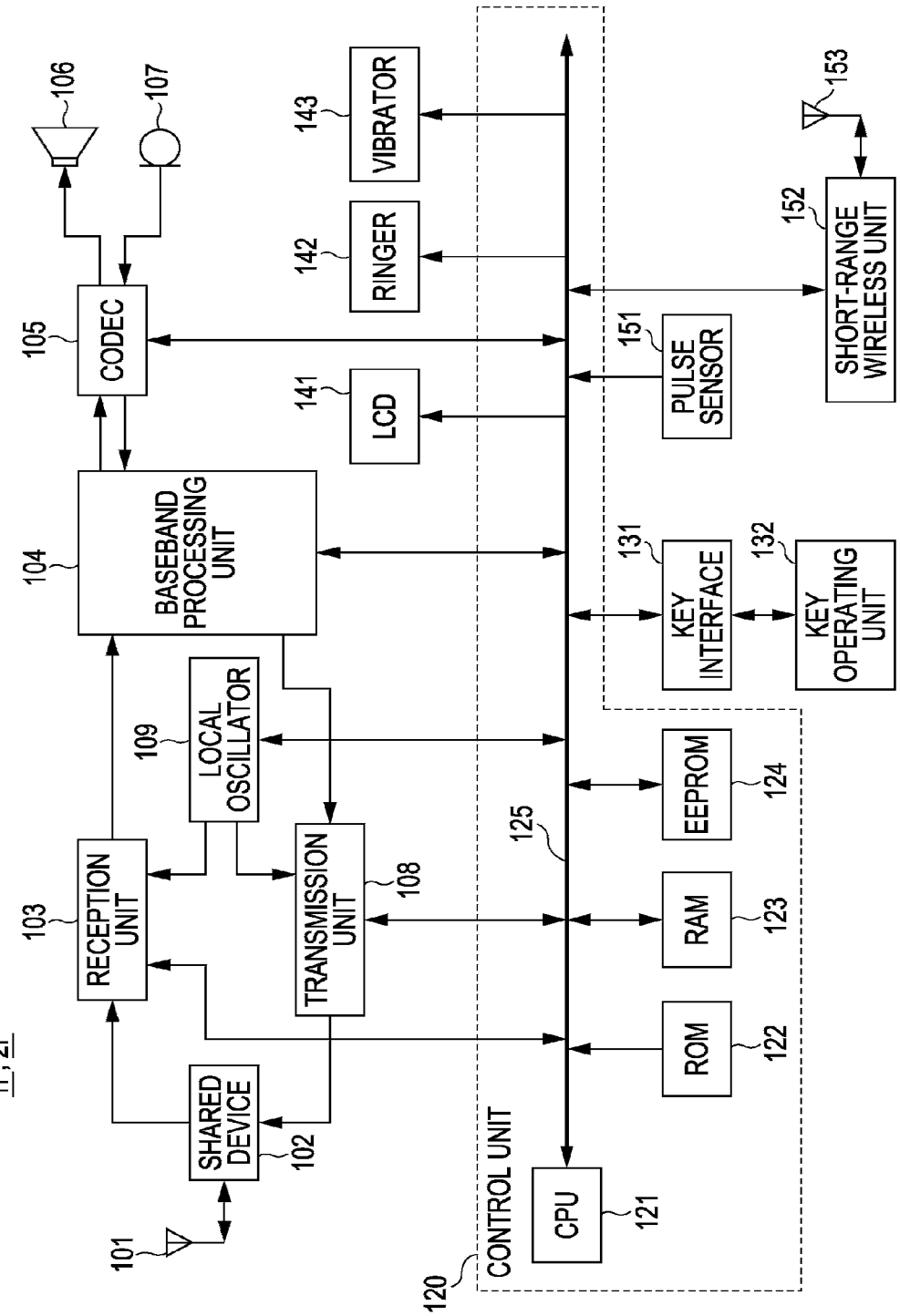
FIG. 23 is a block diagram for describing the configuration of a cell phone terminal according to the third embodiment.

FIG. 23 is a block diagram for describing the configuration of the cell phone terminal 1F according to the third embodiment. As shown in FIG. 23, the cell phone terminal 1F according to the third embodiment is configured in the same way as the cell phone terminals 1 and 2 shown in FIG. 2 except that the short-range wireless unit 152 and short-range wireless communication antenna 153 are provided.

Therefore, in order to avoid redundancy of description, with the cell phone terminal 1F according to the third embodiment shown in FIG. 23, the components configured in the same way as those in the cell phone terminals 1 and 2 according to the first embodiment shown in FIG. 2 are denoted with the same reference numerals, and detailed description thereof will be omitted.

With the cell phone terminal 1F according to the third embodiment shown in FIG. 23, the short-range wireless unit 152 and short-range wireless communication antenna 153 are for performing short-range wireless communication between the cell-phone strap-type operating unit 6 attached to the terminal, and are configured in the same way as the short-range wireless unit 152 and short-range wireless communication antenna 153 of the cell phone terminal 1D according to the second embodiment shown in FIG. 18.

In accordance with the control of the control unit 120, the short-range wireless unit 152 can generate a transmission signal to be transmitted by short-range wireless communication by performing processing such as modulating a signal including information to be transmitted from the its own terminal, and transmit this through the antenna 153. Also, the short-range wireless unit 152 can perform processing such as demodulating a reception signal received through the antenna 153, or the like to generate a signal having a format which can be processed by the control unit 120, and supply this to the control unit 120.

Configuration of Cell-Phone Strap-Type Operating Unit 6

Figure 24:
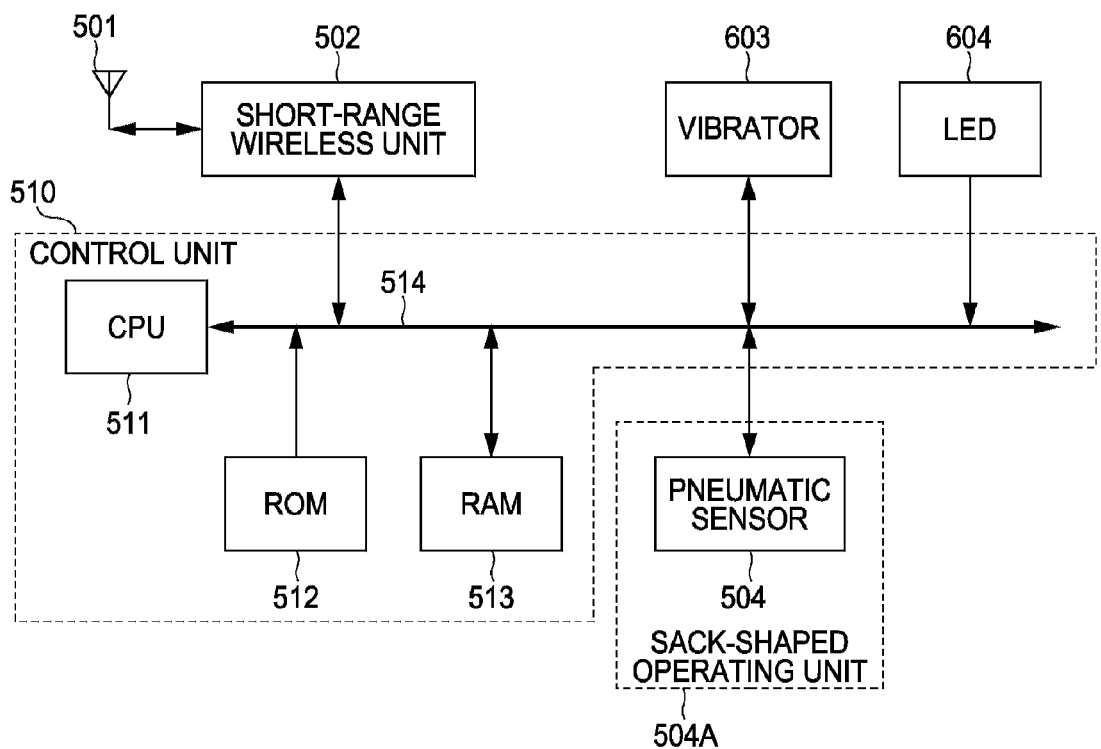
FIG. 24 is a block diagram for describing the configuration of a cell-phone strap-type operating unit according to the third embodiment.

FIG. 24 is a block diagram for describing the configuration of the cell-phone strap-type operating unit 6 according to the third embodiment. As shown in FIG. 24, the cell-phone strap-type operating unit 6 in this example is configured in the same way as the cell-phone strap-type operating unit 5 according to the second embodiment described with reference to FIG. 19 except that a vibrator 603 and LED 604 are provided instead of the shape actuator 503.

Therefore, in order to avoid redundancy of description, with the cell-phone strap-type operating unit 6 according to the third embodiment shown in FIG. 24, the components configured in the same way as those in the cell-phone strap-type operating unit 5 according to the second embodiment shown in FIG. 19 are denoted with the same reference numerals, and detailed description thereof will be omitted.

The vibrator 603 is similar to the above-described vibrator mounted on each cell phone terminal, and generates vibration in accordance with the control of the control unit 510. Also, the LED 604 is similar to the LED 303 provided in the strap-type vibrator 3 according to the first embodiment shown in FIG. 12, of which the on and off are controlled in accordance with the control of the control unit 510.

As described above, the cell-phone strap-type operating unit 6 formed in a sack-shaped manner accepts a pressing operation from the user, and the pneumatic sensor 504 therein detects change in air pressure or temperature, whereby this can be transmitted to the cell phone terminal to which the equipment is attached by short-range wireless communication. Also, the cell-phone strap-type operating unit 6 receives the pulse data transmitted from the cell phone terminal to which the its own equipment is attached by short-range wireless communication, whereby driving of the vibrator 603 or LED 605 can be controlled according to this pulse data.

Linkage Between the Cell Phone Terminals 1E and 2E

Next, description will be made regarding communication processing between the cell phone terminals 1E and 2E having the configuration shown in FIG. 22. With the third embodiment, processing for placing a call (outgoing call) from the sender-side cell phone terminal 1E to the receiver-side cell phone terminal 2E to connect the communication line, thereby enabling phone conversation, and processing for transmitting/receiving pulse data are performed in the same way as the processing performed between the cell phone terminal 1 and cell phone terminal 2 according to the first embodiment described with reference to FIG. 3.

Figure 25:
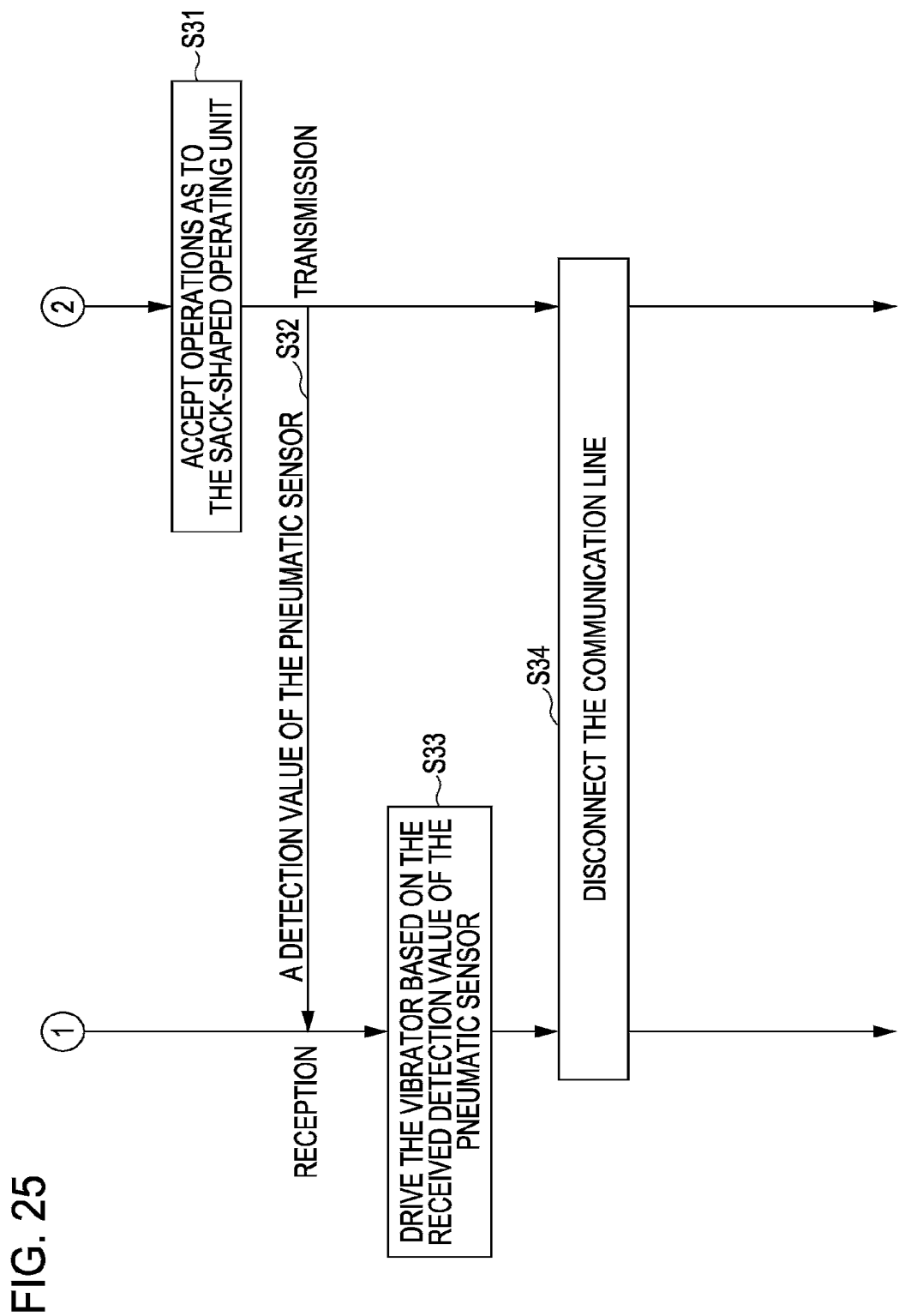
FIG. 25 is a sequence diagram for describing processing performed after the processing in accordance with the sequence diagram shown in FIG. 3 with the third embodiment.

However, the processing for transmitting information indicating the condition of the user from the receiver-side cell phone terminal 2E to the sender-side cell phone terminal 1E differs from the processing in the case of the first embodiment. FIG. 25 is a sequence diagram for describing the processing for transmitting information indicating the condition of the user from the receiver-side cell phone terminal 2E to the sender-side cell phone terminal 1E, which is performed after the processing following the sequence diagram shown in FIG. 3.

The sender-side cell phone terminal 1E and receiver-side cell phone terminal 2E perform transmission/reception of pulse data alternately, and the cell phone terminal 2E vibrates the vibrator 143 based on the received pulse data, following which the processing in accordance with the sequence diagram shown in FIG. 25 is performed.

Specifically, the control unit 120 of the receiver-side cell phone terminal 2E accepts operation input by the user through the sack-shaped operating unit 154A, and attempts to obtain the detection output (operation strength data) from the pneumatic sensor 154 within the sack-shaped operating unit 154A (step S31). Subsequently, in a case wherein the detection output from the pneumatic sensor 154 has been obtained, the control unit 120 of the receiver-side cell phone terminal 2E transmits the detection output thereof to the sender-side cell phone terminal 1E (step S32).

With the sender-side cell phone terminal 1E, the detection value of the pneumatic sensor 154 from the cell phone terminal 2E transmitted through the connected communication line is received, and the control unit 120 drives the vibrator 143 based on the received detection value of the pneumatic sensor 154 (step S33).

Subsequently, in a case wherein either the cell phone terminal 1E or cell phone terminal 2E performs a line disconnection operation (on-hook operation), the communication line connected in step S4 shown in FIG. 3 is disconnected (the communication line is released), and the series of processing is ended (step S34).

Thus, the state corresponding to the operation of the user of the sender-side cell phone terminal 1E is transmitted to the receiver-side cell phone terminal 2E, whereby this can be reproduced by vibration generated from the vibrator 143 of the cell phone terminal 2E. Also, the state corresponding to the operation of the user of the receiver-side cell phone terminal 2E is transmitted to the sender-side cell phone terminal 1E, whereby this can be reproduced by vibration generated from the vibrator 143 of the cell phone terminal 1E.

Note that, with the third embodiment, description has been made wherein pulse data is transmitted from the sender-side cell phone terminal 1E to the receiver-side cell phone terminal 2E, and operation strength data is transmitted from the receiver-side cell phone terminal 2E to the sender-side cell phone terminal 1E. However, the present invention is not restricted to this. An arrangement may be made wherein the pulse data of the user is transmitted from the receiver-side cell phone terminal 2E to the sender-side cell phone terminal 1E, and operation strength data is transmitted from the sender-side cell phone terminal 1E to the receiver-side cell phone terminal 2E.

Note that description has been made here regarding the case wherein the communication line is connected between the cell phone terminals 1E and 2E having the configuration described with reference to FIG. 22 to perform communication, as an example. However, the present invention is not restricted to this. The processing described with reference to FIG. 3 and FIG. 25 may be performed between the cell phone terminals 1F and 2F having the configuration shown in FIG. 23, to which the cell-phone strap-type operating unit 6 described with reference to FIG. 24 is attached.

However, in this case, the pneumatic sensor 504 and vibrator 603 are provided in the cell-phone strap-type operating unit 6. Therefore, the pulse data from the communication partner received from the communication partner is transmitted from the cell phone terminal to the cell-phone strap-type operating unit 6 connected thereto by short-range wireless communication, and is employed for the control of the vibrator. Also, as for the detection output from the pneumatic sensor 504 from the cell-phone strap-type operating unit 6 attached to the terminal, the detection output transmitted from the cell-phone strap-type operating unit 6 by short-range wireless communication is received by the cell phone terminal, and is transmitted to the communication partner.

Fourth Embodiment

With the above-described communication systems according to the first through third embodiments, in a case wherein phone conversation (real-time communication) is performed between communication terminals, information indicating the condition of the user of a communication terminal is arranged to be transmitted/received. However, with the fourth embodiment, real-time communication is not performed. A server device is disposed between communication terminals, whereby the communication terminals can upload information including information indicating the condition of a user in the server device at appropriate timing. Also, the communication terminals can download information indicating the condition of a user serving as a communication partner from the server device at appropriate timing.

With the communication system according to the fourth embodiment, a communication terminal having each of the configurations of the communication terminals 1, 1A, 1B, 1C, 1D, 1E, and 1F described in the above-described first through third embodiments can be employed. A different point from the above-described first through third embodiments is in that communication between communication terminals is performed through a server device. In order to simplify description, description will be made below regarding a case wherein e-mail communication is performed between a cell phone terminal 1 and cell phone terminal 2 having the configuration described in the first embodiment, as an example.

Figure 26:
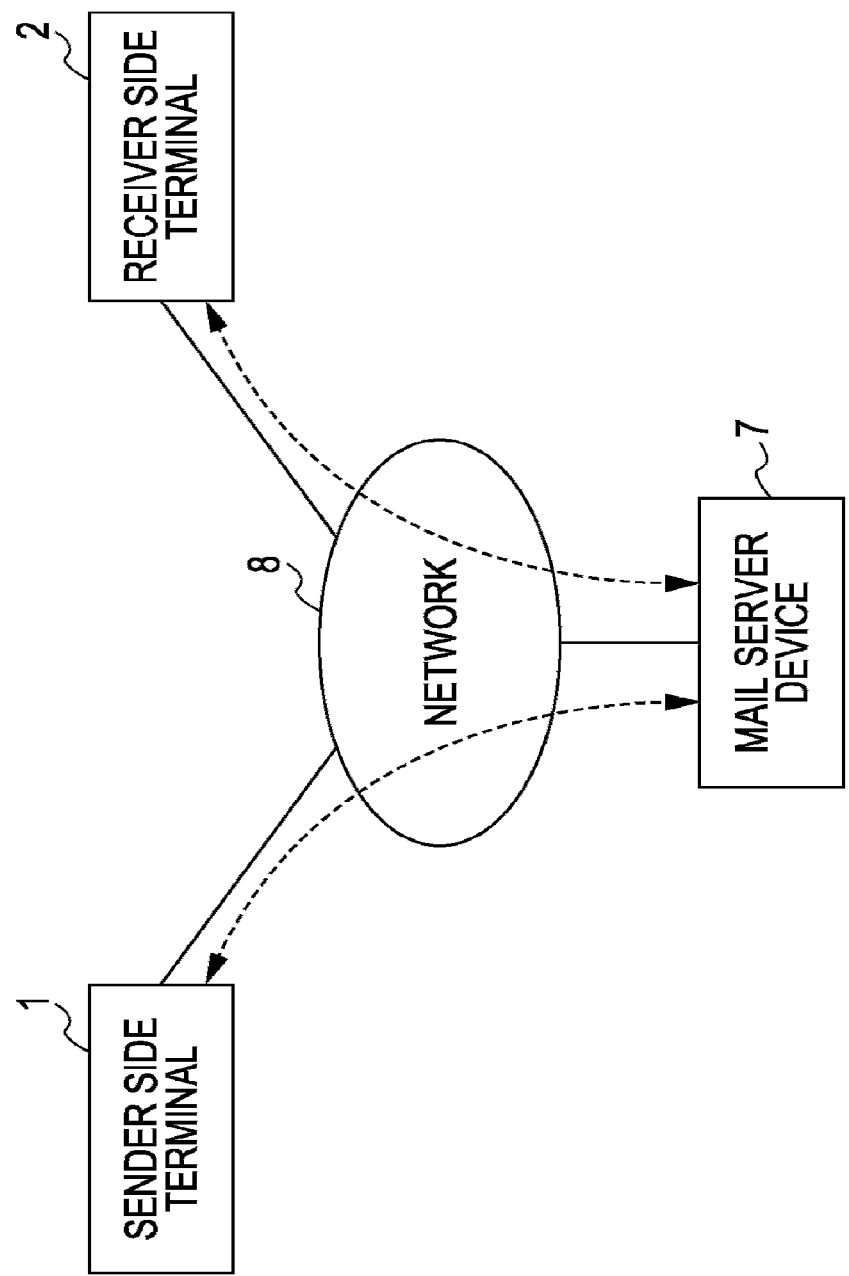
FIG. 26 is a diagram for describing a configuration example of a communication system according to a fourth embodiment.

Note that, with the fourth embodiment as well, description will be made assuming that the cell phone terminal 1 is a sender-side cell phone terminal for transmitting an e-mail first, and the cell phone terminal 2 is a receiver-side cell phone terminal for receiving an e-mail for the its own terminal first.
Configuration Examples of Communication System FIG. 26 is a diagram for describing a configuration example of the communication system according to the fourth embodiment. With the communication system according to the fourth embodiment, a mail server device 7 is connected to a wide area network such as the Internet or the like. Now, in order to simplify description, let us say that the mail server device 7 is a mail server device shared by the user of the cell phone terminal 1 and the user of the cell phone terminal 2.

Subsequently, in the case of creating an e-mail to be transmitted to the user of the receiver-side cell phone terminal 2, the user of the sender-side cell phone terminal 1 uploads the e-mail data, and pulse data measured by the pulse sensor 151 mounted in the cell phone terminal 1 at that time to the mail server device 7 including a mail box of the cell phone terminal 2. That is to say, this processing is usually processing for creating an e-mail to transmit this to a target partner.

On the other hand, the receiver-side cell phone terminal 2 accesses the mail server device 7 including its own mail box at appropriate timing to download e-mail data for the terminal. At this time, in a case wherein there is pulse data, the receiver-side cell phone terminal 2 downloads the pulse data thereof together with the e-mail data. This processing is usually processing for receiving e-mail data for the terminal.

Subsequently, with the receiver-side cell phone terminal 2, the control unit 120 controls the LCD 141 so as to display the received e-mail data to allow the user to read this. Also, based on the received pulse data, the control unit 120 controls the vibrator 143 to generate vibration corresponding to the pulse data. Thus, with the receiver-side cell phone terminal 2, the pulse data from the sender side can be downloaded and reproduced at appropriate timing.

Subsequently, the receiver-side cell phone terminal 2 creates a response message as to the sender-side cell phone terminal 1, and transmits this to the mail server device 7 including a mail box of the sender-side cell phone terminal 1. Subsequently, the sender-side cell phone terminal 1 accesses the mail server device 7 at appropriate timing, receives the response message from the receiver-side cell phone terminal 2, and reproduces this, thereby recognizing that the receiver-side cell phone terminal 2 has received and employed the pulse data from the terminal.

Figure 27:
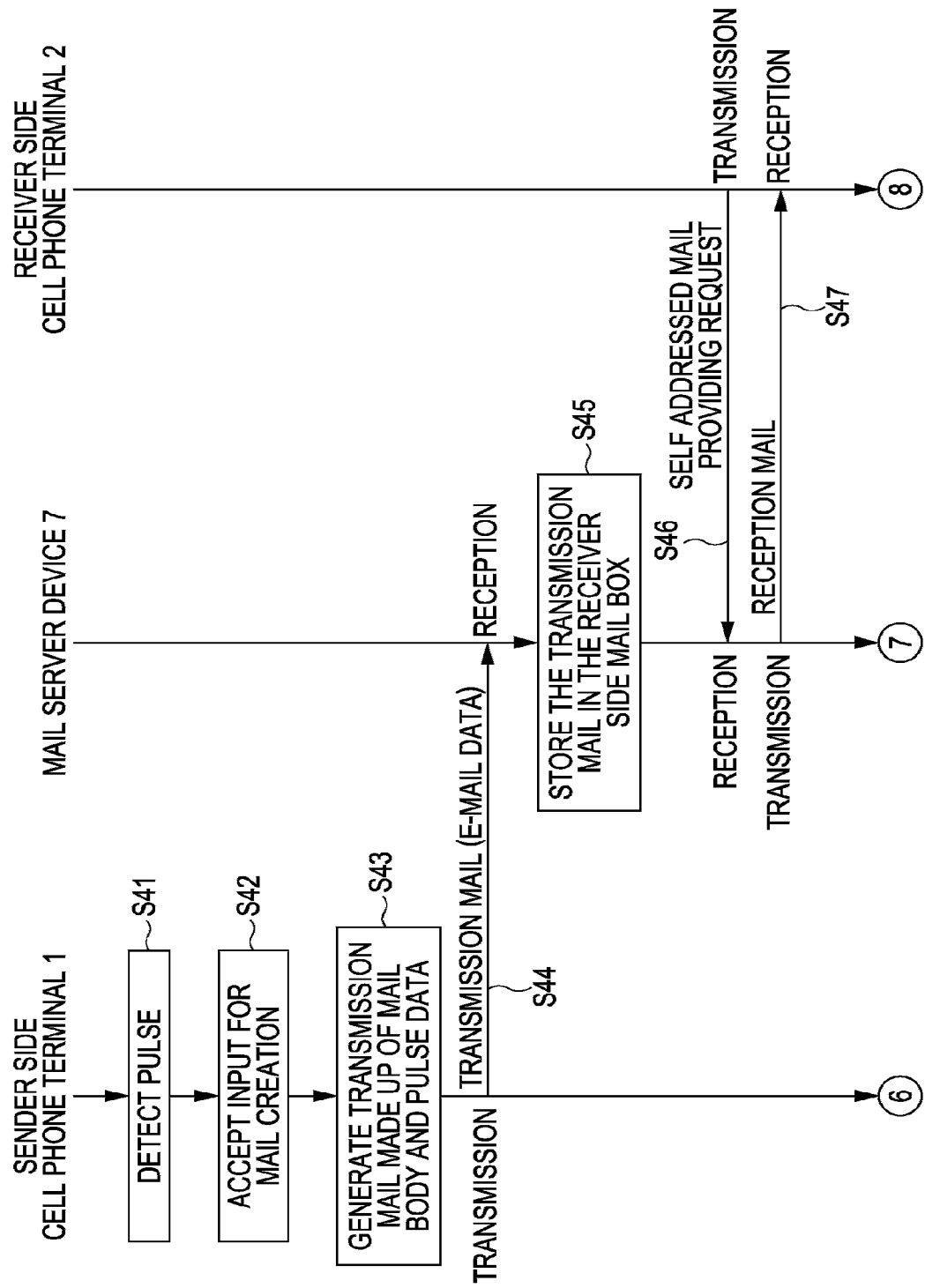
FIG. 27 is a diagram for describing an overview of a communication system according to the fourth embodiment.
Figure 28:
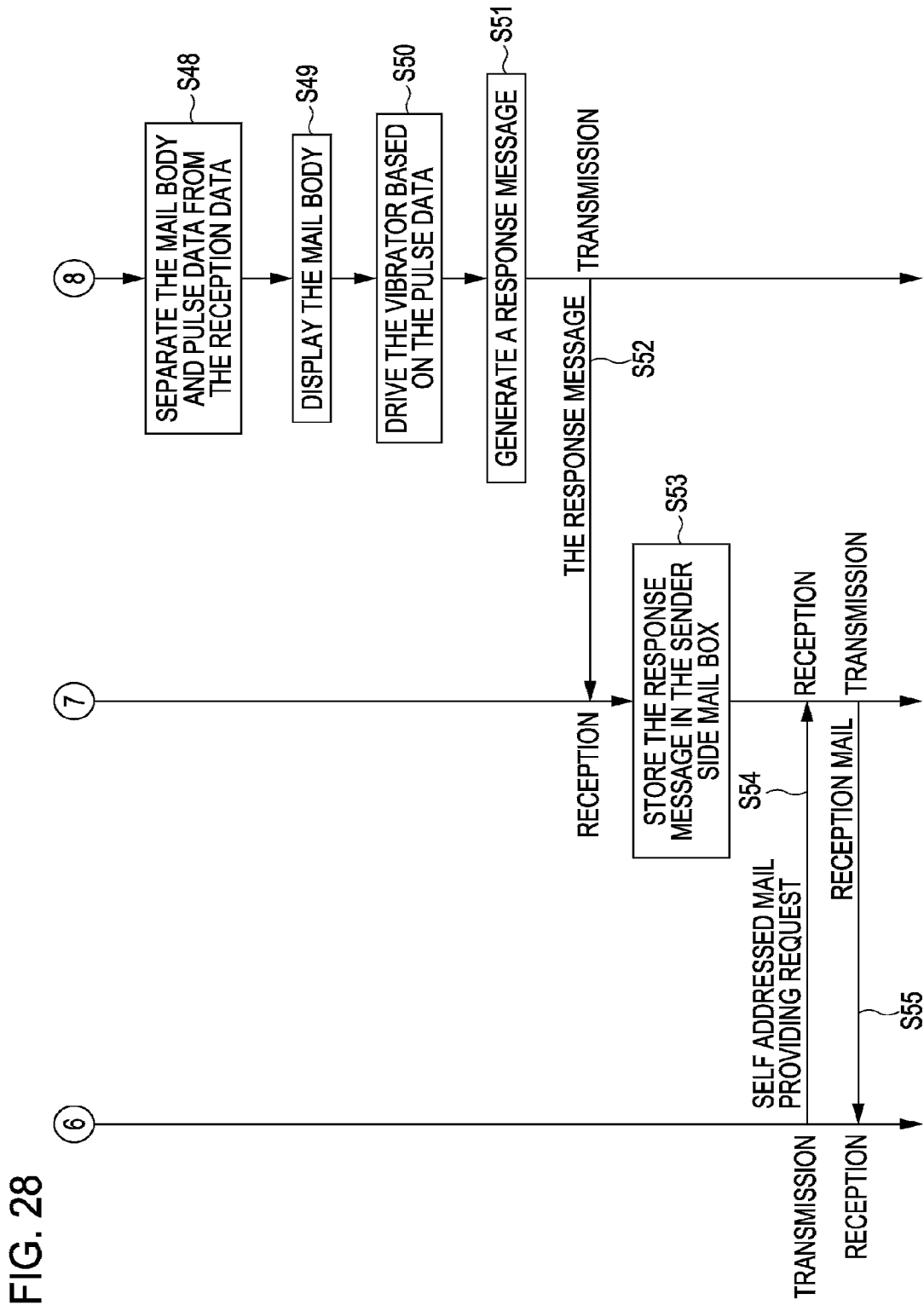
FIG. 28 is a sequence diagram following FIG. 27.

Note that, in order to simplify description, description has been made here regarding the case wherein the sender-side cell phone terminal 1 and receiver-side cell phone terminal 2 employ the same mail server device 7, as an example, but the present invention is not restricted to this. It goes without saying that there is a case wherein the mail server device employed by the sender-side cell phone terminal 1 differs from the mail server device employed by the receiver-side cell phone terminal 2. However, even in such a case wherein different mail server devices are employed, transmission/reception of e-mail data, pulse data, or a response message is performed as described above except that the destination of an e-mail differs.
Communication Between Cell Phone Terminals 1 and 2 Performed Through Server Device Next, as described with reference to FIG. 26, description will be made regarding communication processing between the cell phone terminal 1 and cell phone terminal 2 performed through the mail server device 7, with reference to the sequence diagrams shown in FIG. 27 and FIG. 28. FIG. 27 and FIG. 28 are sequence diagrams for describing an overview of the operation of the communication system according to the fourth embodiment.

First, with the sender-side cell phone terminal 1, upon the user picking up the cell phone terminal 1, and coming into contact with the pulse sensor 151 by a finger or the like to create an e-mail to be transmitted, the pulse sensor 151 starts processing for measuring the pulse of the user (step S41).

Next, with the cell phone terminal 1, the control unit 120 accepts input of e-mail data to be transmitted to the receiver-side cell phone terminal 2, or the like, such as transmission destination e-mail address, mail body, and so forth, through the key operating unit 132 (step S42).

Subsequently, the control unit 120 of the cell phone terminal 1 generates transmission e-mail data including information such as e-mail body and so forth accepted in step S42, and the pulse data of the user of which the measurement was started in step S41 (step S43), and transmits this (step S44).

The e-mail data transmitted from the cell phone terminal 1 to the cell phone terminal 2 is received at the mail server device 7 including the mail box of the cell phone terminal 2, and is stored in the mail box of the cell phone terminal 2 (step S45).

Subsequently, upon accepting operation input for receiving e-mail data for the terminal from the user performed at appropriate timing, the receiver-side cell phone terminal 2 accesses the mail server device 7 to transmit a request for providing e-mail data for the terminal (step S46).

In response to this, the mail server device 7 reads out e-mail data from the mail box of the cell phone terminal 2 which transmitted the providing request, and transmits this to the cell phone terminal 2 which is a request source (step S47). This e-mail data is, as described above, from the sender-side cell phone terminal 1, and includes pulse data.

Subsequently, the flow proceeds to the processing shown in FIG. 28. With the receiver-side cell phone terminal 2, the control unit 120 separates the received e-mail data for the terminal into e-mail body and pulse data (step S48). Subsequently, the control unit 120 of the cell phone terminal 2 displays the e-mail body on the LCD 142 (step S49), and controls the vibrator 143 to vibrate based on the received pulse data (step S50). In this step S50, the vibrator 143 is controlled so as to vibrate at the cycle which the pulse data indicates.

Subsequently, the control unit 120 of the receiver-side cell phone terminal 2 generates a response message addressed to the cell phone terminal 1 which indicates that the pulse data has been received and employed (step S51), and transmits this to the mail server device 7 including the mail box of the sender-side cell phone terminal 1 (step S52). Here, the response message is, for example, made up of text data indicating that the e-mail from the cell phone terminal 1 has been received, and the pulse data has been employed, which is automatically generated. It goes without saying that an arrangement may be made wherein in a case in which operation input from the user of the cell phone terminal 2 has been accepted, a response message is created and transmitted.

Upon receiving the response message addressed to the cell phone terminal 1, the mail server device 7 stores this in the mail box for the user of the cell phone terminal 1 (step S53).

Subsequently, upon accepting operation input for receiving e-mail data addressed to the terminal from the user performed at appropriate timing, the sender-side cell phone terminal 1 accesses the mail server device 7 to transmit a providing request of e-mail data addressed to the terminal (step S54).

In response to this, the mail server device 7 reads out e-mail data (response message from the cell phone terminal 2) from the mail box of the cell phone terminal 1 which transmitted the providing request, and transmits this to the cell phone terminal 1 which is the request source (step S55). According to the response message from the cell phone terminal 2, the user of the sender-side cell phone terminal 1 can recognize that the pulse data transmitted from the cell phone terminal 1 has been received and employed at the cell phone terminal 2.

Note that description has been made here assuming that pulse data is transmitted from the sender-side cell phone terminal 1, and a response message is transmitted from the receiver-side cell phone terminal 2, but the present invention is not restricted to this. For example, it goes without saying that pulse data may be transmitted/received mutually between the cell phone terminal 1 and cell phone terminal 2.

Also, as described above, in the case of the communication system according to the fourth embodiment, the communication terminals employed in the second and third embodiments may be employed. Accordingly, in the same way as the second embodiment, an arrangement may be made wherein operation strength data corresponding to the operation input of the user is transmitted or received as information indicating the condition of the user, thereby driving the shape actuator of each communication terminal side.

Also, in the same way as the case of the third embodiment, an arrangement may be made wherein pulse data, and operation strength data corresponding to the operation input of the user are transmitted/received, thereby driving the vibrator and shape actuator provided in each communication terminal side.

Also, description has been made here regarding a case wherein e-mail data is transmitted or received, as an example, but the present invention is not restricted to this. For example, an arrangement may be made wherein a homepage is opened, and pulse data and operation strength data are arranged to be uploaded to this homepage, the general public cell phone terminal users access the homepage through the cell phone terminals, download the pulse data or operation strength data, and reproduce this.

Thus, with the above-described communication systems according to the first through fourth embodiments, information indicating the condition of the user of the sender-side communication equipment is transmitted to the receiver-side communication equipment, and can be reproduced at the receiver-side communication equipment. Thus, the user of the receiver-side communication equipment can recognize the condition of the user of the sender-side communication equipment.

Also, a response indicating that information indicating the condition of the sender-side user has been received and employed can be sent back from the receiver-side communication equipment to the sender-side communication equipment, so the sender-side user does not have to be concerned regarding whether or not the information from the equipment has been received and employed at the partner, and the transmitted information again does not have to be transmitted again, neither does a message for confirmation have to be transmitted.

Also, an arrangement may be made wherein information indicating the condition of the receiver-side user is sent back from the receiver-side communication equipment to the sender-side communication equipment, to the user of the sender-side communication equipment can be informed of what kind of reaction the user of the receiver-side communication equipment who has received and reproduced the information indicating the condition of the sender-side user, is exhibiting. That is to say, the user of the sender-side communication equipment can confirm the reaction of the receiver-side communication equipment.

Note that, with each piece of the communication equipment according to the above-described first through fourth embodiments, an eccentric DC (direct current) motor type or linear motor type may be employed as the vibrators and vibrating members.

It should be understood by those skilled in the art that various modifications, combinations, sub-combinations and alterations may occur depending on design requirements and other factors insofar as they are within the scope of the appended claims or the equivalents thereof.

What is claimed is:

1. Communication equipment comprising:
a reception unit configured to receive, as information indicating a condition of a communication partner transmitted from said partner, information corresponding to biological information of said partner, or information corresponding to variable operation input of said partner;
a notification unit configured to notify the condition corresponding to the information indicating the condition of said partner received through said reception unit;
a control unit configured to control said notification unit based on the information indicating the condition of said partner received through said reception unit; and
a transmission unit configured to transmit, in a case of having notifying the condition corresponding to the information indicating the condition of said partner through said notification unit, information indicating that said notification has been performed to said communication partner.

2. The communication equipment according to claim 1, further comprising:
a detection unit configured to detect biological information of a user of said communication equipment;
wherein said transmission unit transmits the biological information of the user detected by said detection unit to said communication partner.

3. The communication equipment according to claim 1, further comprising:
a key operating unit configured to accept variable operation input of a user of said communication equipment;
wherein said transmission unit transmits information corresponding to operation input accepted through said key operating unit to said communication partner.

4. The communication equipment according to claim 1, wherein information corresponding to the biological information of said partner is information corresponding to a pulse of the user of said partner, and the information corresponding to variable operation input of said partner is information corresponding to variation of a pneumatic pressure detected by a pneumatic sensor.

5. The communication equipment according to claim 1, wherein said notification unit is a vibration element configured to generate vibration, or an actuator element configured to vary a shape thereof.

6. Communication equipment comprising:
a download unit configured to access a target server device to download target information, and as information indicating a condition of a partner to be added to said target information, information corresponding to biological information of said partner, or information corresponding to a variable operation input of said partner;
a notification unit configured to notify information corresponding to the information indicating the condition of said partner downloaded through said download unit;
a control unit configured to control said notification unit based on the information indicating the condition of said partner downloaded through said download unit; and
an upload unit configured to upload, in a case of notifying the condition corresponding to the information indicating the condition of said partner through said notification unit, information indicating that said notification has been performed to a server device of said partner.

7. The communication equipment according to claim 6, further comprising:
a detection unit configured to detect the biological information of a user of said communication equipment;
wherein said upload unit is capable of uploading the biological information of the user detected by said detection unit to the server device of said communication partner.

8. The communication equipment according to claim 6, further comprising:
a key operating unit configured to accept variable operation input of a user of said communication equipment;
wherein said upload unit is capable of uploading information corresponding to the variable operation input of the user accepted through said key operating unit to the server device of said communication partner.

9. The communication equipment according to claim 6, wherein the information corresponding to the biological information of said partner is information corresponding to a pulse of the user of said partner, and the information corresponding to the variable operation input of said partner is information corresponding to variation of a pneumatic pressure detected by a pneumatic sensor.

10. The communication equipment according to claim 6, wherein said notification unit is a vibration element configured to generate vibration, or an actuator element configured to vary a shape thereof.

11. A communication system comprising:
sender-side communication equipment including
a detection unit configured to detect information indicating a condition of a user, and
a transmission unit configured to transmit the information indicating the condition of said user detected through said detection unit to a communication partner;
receiver-side communication equipment including
a reception unit configured to receive the information indicating the condition of said user transmitted from said sender-side communication equipment,
a notification unit configured to notify the condition corresponding to the condition of said user received through said reception unit,
a control unit configured to control said notification unit based on the information indicating the condition of said user received through said reception unit,
wherein said receiver-side communication equipment includes
a transmission unit configured to transmit, in a case of having notifying the condition corresponding to the information indicating the condition of said partner through said notification unit, information indicating that said notification has been performed to said communication partner, and
wherein said sender-side communication equipment includes
a reception unit configured to receive the information indicating that said notification has been performed, transmitted from said receiver-side communication equipment.

12. A communication system comprising:
sender-side communication equipment including
a detection unit configured to detect information indicating a condition of a user, and
an upload unit configured to add the information indicating the condition of said user to information to be transmitted, thereby transmitting such information to a server device of a target communication partner; and
receiver-side communication equipment including
a download unit configured to access said server device to download said information to be transmitted, and the information indicating the condition of said user to be added to said information to be transmitted,
a notification unit configured to notify information corresponding to the information indicating the condition of said user downloaded through said download unit, and
a control unit configured to control said notification unit based on the information indicating the condition of said user downloaded through said download unit,
wherein said receiver-side communication equipment includes
an upload unit configured to upload, in a case of having notifying the condition corresponding to the information indicating the condition of said user through said notification unit, information indicating that said notification has been performed to a server device of said sender side;
and wherein said sender-side communication equipment includes
a download unit configured to access said sender-side server device to download the information that said notification has been performed.

13. Communication equipment comprising:
a download unit configured to access a target server device to download target information, and as information indicating a condition of a partner to be added to said target information, information corresponding to biological information of said partner, or information corresponding to a variable operation input of said partner;
a notification unit configured to notify information corresponding to the information indicating the condition of said partner downloaded through said download unit; and
a control unit configured to control said notification unit based on the information indicating the condition of said partner downloaded through said download unit.

14. Communication equipment comprising:
reception means configured to receive, as information indicating a condition of a communication partner transmitted from said partner, information corresponding to biological information of said partner, or information corresponding to variable operation input of said partner;
notification means configured to notify the condition corresponding to the information indicating the condition of said partner received through said reception means;
control means configured to control said notification means based on the information indicating the condition of said partner received through said reception means; and
transmission means configured to transmit, in a case of having notifying the condition corresponding to the information indicating the condition of said partner through said notification means, information indicating that said notification has been performed to said communication partner.

15. Communication equipment comprising:
download means configured to access a target server device to download target information, and as information indicating a condition of a partner to be added to said target information, information corresponding to biological information of said partner, or information corresponding to a variable operation input of said partner;
notification means configured to notify information corresponding to the information indicating the condition of said partner downloaded through said download means;
control means configured to control said notification means based on the information indicating the condition of said partner downloaded through said download means; and
upload means configured to upload, in a case of notifying the condition corresponding to the information indicating the condition of said partner through said notification means, information indicating that said notification has been performed to a server device of said partner.

16. A communication system comprising:
sender-side communication equipment including
detection means configured to detect information indicating a condition of a user, and
transmission means configured to transmit the information indicating the condition of said user detected through said detection means to a communication partner;
receiver-side communication equipment including
reception means configured to receive the information indicating the condition of said user transmitted from said sender-side communication equipment,
notification means configured to notify the condition corresponding to the condition of said user received through said reception means,
control means configured to control said notification means based on the information indicating the condition of said user received through said reception means,
wherein said receiver-side communication equipment includes
transmission means configured to transmit, in a case of having notifying the condition corresponding to the information indicating the condition of said partner through said notification means, information indicating that said notification has been performed to said communication partner, and
wherein said sender-side communication equipment includes
reception means configured to receive the information indicating that said notification has been performed, transmitted from said receiver-side communication equipment.

17. A communication system comprising:
sender-side communication equipment including
detection means configured to detect information indicating a condition of a user, and
upload means configured to add the information indicating the condition of said user to information to be transmitted, thereby transmitting such information to a server device of a target communication partner; and
receiver-side communication equipment including
download means configured to access said server device to download said information to be transmitted, and the information indicating the condition of said user to be added to said information to be transmitted,
notification means configured to notify information corresponding to the information indicating the condition of said user downloaded through said download means, and control means configured to control said notification means based on the information indicating the condition of said user downloaded through said download means, wherein said receiver-side communication equipment includes upload means configured to upload, in a case of having notifying the condition corresponding to the information indicating the condition of said user through said notification means, information indicating that said notification has been performed to a server device of said sender side;

and wherein said sender-side communication equipment includes download means configured to access said sender-side server device to download the information that said notification has been performed.

* * * * *